US007901870B1

(12) United States Patent  
Wach

(10) Patent No.: US 7,901,870 B1
(45) Date of Patent: Mar. 8, 2011

(54) ADJUSTING OPTICAL PROPERTIES OF OPTICAL THIN FILMS

(75) Inventor: Michael L. Wach, Alpharetta, GA (US)

(73) Assignee: Cirrex Systems LLC, Alpharetta, GA (US)

( * ) Notice: Subject to any disclaimer, the term of this patent is extended or adjusted under 35 U.S.C. 154(b) by 1120 days.

(21) Appl. No.: 11/127,558

(22) Filed: May 12, 2005

Related U.S. Application Data

(60) Provisional application No. 60/570,258, filed on May 12, 2004.

(51) Int. Cl.
G02B 6/02 (2006.01)
(52) U.S. Cl. ........................................ 430/321
(58) Field of Classification Search .............. 430/321
See application file for complete search history.

(56) References Cited

U.S. PATENT DOCUMENTS

| | | | |
|---|---|---|---|
| 3,484,719 A | 12/1969 | Smith ........................... 331/94.5 |
| 3,568,012 A | 3/1971 | Ernst et al. ..................... 317/234 |
| 3,761,184 A | 9/1973 | McLaughlin, Jr. ............. 356/186 |
| 3,873,408 A | 3/1975 | Hensier .......................... 161/165 |
| 4,225,782 A | 9/1980 | Kuppenheimer, Jr. et al. ............................. 250/216 |
| 4,234,356 A | 11/1980 | Auston et al. ................... 148/1.5 |
| 4,358,851 A | 11/1982 | Scifres et al. .................... 372/97 |
| 4,374,942 A | 2/1983 | Takami et al. ................. 523/210 |
| 4,403,825 A * | 9/1983 | Tangonan et al. ............... 385/14 |
| 4,481,414 A | 11/1984 | Gasper ........................... 250/226 |
| 4,529,943 A | 7/1985 | George et al. ................... 330/4.3 |
| 4,573,761 A | 3/1986 | McLachlan et al. ........ 350/96.24 |
| 4,574,574 A | 3/1986 | Knaak ............................... 57/59 |
| 4,583,227 A | 4/1986 | Kirkby ............................. 372/32 |
| 4,616,898 A | 10/1986 | Hicks, Jr. .................... 350/96.15 |
| 4,693,544 A | 9/1987 | Yamasaki et al. ........... 350/96.16 |
| 4,699,452 A | 10/1987 | Mollenauer et al. ........ 350/96.16 |
| 4,725,110 A | 2/1988 | Glenn et al. .................. 350/3.61 |
| 4,807,950 A | 2/1989 | Glenn et al. .................. 350/3.61 |
| 4,851,095 A | 7/1989 | Scobey et al. ............. 204/192.12 |
| 4,867,520 A | 9/1989 | Weidel ........................ 350/96.16 |
| 4,899,347 A | 2/1990 | Kuchar et al. ................... 372/33 |

(Continued)

FOREIGN PATENT DOCUMENTS

EP 0 210 869 2/1987

(Continued)

OTHER PUBLICATIONS

Chen, Kevin P. and Herman, Peter R. "Fabrication of long-period fiber gratings with 157-nm F2 laser radiation." OSA Technical Digest (2001).*

(Continued)

Primary Examiner — Cynthia H Kelly
Assistant Examiner — Anna L Verderame

(57) ABSTRACT

An optical thin film can have a refractive index variation along a dimension that is perpendicular to its thickness. Two areas that have equal physical thicknesses can have different optical thicknesses. Including the thin film as a layer in a thin film optical filter can provide a corresponding variation in the filter's spectral properties. Dosing an optical thin film with ultraviolet light can cause the refractive index variation. Subjecting the film to hydrogen can increase the refractive index's response to the dose of light. Dosing a region of a thin film optical filter with ultraviolet light can change the spectral properties of the region, for example shifting an out-of-specification optical filter into specification thereby increasing manufacturing yield. An agent can promote the film's response to the dose.

16 Claims, 18 Drawing Sheets

U.S. PATENT DOCUMENTS

| | | | | |
|---|---|---|---|---|
| 4,911,516 | A | 3/1990 | Palfrey et al. | 350/96.19 |
| 4,947,223 | A | 8/1990 | Biefeld et al. | 357/30 |
| 4,958,897 | A | 9/1990 | Yanagawa et al. | 350/96.15 |
| 5,000,575 | A | 3/1991 | Southwell et al. | 356/382 |
| 5,009,485 | A | 4/1991 | Hall | 350/163 |
| 5,031,189 | A | 7/1991 | Stuhler et al. | 372/92 |
| 5,043,991 | A | 8/1991 | Bradley | 372/32 |
| 5,045,249 | A | 9/1991 | Jin et al. | 264/24 |
| 5,056,099 | A | 10/1991 | Bradley | 372/49 |
| 5,112,127 | A | 5/1992 | Carrabba et al. | 356/301 |
| 5,166,756 | A | 11/1992 | McGee et al. | 356/446 |
| 5,181,143 | A | 1/1993 | Southwell | 359/586 |
| 5,218,473 | A | 6/1993 | Seddon et al. | 359/589 |
| 5,235,659 | A | 8/1993 | Atkins et al. | 385/124 |
| 5,237,630 | A | 8/1993 | Hogg et al. | 385/12 |
| 5,238,738 | A | 8/1993 | Miller | 428/333 |
| 5,274,655 | A | 12/1993 | Shieh et al. | 372/45 |
| 5,278,687 | A | 1/1994 | Jannson et al. | 359/125 |
| 5,283,014 | A | 2/1994 | Oestreich et al. | 264/1.5 |
| 5,283,692 | A | 2/1994 | Herbst | 359/580 |
| 5,288,992 | A | 2/1994 | Fohl | 250/216 |
| 5,305,336 | A | 4/1994 | Adar et al. | 372/18 |
| 5,323,404 | A | 6/1994 | Grubb | 372/6 |
| 5,373,519 | A | 12/1994 | Siono et al. | 372/43 |
| 5,377,045 | A | 12/1994 | Wolfe et al. | 359/585 |
| 5,377,182 | A | 12/1994 | Monacos | 370/16 |
| 5,426,657 | A | 6/1995 | Vakhshoori | 372/45 |
| 5,432,638 | A | 7/1995 | Rahmlow | 359/588 |
| 5,438,579 | A | 8/1995 | Eda et al. | 372/34 |
| 5,475,531 | A | 12/1995 | Rahmlow et al. | 359/586 |
| 5,488,511 | A | 1/1996 | Rahmlow, Jr. | 359/586 |
| 5,510,215 | A | 4/1996 | Prince et al. | 430/7 |
| 5,521,564 | A | 5/1996 | Kaneko et al. | 333/175 |
| 5,521,733 | A | 5/1996 | Akiyama | 359/127 |
| 5,525,199 | A | 6/1996 | Scobey | 204/192.26 |
| 5,563,734 | A | 10/1996 | Wolfe et al. | 359/360 |
| 5,596,987 | A | 1/1997 | Chance | 128/633 |
| 5,604,588 | A | 2/1997 | Goedert | 356/318 |
| 5,612,824 | A | 3/1997 | Si et al. | 359/652 |
| 5,614,726 | A | 3/1997 | Kaye et al. | 250/574 |
| 5,616,401 | A | 4/1997 | Kobayashi et al. | 428/212 |
| 5,677,920 | A | 10/1997 | Waarts et al. | 372/6 |
| 5,680,495 | A | 10/1997 | Bloom | 385/94 |
| 5,711,889 | A | 1/1998 | Buchsbaum | 216/5 |
| 5,712,865 | A | 1/1998 | Chow et al. | 372/96 |
| 5,721,802 | A | 2/1998 | Francis et al. | 385/137 |
| 5,764,348 | A | 6/1998 | Bloom | 356/73.1 |
| 5,764,840 | A | 6/1998 | Wach | 385/123 |
| 5,774,278 | A | 6/1998 | Kaplan | 359/723 |
| 5,778,014 | A | 7/1998 | Islam | 372/6 |
| 5,805,751 | A | 9/1998 | Kewitsch et al. | 385/43 |
| 5,805,757 | A | 9/1998 | Bloom | 380/137 |
| 5,815,619 | A | 9/1998 | Bloom | 385/78 |
| 5,818,986 | A | 10/1998 | Asawa et al. | 385/24 |
| 5,828,489 | A | 10/1998 | Johnson et al. | 359/487 |
| 5,835,661 | A | 11/1998 | Tai et al. | 385/146 |
| 5,861,134 | A | 1/1999 | Swanson | 423/335 |
| 5,864,397 | A | 1/1999 | Vo-Dinh | 356/301 |
| 5,866,204 | A | 2/1999 | Robbie et al. | 427/256 |
| 5,868,855 | A | 2/1999 | Fukazawa et al. | 134/1.3 |
| 5,871,559 | A | 2/1999 | Bloom | 65/501 |
| 5,872,655 | A | 2/1999 | Seddon et al. | 359/588 |
| 5,878,178 | A | 3/1999 | Wach | 385/55 |
| 5,901,261 | A | 5/1999 | Wach | 385/38 |
| 5,903,585 | A | 5/1999 | Dawson et al. | 372/45 |
| 5,909,304 | A | 6/1999 | Chang | 359/308 |
| 5,911,017 | A | 6/1999 | Wach et al. | 385/12 |
| 5,914,972 | A | 6/1999 | Siala et al. | 372/33 |
| 5,917,623 | A | 6/1999 | Yoshida | 359/124 |
| 5,917,975 | A | 6/1999 | Bloom | 385/78 |
| 5,928,713 | A | 7/1999 | Haaland et al. | 427/10 |
| 5,931,983 | A | 8/1999 | Bloom | 65/378 |
| 5,948,134 | A | 9/1999 | Bloom | 65/376 |
| 5,953,477 | A | 9/1999 | Wach et al. | 385/115 |
| 5,970,749 | A | 10/1999 | Bloom | 65/378 |
| 5,971,629 | A | 10/1999 | Bloom | 385/94 |
| 5,974,207 | A | 10/1999 | Aksyuk et al. | 385/24 |
| 5,991,070 | A | 11/1999 | Zanoni et al. | 359/341 |
| 5,994,721 | A | 11/1999 | Zhong et al. | 257/89 |
| 5,999,684 | A | 12/1999 | Bloom | 385/137 |
| 6,000,858 | A | 12/1999 | Bloom | 385/94 |
| 6,003,341 | A | 12/1999 | Bloom | 65/484 |
| 6,009,115 | A | 12/1999 | Ho | 372/92 |
| 6,010,756 | A | 1/2000 | Gasworth | 427/576 |
| 6,018,965 | A | 2/2000 | Bloom | 65/378 |
| 6,038,061 | A | 3/2000 | Sugaya | 359/337 |
| 6,043,936 | A | 3/2000 | Large | 359/572 |
| 6,044,096 | A | 3/2000 | Wolak et al. | 372/36 |
| 6,051,453 | A | 4/2000 | Takemura | 438/166 |
| 6,074,101 | A | 6/2000 | Bloom | 385/78 |
| 6,076,344 | A | 6/2000 | Doujak | 57/9 |
| 6,083,341 | A | 7/2000 | Wei et al. | 156/274.4 |
| 6,091,872 | A | 7/2000 | Katoot | 385/116 |
| 6,108,074 | A | 8/2000 | Bloom | 356/73.1 |
| 6,111,688 | A | 8/2000 | Kobayashi et al. | 359/341 |
| 6,112,555 | A | 9/2000 | Bloom | 65/378 |
| 6,121,068 | A | 9/2000 | Ramdani et al. | 438/39 |
| 6,144,791 | A | 11/2000 | Wach et al. | 385/123 |
| 6,169,830 | B1 | 1/2001 | Kewitsch et al. | 385/37 |
| 6,174,424 | B1 | 1/2001 | Wach et al. | 205/73 |
| 6,174,749 | B1 | 1/2001 | Yuen et al. | 438/35 |
| 6,177,985 | B1 | 1/2001 | Bloom | 356/73.1 |
| 6,178,188 | B1 | 1/2001 | Jing et al. | 372/36 |
| 6,198,857 | B1 | 3/2001 | Grasis et al. | 385/24 |
| 6,208,783 | B1 | 3/2001 | Wach | 385/43 |
| 6,208,798 | B1 | 3/2001 | Morozov et al. | 385/140 |
| 6,219,474 | B1 | 4/2001 | Cai et al. | 385/24 |
| 6,221,509 | B1 | 4/2001 | Hirano et al. | 428/620 |
| 6,222,970 | B1 | 4/2001 | Wach et al. | 385/115 |
| 6,233,263 | B1 | 5/2001 | Chang-Hasnain et al. | 372/32 |
| 6,236,782 | B1 | 5/2001 | Kewitsch et al. | 385/43 |
| 6,237,370 | B1 | 5/2001 | Bloom | 65/484 |
| 6,244,756 | B1 | 6/2001 | Bloom | 385/94 |
| 6,249,365 | B1 | 6/2001 | Mizrahi et al. | 359/130 |
| 6,256,148 | B1 | 7/2001 | Gasworth | 359/586 |
| 6,269,208 | B1 | 7/2001 | Bhatia et al. | 385/37 |
| 6,282,340 | B1 | 8/2001 | Nasu et al. | 385/37 |
| 6,289,699 | B1 | 9/2001 | Kewitsch et al. | 65/406 |
| 6,298,075 | B1 | 10/2001 | Kitaoka et al. | 372/33 |
| 6,300,176 | B1 | 10/2001 | Zhang et al. | 438/166 |
| 6,320,888 | B1 | 11/2001 | Tanaka et al. | 372/32 |
| 6,341,138 | B1 | 1/2002 | Peters et al. | 372/96 |
| 6,351,476 | B2 | 2/2002 | Kner et al. | 372/20 |
| 6,354,109 | B1 | 3/2002 | Boire et al. | 65/60.1 |
| 6,356,681 | B1 | 3/2002 | Chen et al. | 385/37 |
| 6,366,726 | B1 | 4/2002 | Wach et al. | 385/115 |
| 6,370,406 | B1 | 4/2002 | Wach et al. | 600/310 |
| 6,376,923 | B1 | 4/2002 | Sumita et al. | 257/791 |
| 6,392,801 | B1 | 5/2002 | Southwell | 359/487 |
| 6,404,953 | B1 | 6/2002 | Wach et al. | 385/31 |
| 6,408,125 | B1 | 6/2002 | Akwani et al. | 385/142 |
| 6,413,380 | B1 | 7/2002 | Pinarbasi | 204/192.11 |
| 6,415,082 | B1 | 7/2002 | Wach | 385/39 |
| 6,416,234 | B1 | 7/2002 | Wach et al. | 385/70 |
| 6,449,420 | B1 | 9/2002 | Akwani et al. | 385/142 |
| 6,456,771 | B1* | 9/2002 | Sanders | 385/124 |
| 6,475,557 | B1 | 11/2002 | Mori et al. | 427/162 |
| 6,483,635 | B1 | 11/2002 | Wach | 359/344 |
| 6,487,349 | B2 | 11/2002 | Wach et al. | 385/115 |
| 6,496,523 | B1 | 12/2002 | Wach | 372/32 |
| 6,506,289 | B2 | 1/2003 | Demaray et al. | 204/192.26 |
| 6,514,840 | B2 | 2/2003 | Barrett et al. | 438/530 |
| 6,531,710 | B1 | 3/2003 | Yu | 257/51 |
| 6,535,533 | B2 | 3/2003 | Lorenzen et al. | 372/34 |
| 6,537,623 | B2 | 3/2003 | Ouellet et al. | 427/579 |
| 6,542,660 | B1 | 4/2003 | Medin et al. | 385/24 |
| 6,542,673 | B1 | 4/2003 | Holter et al. | 385/52 |
| 6,548,370 | B1 | 4/2003 | Kasahara et al. | 438/FOR. 419 |
| 6,577,658 | B1 | 6/2003 | Lee et al. | 372/45 |
| 6,580,734 | B1 | 6/2003 | Zimmermann | 372/29.02 |
| 6,580,935 | B1 | 6/2003 | Wach et al. | 600/310 |
| 6,601,411 | B2 | 8/2003 | MacDougall et al. | 65/378 |
| 6,614,818 | B1 | 9/2003 | Kmetec et al. | 372/19 |
| 6,621,957 | B1 | 9/2003 | Sullivan et al. | 385/37 |
| 6,656,996 | B2 | 12/2003 | Tsutsumi et al. | 524/492 |
| 6,664,307 | B2 | 12/2003 | Arnold et al. | 522/71 |
| 6,673,858 | B2 | 1/2004 | Takeichi et al. | 524/430 |

| | | | |
|---|---|---|---|
| 6,683,898 B2 | 1/2004 | Ostergaard et al. | 372/43 |
| 6,723,209 B2 | 4/2004 | Baldwin et al. | 204/192.12 |
| 6,724,797 B2 | 4/2004 | Daiber | 372/92 |
| 6,760,520 B1 | 7/2004 | Medin et al. | 385/43 |
| 6,872,452 B2 | 3/2005 | Taninaka et al. | 428/432 |
| 6,888,667 B2 | 5/2005 | Nicolaescu | 359/332 |
| 6,961,183 B2 | 11/2005 | Wada et al. | 359/584 |
| 7,027,677 B2 | 4/2006 | Li et al. | 385/14 |
| 7,295,313 B1* | 11/2007 | Johs et al. | 356/369 |
| 7,358,031 B2* | 4/2008 | Yamamoto et al. | 430/270.13 |
| 2001/0051305 A1* | 12/2001 | Lee | 430/7 |
| 2002/0071159 A1 | 6/2002 | Lange et al. | 359/152 |
| 2002/0181908 A1 | 12/2002 | Pedersen et al. | 385/123 |
| 2002/0191268 A1* | 12/2002 | Seeser et al. | 359/260 |
| 2003/0020855 A1* | 1/2003 | Lee | 349/115 |
| 2003/0063636 A1 | 4/2003 | Sasaki | 372/32 |
| 2003/0072890 A1 | 4/2003 | Miyazawa | 427/554 |
| 2003/0087121 A1 | 5/2003 | Domash et al. | 428/641 |
| 2003/0105191 A1 | 6/2003 | Arnold et al. | 523/466 |
| 2003/0161363 A1 | 8/2003 | Wolf et al. | 372/34 |
| 2003/0169959 A1 | 9/2003 | Jacobowitz et al. | 385/16 |
| 2004/0008968 A1* | 1/2004 | Lee et al. | 385/142 |
| 2004/0062945 A1 | 4/2004 | Domash et al. | 428/641 |
| 2004/0129931 A1 | 7/2004 | Asryan et al. | 257/14 |
| 2004/0244425 A1* | 12/2004 | Tong et al. | 65/378 |
| 2005/0063044 A1 | 3/2005 | Michie et al. | 359/344 |

FOREIGN PATENT DOCUMENTS

| | | |
|---|---|---|
| EP | 0 611 097 A1 | 8/1994 |
| JP | 60217315 | 10/1985 |
| JP | 61282803 | 12/1986 |
| JP | 63060410 | 3/1988 |
| JP | 02034806 | 2/1990 |
| JP | 08-286021 * | 11/1996 |
| JP | 10-327128 | 12/1998 |
| JP | 2004-264611 * | 9/2004 |
| WO | WO 97/06616 | 2/1997 |
| WO | WO 99/21316 | 4/1999 |
| WO | WO 02/27385 A2 | 4/2002 |
| WO | WO 02/47128 | 6/2002 |
| WO | WO 02/055974 | 7/2002 |
| WO | WO 02/071630 | 9/2002 |
| WO | WO 03/041232 | 5/2003 |

OTHER PUBLICATIONS

Translation JP-08-286021(Nov. 1996).*
Translation JP-2004-264611(Sep. 2004).*
*Automated Interference Lithography Systems for Generation of Sub-Micron Feature Size Patterns*; Hobbs; Proceedings of SPIE; vol. 3879; Aug. 1999; pp. 124-135.
*Arrayed-Waveguide Grating Multiplexer with Loop-Back Optical Paths and Its Applications*; Tachikawa; Journal of Lightwave Technology; vol. 14, No. 6; Jun. 1996; pp. 977-984.
*Coating Materials*; Friz; Springer Series in Optical Sciences; Optical Interference Coatings; vol. 88; 2003; pp. 105-130.
*Comparison of Some Fiber Optic Configurations for Measurement of Luminescence and Raman Scattering*; Myrick; Applied Optics; vol. 29, No. 9; Mar. 20, 1990; pp. 1333-1344.
*Comparative Study of Some Fiber-Optic Remote Raman Probe Designs. Part II: Tests of Single-Fiber, Lensed, and Flat- and Bevel-Tip Multi-Fiber Probes*; Cooney; Applied Spectroscopy; vol. 50, No. 7; 1996; pp. 849-860.
*Electrooptically Tunable Narrow-Linewidth InGaAsP-Ti:LiNbO$_3$ Extended Cavity Laser*; Heisman; OFC/IOOC 1987; p. 149.
*High-Stability 1.5 μm External-Cavity Semiconductor Laser for Phase-Lock Applications*; Kahn; IEEE Photonics Technology Letters; Jul. 1989; pp. 159-161.
*Monolithic Enhancement or Compensation of Laser Temperature Characteristics*; Research Report; 2000; 4 pages.
*Sampling Probes Enhance Remote Chemical Analyses*; Nave; Laser Focus World; Dec. 1995; 5 pages.
*Toward Tunable Optical Filters*; Parmentier; O.S.A. 2001; 26 pages.
*Toward Tunable Thin-Film Filters for Wavelength Division Multiplexing Applications*; Parmentier; Applied Optics; vol. 41., No. 16; Jun. 1, 2002; pp. 3277-3284.

*Will Silicon Be the Photonic Material of the Third Millenium?*; Pavesi; Journal of Physics: Condensed Matter; vol. 15; 2003; pp. 1169-1196.
"A Continuous-Wave Raman Silicon Laser," by Haisheng Rong, Richard Jones, Ansheng Liu, Oded Cohen, Dani Hak, Alexander Fang, and Mario Paniccia, *Nature* 3346, Mar. 2, 2005.
"An All-Silicon Raman Laser," by Haisheng Rong, Ansheng Liu, Richard Jones, Oded Cohen, Dani Hak, Remus Nicolaescu, Alexander Fang, and Mario Paniccia, *Nature*, vol. 433, Jan. 20, 2005.
"Silicon Shines On," by Jerome Faist, *Nature* vol. 433, Feb. 17, 2005.
"*Continuous Silicon Laser, Intel researchers create the first continuous silicon laser based on the Raman effect using standard CMOS technology*," by Sean Koehl, Victor Krutul, and Mario Paniccia, published by Intel Corporation as a white paper, 2005.
"*Intel's Research in Silicon Photonics Could Bring High-speed Optical Communications to Silicon*," by Mario Paniccia, Victor Krutul, and Sean Koehl, published by Intel Corporation as a white paper, Feb. 2004.
"Silicon Photonics," by Mike Salib, Ling Liao, Richard Jones, Mike Morse, Ansheng Liu, Dean Samara-Rubio, Drew Alduino, and Mario Paniccia, *Intel Technology Journal*, vol. 08, Issue 02, May 10, 2004.
"*Introducing Intel's Advances in Silicon Photonics*," by Mario Paniccia, Victor Krutul, Sean Koehl, published by Intel Corporation as a white paper, Feb. 2004.
"Intel Unveils Silicon Photonics Breakthrough: High-Speed Silicon Modulation," by Mario Paniccia, Victor Krutul, and Sean Koehl, *Technology@Intel Magazine*, Feb./Mar. 2004.
"*Silicon Oxynitride Layers for Applications in Optical Waveguides*," by Feridun Ay, Master Degree Thesis, Bilkent University, Sep. 2000.
*Actively Mode-Locked GaInAsP Laser with Subpicosecond Output*; Corzine; Applied Physics Letters; vol. 52, No. 5; Feb. 1988; pp. 348-350.
*Adhesives Deliver Low Shrink, Low Stress Bond and Fast UV Cure*; Rhodes; Dymax Corporation; Sep. 2000; 18 pages.
*Active Materials for Integrated Optic Applications*; Hayden; Schott Glass Technologies, Inc. and National Institute of Standards and Technology; Sep. 1999; pp. 186-196.
*Alignment Tolerant Lasers and Silicon Waferboard Integration*; Dagenais; University of Maryland, Department of Electrical Engineering and Laboratory for Physical Sciences; SPIE; 1997; 11 pages.
*Arrays of Distributed-Bragg-Reflector Waveguide Lasers at 1536 nm in Yb/Er Codoped Phosphate Glass*; Veasey; Applied Physics Letters; vol. 74, No. 6; Feb. 8, 1999; pp. 789-791.
*Alignment-Insensitive Technique for Wideband Tuning of an Unmodified Semiconductor Laser*; Bernacki; Optics Letters No. 9; Sep. 1988; pp. 725-727.
*Axial-Mode Instability in Tunable External-Cavity Semiconductor Lasers*; Zorabedian; IEEE Journal of Quantum Electronics; vol. 30, No. 7; Jul. 1994; pp. 1542-1552.
*All-Fiber Zero-Insertion-Loss Add-Drop Filter for Wavelength-Division Multiplexing*; Kewitsch; Optical Letters; vol. 23, No. 2; Jan. 15, 1998; pp. 106-108.
*Asymmetric Twin-Waveguide 1.55-μm Wavelength Laser with a Distributed Bragg Reflector*; Studenkov; IEEE Photonics Technology Letters; vol. 12, No. 5, May 2000; pp. 468-470.
*All-Fiber Optical Add-Drop Multiplexer Based on a Selective Fused Coupler and a Single Fiber Bragg Grating*; Ortega; Applied Optics; vol. 37, No. 33; Nov. 20, 1998; pp. 7712-7717.
*Al$_2$O$_3$ Coating of ZnO Nanorods by Atomic Layer Deposition*; Min; Journal of Crystal Growth 252; 2003; pp. 565-569.
*Agilent Technologies' Singlemode Small Form Factor (SFF) Module Incorporates Micromachined Silicon, Automated Passive Alignment, and Non-Hermetic Packaging to Enable the Next Generation of Low-Cost Fiber Optics Transceivers*; Owen; 49th Electronic Components and Technology Conference, San Diego, CA; Jun. 1-4, 1999; pp. 182-187.
*Alignment Tolerant Structures for Ease of Optoelectronic Packaging*; Dagenais; SPIE Conference on Testing, Packaging, and Reliability of Semiconductor Lasers IV; San Jose CA; SPIE vol. 3626; Jan. 1999; pp. 128-137.
*Application of Planar Lightwave Circuit Platform to Hybrid Integrated Optical WDM Transmitter/Receiver Module*; Yamada; Electronics Letter vol. 31, No. 16; Aug. 3, 1995; pp. 1366-1367.

*Band-Edge Electroabsorption in Quantum Well Structures: The Quantum-Confined Stark Effect*; Miller; Physical Review Letters (The American Physical Society) vol. 53, No. 22; Nov. 26, 1984; pp. 2173-2176.
*Beam Express Demos Tunable 1550nm VCSEL*; Compound Semiconductor.Net; Oct. 15, 2002; 2 pages.
*Broad Area Laser*; Eagleyard Photonics (Product Specification Sheet); Jun. 17, 2003; 1 page.
*High-Performance 1.6 μm Single-Epitaxy Top-Emitting VCSEL*; Yuen; Bandwidth 9; (Web-published article and accompanying web page of Bandwidth9); 2000; 3 pages.
*Bragg Grating Manufacturing: Techniques and Practices*; Baldwin; Systems Planning and Analysis, Inc.; Serial: 155-00; www.spa-inc.net; Apr. 14, 2004; 6 pages.
*A Broadband Access Network Based on Optical Signal Processing: The Photonic Highway*; Yamaguchi; IEEE 1990; pp. 1030-1037.
*CWDM Moves Towards Standardization*; Eighenbaum; Lightwave; May 2002; p. 32.
*Compact Mode Expanded Lasers Using Resonant Coupling Between a 1.55-μm InGaAsP Tapered Active Region and an Underlying Coupling Waveguide*; Saini; IEEE Photonics Technology Letters; vol. 10, No. 9; Sep. 1998; pp. 1-3.
*Continuously Tunable High Power Fiber Lasers with 11nm Tunability*; Pan; Web-published White Paper of E-TEK Dynamics, Inc. 2000; 5 pages.
*Continuously Tunable High Power Miniature Fiber Laser Transmitters for High Speed DWDM Networks*; Pan; Web-published White Paper of E-TEK Dynamics, Inc. 2000; 3 pages.
*Calculation of $\Delta^2$ and κ for an Acoustically Induced Distributed Bragg Reflector (ADBR)*; Irby; IEEE Journal of Quantum Electronics, vol. 34, No. 2, Feb. 1998; pp. 213-224.
*Characteristics of a Grating-External-Cavity Semiconductor Laser Containing Intracavity Prism Beam Expanders*; Zorabedian; Journal of Lightwave Technology, vol. 10, No. 3, Mar. 1992; pp. 330-335.
*Complex Needs Drive Optoelectronic Integration*; Dagenais; Optoelectronics World, Jul. 1998; pp. 157-160.
*A Coupled-Waveguide Grating Resonator Filter*; Huang; IEEE Photonics Technology Letters, vol. 4, No. 8; Aug. 1992; pp. 884-886.
*Computer-Generated Waveguide Holograms by Double-Ion Exchange Process in Glass*; Saarinen; Electronic Letters, vol. 28, 1992; pp. 876-878.
*Coupled-Mode Theory for Corrugated Optical Waveguides*; Hall; Optics Letters, vol. 15, No. 11; Jun. 1, 1990; pp. 619-621.
*Ceramic Substrate with Negative Thermal Expansion for Athermalization of Fiber Bragg Gratings*; Sakamoto; IEICE Trans Electron, vol. E83-C, No. 9; Sep. 2000; pp. 1441-1445.
*Polarization Mode Dispersion (PMD): What is the Statistical Method for Determining Link PMD and Why is it Important*; Whitman; White Paper of Corning Incorporated; 1999; 9 pages.
*Corning® Single-Mode Optical Fiber, SMF-28™ Fiber, Product Information*; Product Literature of Corning Incorporated; Jul. 2000; 4 pages.
*Choosing Ball or GRIN Lenses*; Clark; White Paper of Deposition Sciences, Inc.; 2002; 4 pages.
*Coarse Wavelength Division Multiplexing—A Low Cost Solution for Increasing Return Path Capacity*; Maycock; Paper of Maeco Communications Ltd and Gigabit Optics Corporation; Maycock; Jul. 10, 2002; 7 pages.
*Characterization of the Negative Thermal Expansion Material $Zr_{1-x}Hf_xW_2O_8$*; Rong; Rare Metals, vol. 22, No. 2, Jun. 2003; pp. 107-111.
*Computing at the Speed of Light (Seminar)*; Bezjak; Apr. 2005; 45 pages.
*CWDM, Technology, Standards, Economics & Applications*; 2002; 26 pages.
*Dynamics of Extended-Cavity Semiconductor Lasers*; Web publication; Ramunno; 1999/2001; 5 pages.
*Detuned Loading Effect and High-Speed Modulation of Fiber Grating Semiconductor Lasers*; Fan; IEEE Photonic Technology Letters; 1998; pp. 1784-1786.
*Dynamic Wavelength Tuning Characteristics of the 1.5-μm Three-Section DBR Lasers: Analysis and Experiment*; Teshima; IEEE Journal of Quantum Electronics, vol. 31, No. 8; Aug. 1995; pp. 1389-1400.

*Dynamic Responses of Widely Tunable Sampled Grating DBR Lasers*; Lee; IEEE Photonic Technology Letters, vol. 8, No. 12; Dec. 1996; pp. 1597-1599.
*Design, Fabrication, and Performance of Infrared and Visible Vertical-Cavity Surface-Emitting Lasers*; Chow; IEEE Journal of Quantum Electronics, vol. 33, No. 10; Oct. 1997; pp. 1810-1824.
*Demonstration of a Semiconductor External Cavity Laser Utilising a UV Written Grating in a Planar Silica Waveguide*; Maxwell; The Institute of Electrical Engineers; 1994.
*Distributed Feedback Resonators*; Haus; Large-Scale Structures in Acoustics and Electromagnetics: Proceedings of a Symposium—Commission on Physical Sciences, Mathematics, and Applications; 1996; pp. 50-71.
*Double-Pass EA Modulator Array Monolithically Integrated with Passive-Waveguide*; Yamada; IEICE Transactions in Electronics; vol. E81-C, No. 8; Aug. 1998; pp. 1245-1250.
*Development of the Wavelength Locker with the High Temperature-Stability*; Sakai; Technical Report Paper; 2002; pp. 20-27.
*Design of Sampled Grating DBR Lasers with Integrated Semiconductor Optical Amplifiers*; Mason; IEEE Photonics Technology Letters; vol. 12. No. 7; Jul. 2000; pp. 762-763.
*Demonstration of a Semiconductor External Cavity Laser Using a UV Written Grating in a Planar Silica Waveguide*; Maxwell; Electronic Letters; vol. 30, No. 18; Sep. 1, 1994; pp. 1486-1487.
*Digitally Tunable Diode Laser*; Web Publication; Gutin; InterScience Inc. 1999; 1 page.
*Double-Ion-Exchange Process in Glass for the Fabrication of Computer-Generated Waveguide Holograms*; Saarinen; Applied Optics; vol. 33, No. 16; Jun. 1, 1994; pp. 3353-3359.
*Dispersion-Free Fibre Bragg Grating*; Ibsen; Optical Society of America; 2000; pp. MC1-1 through MC1-3.
*Design of Grating-Assisted Waveguide Coupler with Weighted Coupling*; Winick; Journal of Lightwave Technology; vol. 9, No. 11; Nov. 1991; pp. 1481-1492.
*Dopant Diffusion During Optical Fibre Drawing*; Lyytikainen; Optics Express; vol. 12, No. 6; Mar. 22, 2004; pp. 972-977.
*Dielectric Multilayered Interference Filters Deposited on Polymide Films*; Oguchi; Electronics Letters; vol. 27, No. 9; Apr. 25, 1991; 3 pages.
*Detection Reflections*; Espinasse; SPIE's OEMagazine; Mar. 2004; pp. 24-26.
*Definitions of Parameters 2001, CyOptics White Paper WP-011101-B*; 2001; 4 pages.
*Design and Fabrication of Highly-Dense Optical Components for In-Service Fiber Testing and Monitoring in Subscriber Loops*; Oguchi; IEICE Trans. Electron.; vol. E80-C, No. 1; Jan. 1997; pp. 123-128.
*A Diode-Pumped Channel Waveguide Laser Fabricated in Nd:Phospate Glass*; Patel; Fourteenth Topical Meeting on Optical Society of America Advanced Solid-State Lasers; Jan. 29, 1999; 5 pages.
*Design and Qualification of Hermetically Packaged Lithium Niobate Optical Modulator*; Moyer; IEEE Transactions on Components, Packaging, and Manufacturing Technology—Part B; vol. 21, No. 2; May 1998; pp. 130-135.
*Design Methodology for Guided-Wave Photonic Devices*; Yip; Chapter 13, Handbook of Photonics; CRC Press; 1997; pp. 530-587.
*ONS 15454 MSTP DWDM Networking Primer*; Web-Posted Presentation; Oct. 2003; 87 pages.
*Extremely Low Room-Temperature Threshold Current Density Diode Lasers Using InAs Dots in $In_{0.15}G_{0.85}$ Quantum Well*; Liu; Electronics Letters; vol. 35, No. 14; Jul. 8, 1999; 2 pages.
*The Expanded Mode Laser—A Route to Low Cost Optoelectronics*; Robertson; IEICE Trans. Electron.; vol. E80-C, No. 1; Jan. 1997; pp. 17-23.
*Electric Field Dependence of Optical Absorption Near the Band Gap of Quantum-Well Structures*; Miller; Physical Review B; vol. 32, No. 2; Jul. 15, 1985; pp. 1043-1060.
*Extended Tuning Range in Sampled Grating DBR Lasers*; Jayaraman; IEEE Photonics Technology Letters; vol. 5, No. 5; May 1993; pp. 103-105.
*External-Cavity Diode Lasers for Ultra-Dense WDM Networks*; Sykes; Lightwave; Mar. 2001; pp. 130-134.

*Electroabsorption in GaAs / AlGaAs Coupled Quantum Well Waveguides*; Islam; Appl. Phys. Lett. vol. 50, No. 16; Apr. 20, 1987; pp. 1098-1100.

*Electric-Field Dependence of Linear Optical Properties in Quantum Well Structures*; Miller; IEEE Journal of Quantum Electronics; vol. QE-22, No. 9; Sep. 1986; pp. 1816-1830.

Press Release: *E2O Communications Announces Breakthrough in 1310 nm-1550 nm Long-Wavelength VCSEL Technology; Technology Introduced at IEEE LEOS Post-Deadline Paper; Capable of Supporting CWDM and DWDM Wavelengths at Lowest Possible Cost*; PR Newswire; Nov. 4, 2003; 2 pages.

*Edge Emitting Lasers*; Web Publication; Dec. 6, 2000; 9 pages.

*Experimental Optimization of Double Ion-Exchange in Glass for Computer-Generated Waveguide Holograms*; Saarinen; SPIE vol. 1794; Integrated Optical Circuits II; 1992; 8 pages.

*Effect of Fabrication Errors in Channel Waveguide Bragg Gratings*; Coppola; Applied Optics; vol. 38, No. 9; Mar. 20, 1999; pp. 1752-1757.

*Effect of Ion Assisted Deposition on Optical Scatter and Surface Microstructure of Thin Films*; Al-Jumaily; J. Vac. Sci. Technol.; vol. A3 No. 3; May/Jun. 1985; pp. 651-655.

*The Effect of Polymer Architecture on the Aqueous Base Development of Phot resists*; Barclay; Polymer Preprintes—America; vol. 40, No. 1; 1999; pp. 438-439.

*Enhanced Photosensitivity in Lightly Doped Standard Telecommunication Fibre Exposed to High Fluence ArF Excimer Laser Light*; Malo; Electronics Letters; vol. 31. No. 11; May 25, 1995; pp. 879-880.

*Effects of Random Phase and Amplitude Errors in Optical Fiber Bragg Gratings*; Feced; Journal of Lightwave Technology; vol. 18, No. 1; Jan. 2000; pp. 90-101.

*Enhanced UV Photosensitivity in Boron Codoped GermanoSilicate Fibres*; Williams; Electronics Letters vol. 29, No. 1; Jan. 7, 1993; pp. 45-47.

*Erbium: Ytterbium Planar Waveguide Laser in Ion-Exchanged Glass*; Winick; SPIE vol. 2996; 1997; pp. 121-134.

*Engineering Properties of High Refractive Index Optical Gels for Photonic Device Applications*; Stone; Proceedings of the SPIE; vol. 3937; Micro- and Nano- Photonic Materials and Devices; Jan. 27-28, 2000; 13 pages.

*Fiberoptic Tutorial*; Lee; Web Publication of Nanoptics; Sep. 9, 2000; 8 pages.

*Fields in Extended Cavity Lasers*; Clarke; IEEE Journal of Quantum Electronics; vol. 34. No. 5; May 1988; pp. 833-411.

*Fiber-Grating External-Cavity Laser Diode Module for 2.5 Gb/s Dense WDM Transmission*; Takagi; ECOC'98, Madrid, Spain; Sep. 1998; pp. 81-82.

*Fiber-Grating Semiconductor Laser Modules for Dense-WDM Systems*; Kato; IEICE Trans. Commun; vol. E82-B; No. 2; Feb. 1999; pp. 409-411.

*Fiber-Grating Based WDM Transmitters for OC-48 Applications*; Verdiell; SPIE vol. 3038; pp. 67-77.

*Fibre Bragg Grating Fabrication Using Fluoride Excimer Laser for Sensing and Communication Applications*; Sun; Lasers for Science Facility Programme—Physics, Central Laser Facility Annual Report 2001/2002; pp. 147-149.

*Fabrication and Characterization of Graded Refractive Index Silicon Oxynitride Thin Films*; Callard; J. Vac. Sci. Technol.; A vol. 15, No. 4; Jul./Aug. 1997; pp. 2088-2094.

*Filter-Embedded Design and Its Applications to Passive Components*; Yanagawa; Journal of Lightwave Technology; vol. 7, No. 11; Nov. 1989; pp. 1646-1653.

*Fabrication of Tapered, Strain-Gradient Chirped Fibre Bragg Gratings*; Putnam; Electronics Letters; Feb. 16, 1995; vol. 31, No. 4; pp. 309-310.

*Fabrication of Buried Corrugated Waveguides by Wafer Direct Bonding*; Pelissier; Journal of Lightwave Technology; vol. 18, No. 4; Apr. 2000; pp. 540-545.

*Fine-Tuned Profile Simulation of Holographically Exposed Photoresist Gratings*; Zanke; Optics Communications 154; Aug. 15, 1998; pp. 109-118.

*Fabrication of Ridge Waveguides: A New Solgel Route; Fardad; Applied Optics*; vol. 37, No. 12; Apr. 20, 1998; pp. 2429-2434.

*FlexFilter Tunable Grating Filter*; Product Sheet of Bragg Photonics, Inc.; Sep. 2001; 2 pages.

*Coolerless Coaxial FP Laser Diode*; Data Sheet of Fitel; Feb. 15, 2002; 3 pages.

*Fermionics Lasertech Inc. Product Data Sheet*; Feb. 2, 2000; 3 pages.

*Fiber Grating Spectra*; Erdogan; Journal of Lightwave Technology; vol. 15, No. 8; Aug. 1997; pp. 1277-1294.

*Fabrication of Diffractive Optics: Surface Reliefs and Artificial Dielectrics*; Arnone; Diffractive Optics and Optical Mircosystems; 1997; pp. 119-131.

*Fabrication of Bragg Gratings in Silicon-on-Insulator Waveguides*; Subramanian; M.S. Thesis, Dept. of Electrical and Computer Engineering, University of Alberta; Sep. 19, 2002; 131 pages.

*Flip-Chip Approach to EndFire Coupling Between Single-Mode Optical Fibres and Channel Waveguides*; Hsu; Electronics Letters; vol. 12; Jul. 5, 1976 pp. 404-405.

*Finite-Element Full-Vectorial Propagation Analysis for Three-Dimensional z-Varying Optical Waveguides*; Montanari; Journal of Lightwave Technology; vol. 16, No. 4; Apr. 1998; pp. 703-713.

*FiberVista: An FTTH or FTTC System Delivering Broadband Data and CATV Services*; Wilson; Bell Labs Technical Journal; Jan.-Mar. 1999; pp. 300-322.

*A Design Concept of Fiber-Optic Wavelength-Division-Multiplexing Subscriber Loop Systems*; Miki; vol. 73, 1980; pp. 41-45.

*Gain and Linewidth Enhancement Factor in InAs Quantum-Dot Laser Diodes*; Newell; IEEE Photonics Technology Letters; vol. 11, No. 12; Dec. 1999; pp. 1527-1529.

*Grating-Assisted Coupling of Light Between Semiconductor and Glass Waveguides*; Butler; Journal of Lightwave Technology; vol. 16, No. 6; Jun. 1998; pp. 1038-1048.

*Generation of Ultrashort Electrical Pulses Through Screening by Virtual Populations in Biased Quantum Wells*; Chemla; Physical Review Letters; vol. 59, No. 9; Aug. 31, 1987; pp. 1018-1021.

*Grating Formation in a Germanium Free Silicon Oxynitride Fibre*; Dianov; Electronics Letters; vol. 33, No. 3; Jan. 30, 1997; pp. 236-238.

*Grating Formation in BGG31 Glass by UV Exposure*; Provenzano; Electronics Letters; vol. 35, No. 16; Aug. 5, 1999; pp. 1332-1334.

*Gratings Photowritten in Ion-Exchanged Glass Channel Waveguides*; Geraghty; Electronics Letters; vol. 35, No. 7; Apr. 1, 1999; pp. 585-587.

*Grating-Assisted Codirectional Coupler Filter Using Electro-Optic and Passive Polymer Waveguides*; Ahn; Optics Communications; vol. 197; Oct. 1, 2001; pp. 289-293.

*High-Performance Filters for Dense Wavelength Division Multiplex Fiber Optic Communications*; Pan; Web-Published White Paper of E-Tek Dynamics; 1999; 6 pages.

*Glass Waveguides by Ion Exchange: A Review*; Findakly; Optical Engineering; vol. 24, No. 2; Mar./Apr. 1985; p. 244-250.

*High-Speed Modular Testing Overcomes Challenges of Chirp*; Dickerson; WDM Solutions; Dec. 2001; 5 pages.

*High Reliability Non-hermetic 1.3 μm InP-Based Uncooled Lasers*; Chand; SPIE vol. 2610; Jan. 1996; pp. 46-57.

*Hybrid Sol-Gel Materials for Integration of Optoelectronic Components*; Fardad; Journal of Lightwave Technology; vol. 19, No. 1; Jan. 2001; pp. 84-91.

*High Temperature Operation with Low-Loss Coupling to Fibre for Narrow-Beam 1.3 μm lasers with butt-jointed selective grown spot-size converter*; Tohmori; Electronic Letters; vol. 31, No. 21; Oct. 12, 1995; pp. 1838-1840.

*High Stability Laser Sources*; Pan; Web-Published White Paper of E-Tek Dynamics; 1999; 6 pages.

*Hybrid Integrated Silicon Optical Bench Planar Lightguide Circuits*; Gates; 1998 Electronic Components and Technology Conference; 1998; pp. 551-559.

*High-Power Near-Diffraction-Limited External Cavity Laser, Tunable from 1030 to 1085 nm*; Morgott; Electronics Letters; vol. 34, No. 6; Mar. 19, 1998; pp. 558-559.

*Hybrid Integrated External Cavity Laser Without Temperature Dependent Mode Hopping*; Tanaka; Electronics Letters; vol. 35, No. 2; Jan. 21, 1999; pp. 149-150.

*High-Frequency Bragg Gratings in a Photothermorefractive Glass*; Efimov; Optics Letters; vol. 25, No. 23; Dec. 1, 2000; pp. 1693-1695.

*High Power Near Diffraction Limited External Cavity Single-Angled Facet Tapered Lasers, Tunable from 1.505 to 1.565 μm and 0.795 to 0.855 μm with High Spectral Purity*; Cho; Presentation Summary; IEEE; 1999; pp. 348-349.
*High Efficiency Coupling for High Aspect Ratio Laser Diodes*; Oleskevich; SPIE vol. 2610; Jan. 1996; pp. 246-254.
*High-Efficiency Continuous Surface-Relief Gratings for Two-Dimensional Array Generation*; Ehbets; Optics Letters; vol. 17, No. 13; Jul. 1, 1992; pp. 908-910.
*Hybrid Integration Optimizes PLC Module Design*; Shine; WDM Solutions; Nov. 2001; pp. 51-54.
*High-Efficiency Bragg Gratings in Photothermorefractive Glass*; Efimov; Applied Optics; vol. 38, No. 4; Feb. 1, 1999; pp. 619-627.
*Ion Beam Bombardment Effects During Film Deposition*; Special Series on Irradiation Enhanced Adhesion; Rossnagel; Vacuum; vol. 38, No. 2; 1988; pp. 73-81.
*Ion-Based Methods for Optical Thin-Film Deposition*; Martin; 1986; Chapman and Hall Ltd.; pp. 1-25.
*Ion-Assisted Deposition of Optical Thin Films: Low Energy Vs High Energy Bombardment*; NcNeil; Applied Optics; vol. 23, No. 4; Feb. 15, 1984; pp. 552-559.
*Ion-Beam-Assisted Deposition and Synthesis*; Rossnagel; MRS Bulletin; Feb. 16/Mar. 16, 1987; pp. 40-49.
*Ion-Exchanged Waveguide Lasers in $Er^{3+}/Yb^{3+}$ Codoped Silicate Glass*; Peters; Applied Optics; Nov. 20, 1999; vol. 38, No. 33; Nov. 20, 1999; pp. 6879-6886.
*Integrated Optic Laser Emitting at 906, 1057, and 1358 nm*; Malone; Electronics Letters; vol. 29, No. 8; Apr. 15, 1993; pp. 691-692.
*Integrated External Cavity Laser Composed of Spot-Size Converted LD and UV Written Grating in Silicia Waveguide on Si*; Tanaka; Electronics Letter; vol. 32, No. 13; Jun. 20, 1996; pp. 1202-1203.
*Infineon Accelerates 1310 nm VCSEL Production*; Web Publication of fibers.org; Jun. 9, 2003; 2 pages.
*Indium Phosphide Addresses 10-Gbits/s Metro Demand*; Volterra; Laser Focus World; Apr. 2002; 5 pages.
*Impact of Near-End Residual Reflectivity on the Spectral Performance of High-Power Pump Lasers*; Davis; IEEE Journal of Quantum Electronics; vol. 40, No. 4; Apr. 2004; pp. 354-363.
*Interference-Filter-Tuned, Alignment-Stabilized, Semiconductor External-Cavity Laser*; Zorabedian; Optics Letters; vol. 13, No. 10; Oct. 1988; pp. 826-828.
*Indium Phosphide-Based Optoelectronic Wavelength Conversion for High-Speed Optical Networks*; Hutchinson; Intel Technology Journal; vol. 8, Issue 2; May 10, 2005; pp. 161-171.
*Integrated-Optic Dispersion Compensator That Uses Chirped Gratings*; Brooks; Optics Letters; vol. 20, No. 4; Feb. 15, 1995; pp. 368-370.
*An Integrated PC-Based Characterization System for Optical Waveguides*; Singh; Rev. Sci. Instrum.; vol. 66, No. 3; Mar. 1995; pp. 2690-2694.
*Ion-Exchanged Waveguide Add/Drop Filter*; Geraghty; Electronics Letters; vol. 37, No. 13; Jun. 21, 2001; pp. 829-831.
In Situ *Laser Reflectometery Applied to the Growth of $Al_xGa_{1-x}$ As Bragg Reflectors by Metalorganic Chemical Vapour Deposition*; Electronics Letters; vol. 27, No. 2; Jan. 17, 1991; pp. 155-157.
*Ion-Beam Sputtering*; Itoh; Handbook of Thin Film Process Technology; IOP Publishing Ltd; 1995; pp. A3.3:1-A3.3:12.
*Interferometric Measurement of Refractive Index Change in Photosensitive Glass*; Dennis; Submitted Paper to Applied Optics Aug. 2000; 10 pages.
In Situ *Control of the Growth of GaAs/GaAlAs Structures in a Metalorganic Vapour Phase Epitaxy Reactor by Laser Reflectometry*; Azoulay; Journal of Crystal Growth; vol. 145; 1994; pp. 61-67.
*Ion Beam for Thin Films*; Sobie; Vacuum and ThinFilm; Apr. 1999; pp. 36-40.
*Indium Phosphide, What is Indium Phosphide*; Web Publication of CyOptics; 2001; 1 page.
*Insertion Loss Reduction Between Single-Mode Fibers and Diffused Channel Waveguides*; Albert; Applied Optics; vol. 27, No. 23; Dec. 1, 1988; pp. 4837-4843.
*Integrated Optical Components in Substrate Glasses*; Roβ; Glastech. Ber. 62 (1989) Nr. 8; pp. 285-297.
*Infineon's New Triplexer Delivers Both Digital Services and Analog Video in Fiber-to-the-X Applications*; Web Publication of Lightwave; Jun. 24, 2004; 2 pages.
*Intrinsic Bistability of Luminescence and Stimulated Emission in Yb- and Tm-Doped Glass*; Physical Review Letters; vol. 84, No. 9; Feb. 28, 2000; pp. 1898-1901.
*Ion-Exchanged Er/Yb Waveguide Laser at 1.5 μm Pumped by a Laser Diode*; Roman; Electron. Lett.; vol. 31, No. 16; 1995; pp. 1345-1346.
*Ion-Exchanged Tapered-Waveguide Laser in Neodymium-Doped BK7 Glass*; Hettrick; Optics Letters; vol. 25, No. 19; Oct. 1, 2000; pp. 1433-1435.
*Ion-Exchanged Glass Waveguides: A Review*; Ramaswamy; Journal of Lighwave Technology; vol. 6, No. 6; Jun. 1988; pp. 984-1001.
*Lasing Wavelength Changes Due to Degradation in Buried Heterostructure Distributed Bragg Reflector Lasers*; Mawatari; Journal of Lightwave Technology; vol. 17, No. 5; May 1999; pp. 918-923.
*Laser Arrays May Provide DWDM Measurement Tool*; Veasey; Laser Focus World; May 1999; 3 pages.
*Low-Cost Wavelength Stabilized Plug and Play Lasers for WDM Systems in Future Local Networks*; Helmers; Electronics Letters; vol. 37, No. 16; Aug. 2, 2001; pp. 1012-1014.
*Longitudinal Mode Competition in Chirped Grating Distributed Feedback Lasers*; Winick; IEEE Journal of Quantum Electronics; vol. 35, No. 10; Oct. 1999; pp. 1402-1411.
*Lens-Coupled Laser-Diode Module Integrated on Silicon Platform*; Nakagawa; Proceedings of SPIE; vol. 2610; 1996; pp. 59-64.
*Laser Frequency Stabilization by Means of Optical Self-Hetrodyne Beat-Frequency Control—A Tutorial*; Web Publication; Sep. 7, 2001; 12 pages.
*Loss in Low-Finesse Ti $LiNbO_3$ Optical Waveguide Resonator*; Regener; Applied Physics B 36; 1985; pp. 143-147.
*Laser-Induced Damage of Photo-Thermo-Refractive Glasses for Optical-Holographic-Element Writing*; Efimov; SPIE vol. 3578; Sep.-Oct. 1998; pp. 564-575.
*Loss Measurements in Thin-Film Optical Waveguides*; Weber; Applied Optics; vol. 12, No. 4; Apr. 1973; pp. 755-757.
*Laser Reflectometry* In Situ *Measurement of Lead Zirconate Titanate Film Growth*; Beaudoin; Applied Optics; vol. 36, No. 3; Jan. 20, 1997; pp. 655-657.
*Low Noise and Efficient Fibre Coupling Using a Multimode Fibre for Single Mode Applications*; Tice; 1992; 19 pages.
*Low-Loss Fiber-Matched Low-Temperature PECVD Waveguide With Small-Core Dimensions for Optical Communication Systems*; Hoffmann; IEEE Photonics Technology Letters; vol. 9, No. 9; Sep. 1997; pp. 1238-1240.
*Multichannel Wavelength Division Multiplexing with Photonic Crystals*; Sharkawy; Applied Optics; vol. 40, No. 14; May 10, 2001; pp. 2247.
*Mode Hopping Conrol and Lasing Wavelength Stabilization of Fiber Grating Lasers*; Hashizume; Furukawa Review; No. 20; pp. 7-10.
*Modification of Refractive Index in Silicon Oxynidride Films During Deposition*; Materials Letters; vol. 45; Aug. 2000; pp. 47-50.
*Multifrequency Laser with Reduced Intracavity Wave Mixing*; Doerr; IEEE Photonics Technology Letters; vol. 11, No. 6, Jun. 1999; pp. 635-637.
*Modeling Noise and Modulation Performance of Fiber Grating External Cavity Lasers*; Premaratne; IEEE Journal of Selected Topics in Quantum Electonics; vol. 3, No. 2; Apr. 1997; pp. 290-303.
*Metalorganic Vapor-Phase Epitaxial Growth of Vertically Well-Aligned ZnO Nanorods*; Park; Applied Physics Letters; vol. 80, No. 22; Jun. 3, 2002; pp. 4232-4234.
*MMI Multiplexer for Dual-Channel Erbium-Doped Waveguide Amplifiers*; Bakhtazad; Optics Express; vol. 9, No. 4; Aug. 13, 2001; pp. 178-183.
*Measurement of the Modal Reflectivity of an Antireflection Coating on a Superluminescent Diode*; Kaminow; IEEE Journal of Quantum Electronics; vol. OE-19, No. 4; Apr. 1983; pp. 493-495.
*Mechanical Reliability of Metallized Optical Fiber for Hermetic Terminations*; Bubel; Journal of Lightwave Technology; vol. 7, No. 10; Oct. 1989; pp. 1488-1492.
*Method of Fixing an Optical Fibre in a Laser Package*; Shaw; 2001 Electronic Components and Technology Conference; IEEE; 6 pages.

*Manufacture of Photonics Components with a Deep UV Laser Source at 255 nm*; Booth; Proceedings ICALEO; Paper M203; Laser Institute of America; 2001; 9 pages.
*Measuring the Group Delay Characteristics of Narrow-Band Devices by the Modulation Phase Shift Method*; Hernday; Applications Engineering White Paper; 2002; pp. 2-10.
*Magnetic Manipulation: Complex Magnetic Field Processing Leads to a New Class of Composite Materials*; Singer; Sandia Lab News; vol. 55, No. 22; Oct. 31, 2003; 2 pages (1 and 4).
*Novel and Improved Methods of Writing Bragg Gratings with Phase Masks*; Othonos; IEEE Photonics Technology Letters; vol. 7, No. 10; Oct. 1995; pp. 1183-1185.
*NECSEL in the Network / The NECSEL Advantage*; Web Publication of Novalux; Dec. 5, 2000; 3 pages.
*Neodymium-Doped Glass Channel Waveguide Laser Containing an Integrated Distributed Bragg Reflector*; Roman; Applied Physics Letters; vol. 61, No. 23; Dec. 7, 1992; pp. 2744-2746.
*Novel Chirped Fiber Grating Utilizing a Thermally Diffused Taper-Core Fiber*; Okude; OFC 96 Technical Digest; pp. 88-89.
*Novel Add/Drop Filters for Wavelength-Division-Multiplexing Optical Fiber Systems Using a Bragg Grating Assisted Mismatched Coupler*; Dong; IEEE Photonics Technology Letters; vol. 8, No. 12, Dec. 1996; pp. 1656-1658.
*Novel Design Procedure of Broad-Band Multilayer Antirefelection Coatings for Optical and Optoelectronic Devices*; Lee; Journal of Lightwave Technology; vol. 16, No. 5; May 1998; pp. 884-891.
*New Fibre Technologies for Long-Haul High Data-Rate Networks*; Dowdell; NOC 1999; 8 pages.
*Numerical Analysis of Eigenmodes and Splice Losses of Thermally Diffused Expanded Core Fibers*; Ohtera; Journal of Lightwave Technology; vol. 17, No. 12; Dec. 1999; pp. 2675-2682.
*Output Power Changes in Laser Diodes Subject to Sub-Wavelength Variations in External Cavity Length: Theory and Experiment*; Jones; IEEE; CWF80; Sep. 2000; 1 page.
*Over-40-GHz Modulation Bandwidth of EAM-Integrated DFB Laser Modules*; Kawanishi; MJ3-1; Optical Society of America; 2000; 3 pages.
*An Optical Add-Drop Multiplexer With a Grating-Loaded Directional Coupler in Silicia Waveguides*; Ofusa; IEICE Trans. Commun.; vol. E82-B, No. 8; Aug. 1999; pp. 1248-1251.
*Optical Frequency Division Multiplexed Transmission System Unified for Broadcasting and Communication Utilizing a Set of Fabry-Perot Etalons*; Tateda; IEICE Trans. Commun.; vol. E84-B, No. 1; Jan. 2001; pp. 120-123.
*Optical Feedback Phenomena in Semiconductor Lasers*; Petermann; Semiconductor Laser Conference; Sep. 19, 1994 pp. 8-11.
*Optical Properties of Photosensitive Fiber Phase Gratings*; Mizrahi; Journal of Lightwave Technology; vol. 11, No. 10; Oct. 1993; pp. 1513-1517.
*Optical Fibers With Depressed Claddings for Suppression of Coupling into Cladding Modes in Fiber Bragg Gratings*; Dong; IEEE Photonics Technology Letters; vol. 9, No. 1; Jan. 1997; pp. 64-66.
*Optoelectronic Properties of Semiconductor Lasers But-Coupled to Optical Fibers*; Andrekson; IEEE Journal of Quantum Electronics; vol. 24, No. 10; Oct. 1988; pp. 2039-2045.
*Optical Coatings for Laser Facets Fabricated by Reactive Ion-Beam Sputter Deposition*; Lorch; Annual Report 2001; Optoelectronics Department, University of Ulm; 2001; pp. 1-6.
*Product Data Sheets—Semiconductor Optical Amplifiers, Taper Lensed Fibres, and FP Lasers*; Web Publications of Opto Speed SA; Sep. 3, 2000; 12 pages.
*Specifications High Speed 1550 nm Tapered Fabry Perot-Laser*; Opto Speed Product Sheets; Sep. 20, 2001; 9 pages.
*Opto Speed High Temperature 10 Gb/s FP-Laser 1310 nm*; Product Data Sheet; Jun. 2000; 1 page.
*Specifications High Speed 1550 nm Distributed Feedback Laser*; Opto Speed Product Sheets; Aug. 2000; 4 pages.
*Specifications High Speed 1550 nm Fabry Perot Laser*; Opto Speed Product Sheets; Aug. 2000; 3 pages.
*Specifications Reflective Semiconductor Optical Amplifier RSOA*; Opto Speed Product Sheets; Aug. 2000; 6 pages.
*Optical Coupling and Alignment Tolerances in Optoelectronic Array Interface Assemblies*; Sutherland; IEEE; 1995; pp. 577-583.
*Optical Waveguide Amplifier in Nd-Doped Glass Written With Near-IR Femtosecond Laser Pulses*; Sikorski; Electronics Letters; vol. 36, No. 3; Feb. 3, 2000; 2 pages.
*Optoelectronic Packages for Integrated Sealing of Optical Fibers*; Velsher; Apr. 12, 2001; 10 pages.
*Optical Surface Mount Technology*; Uchida; IEICE Trans. Electron.; vol. E80-C, No. 1, Jan. 1997; pp. 81-87.
*Photosensitive Glass for Phase Hologram Recording*; Glebov; Glass Science and Technology; 71C; 1998; pp. 85-90.
*Photowritten Gratings in Ion-Exchanged Glass Waveguides*; Roman; Optics Letters; vol. 18, No. 10; May 15, 1993; pp. 808-810.
*Photosensitization of Optical Fiber and Silica-on-Silicon/Silica Waveguides*; Bilodeau; Optics Letters; vol. 18, No. 12; Jun. 15, 1993; pp. 953-955.
*Packaging of Electrically Switchable Tunable Tapered Lasers*; Cho; Part of SPIE Conference on Testing, Packaging, and Reliability; SPIE vol. 3626; Jan. 1999; pp. 240-245.
*Passive Aligned Hybrid Integrated WDM Transceiver Module Using Planar Lightwave Circuit Platform*; Okano; IEICE Trans. Electron.; vol. E80-C, No. 1; Jan. 1997; pp. 112-116.
*PLC-Type Hybrid External Cavity Laser Integrated With Fron-Monitor Photodiode on Si Platform*; Tanaka; Electronic Letters; vol. 37, No. 2; Jan. 18, 2001; pp. 95-96.
*Polymeric Tunable Optical Attenuator With an Optical Tap for WDM Transmission Network*; Lee; IEEE Photonics Technology Letters; vol. 11, No. 5; May 1999; pp. 590-592.
*Phase Response Measurement Technique for Waveguide Grating Filters*; Brooks; Applied Physics Letters; vol. 66, No. 17; Apr. 24, 1995; pp. 2168-2170.
*Postfabrication Wavelength Trimming of Fiber Bragg Gratings Written in $H_2$-Loaded Fibers*; Guan; IEEE Photonics Technology Letters; vol. 13, No. 6; Jun. 2001; pp. 591-593.
*Permanent Index Changes in Ge-$SiO_2$ Glasses by Excimer Laser Irradiation*; Nishii; Materials Science and Engineering; vol. B54; 1998; pp. 1-10.
*Polarization Independent Narrow Band Bragg Reflection Gratings Made With Silica-On-Silicon Waveguides*; Adar; Applied Physics Letters; vol. 60, No. 15; Apr. 13, 1992; pp. 1779-1781.
*Preliminary Results of a European Intercomparison of Group Delay Measurements of Fibre Bragg Gratings*; Wicks; Proceedings of OFMC '01 Conference; 2001; 4 pages.
*Polychromic Glasses-A New Material for Recording Volume Phase Holograms*; Glebov; Sov. Phys. Dokl.; vol. 35, No. 10; Oct. 1990; pp. 878-880.
*Photosensitive Glass Integrated Optical Devices*; Ainslie; Glass Integrated Optics and Optical Fiber Devices; Critical Reviews Vo. CR53; Sep. 1994; pp. 235-249.
*Polarisation-Independent Bragg Gratings in Ion-Exchanged Glass Channel Waveguides*; Geraghty; Electronics Letters; vol. 36, No. 6; Mar. 16, 2000; pp. 531-532.
*Polymer-Based Filters for DWDM Applications*; Eldada; OSA TOPS vol. 29 WDM Components; 1999; pp. 105-116.
*Polarisation Insensitive Arrayed-Waveguide Grating Multiplexers With Ion-Exchanged Waveguides in Glass*; Buchold; Electronic Letters Online No. 19961493; Oct. 9, 1996; 3 pages.
*A Polarization-Independent Distributed Bragg Reflector Based on Phase-Shifted Grating Structures*; Huang; Journal of Lightwave Technology; vol. 14, No. 13; Mar. 1996; pp. 469-473.
*A Polarization-Independent Grating Resonator*; Huang; IEEE Journal of Quantum Electronics; vol. 33, No. 5; May 1997; pp. 719-723.
*Plasma Enhanced Chemical Vapor Deposition Silicon Oxynitride Optimized for Application in Integrated Optics*; Worhoff; Sensors and Actuators; vol. 74, 1999; pp. 9-12.
*Packaging of Optical Fibre Bragg Gratings*; Psaila; 2001 Electronic Components and Technology Conference IEEE; 2001; 5 pages.
*Plasma Ion Assisted Deposition: Investigation of Film Stress*; Preprint of the Proceedings SPIE vol. 2776-23, presented in Glasgow May 1996; 5 pages.
*Photorefractive Effect in Annealed Proton-Exchanged $LiTaO_3$ Waveguides*; Fujiwara; IEEE Transactions on Automatic Control; vol. 5, No. 9; Sep. 1993; pp. 1062-1064.

*Polarization Insensitive Ion-Exchanged Arrayed-Waveguide Grating Multiplexers in Glass*; Buchold; Fiber and Integrated Optics; 1998; pp. 279-297.
*Planar Er:Yb Glass Ion Exchanged Waveguide Laser*; Vossler; Electronic Letters; Jul. 6, 1995; vol. 31, No. 14; pp. 1162-1163.
*Passive Optical Devices for Photonic Networks*; Hibino; IEICE Trans. Commun.; vol. E83-B; No. 10; Oct. 2000; pp. 2178-2190.
*Quadratic Electro-Optic Effect Dut to the Quantum-Confined Stark Effect in Quantum Wells*; Weiner; Applied Physics Letters; vol. 50, No. 13; Mar. 30, 1987; pp. 842-844.
*Quantum Confinement Observed in ZnO/ZnMgO Nanorod Heterostructures*; Park; Advanced Materials; vol. 15, No. 6; Mar. 17, 2003; pp. 526-529.
*Product Data Sheet of Quantum Photonics*; Mar. 3, 2000; 3 pages.
*Reduction of Waveguide Facet Reflection in Optical Hybrid Integrated Circuit Using Saw-Toothed Angled Facet*; Ogawa; IEEE Photonics Technology Letters; vol. 7, No. 1; Jan. 1995; pp. 44-46.
*Root-Locus Technique for Predicting the Stability of Laser Diodes with Optical Feedback*; Pierce; CWF81; Sep. 2000; Wednesday/227; 1 page.
*Relation Between Electroabsorption in Bulk Semiconductors and in Quantum Wells: The Quantum-Confined Franz-Keldysh Effect*; Miller; Physical Review B; vol. 33, No. 10; May 15, 1986; pp. 6976-6982.
*Room-Temperature Operation of InAs Quantum-Dash Lasers on InP (001)*; Wang; IEEE Photonics Technology Letters; vol. 13, No. 8; Aug. 2001; pp. 767-769.
*Reconstruction of Fiber Grating Refractive-Index Profiles From Complex Bragg Reflection Spectra*; Huang; Applied Optics; vol. 38, No. 21; Jul. 20, 1999; pp. 4494-4499.
*Rare-Earth-Doped Waveguide Lasers in Glass and $LiNbO_3$: A Review*; Winick; SPIE vol. 3280, Rare-Earth-Doped Devices II; Jan. 26-27, 1998; 16 pages.
*Spot-Size Converter Integrated Laser Diodes (SS-LDs)*; IEICE Trans. Electron.; vol. E80-C, No. 1; Jan. 1997; pp. 30-36.
*Spectral Characteristics for a Fiber Grating External Cavity Laser*; Cheng; Optical Quantum Electronics; vol. 32; 2000; pp. 339-348.
*Single-Mode Operation from an External Cavity Controlled Vertical-Cavity Surface-Emitting Laser*; Giudice; IEEE Photonics Technology Letters; vol. 11, No. 12; Dec. 1999; pp. 1545-1547.
*Single-Mode Operation of the External Cavity DBR Laser With Sol-Gel Waveguide Bragg Grating*; Beregovski; Optics Communications; vol. 164; 1999; pp. 57-61.
*Stability Analysis for Laser Diodes with Short External Cavities*; Schunk; IEEE Photonics Technology Letters; vol. 1, No. 3; Mar. 1989; pp. 49-51.
*Single-Longitudinal Mode Operation of a Semiconductor Laser Using a Metal Film Reflector Filter*; Dutta; IEEE Journal of Quantum Electronics; vol. QE-21, No. 6; Jun. 1985; pp. 559-562.
*Short-Cavity Distributed Bragg Reflector Laser With an Integrated Tapered Output Waveguide*; Chien; IEEE Photonics Technology Letters; vol. 3, No. 5; May 1991; pp. 418-420.
*Semiclassical Theory of the Many-Atom MicroLaser*; An; Journal of the Korean Physical Society; vol. 42, No. 4; Apr. 2003; pp. 1-13.
*Stability Regimes and High-Frequency Modulation of Laser Diodes With Short External Cavity*; Tager; IEEE Journal of Quantum Electronics; vol. 29, No. 12; Dec. 1993; pp. 2886-2890.
*Step-Wise Tunability of a DBR Laser With a Superimposed Fiber Grating External Cavity*; Adomat; Proceedings of OFC 2000; 2000; pp. TuL7-1 to TuL7-3.
*Simple Method to Evaluate Coupling Functions at Antireflection-Coated Diode Facets Facing Grating Reflectors of Long External Cavities*; Chen; IEEE Photonics Technology Letters; vol. 5, No. 10; Oct. 1993; pp. 1174-1176.
*Semiconductor Lasers for Coherent Optical Fiber Communications*; Koch; Journal of Lightwave Technology; vol. 8, No. 3; Mar. 1990; pp. 274-291.
*Shedding Light on Hybrid Optics: A Tutorial in Coupling*; Best; Optics and Photonics News; Feb. 1999; pp. 31-34.
*Strong Fiber Bragg Grating Fabrication by Hybrid 157- and 248-nm Laser Exposure*; Chen; IEEE Photonics Technology Letters; vol. 14, No. 2; Feb. 2002; pp. 170-172.
*Simple Measurement of Fiber Dispersion and of Chirp Parameter of Intensity Modulated Light Emitter*; Devaux; Journal of Lightwave Technology; vol. 11, No. 12; Dec. 1993; pp. 1937-1940.
*Sidelobe Suppression in Corrugated-Waveguide Filters*; Cross; Optics Letters; vol. 1, No. 1; Jul. 1977; pp. 43-45.
*A $SiCl_4$ Reactive Ion Etching and Laser Reflectometry Process for AlGaAs/GaAs HBT Fabrication*; Granier; Vacuum; vol. 47, No. 11; 1996; pp. 1347-1351.
*Sol-Gel Glass Waveguide and Grating on Silicon*; Najafi; Journal of Lightwave Technology; vol. 16, No. 9; Sep. 1998; pp. 1640-1646.
*Sputtering, the Versatile Coating Process*; Comello; R&D Magazine; May 1998; p. 71.
*A Study of the Growth Kinetics of II-VI Metalorganic Vapour Phase Epitaxy Using* In Situ *Laser Reflectometry*; Irvine; Journal of Crystal Growth; vol. 145; 1994; pp. 74-81.
*Silica-Based Planar Lightwave Circuits for WDM Systems*; Inoue; IEICE Trans. Electron.; vol. E80-C, No. 5; May 1997; pp. 609-618.
*Spot-Size-Converter Integrated Semiconductor Optical Amplifiers for Optical Switching Systems*; Tamanuki; IEICE Trans. Commun.; vol. E82-B, No. 2; Feb. 1999; pp. 431-438.
*Self-Alignment of Optical Fibers with Optical Quality End-Polished Silicon Rib Waveguides Using Wet Chemical Micromachining Techniques*; Rosa; IEEE Journal of Selected Topics in Quantum Electronics; vol. 5, No. 5; Sep./Oct. 1999; pp. 1249-1254.
*A Simple Laterally Tapered Waveguide for Low-Loss Coupling to Single-Mode Fibers*; Kasaya; IEEE Photonics Technology Letters; vol. 5, No. 3; Mar. 1993; pp. 345-347.
*Silica-On-Silicon Remains a Staple for Making Waveguides*; Caves; Laser Focus World; May 2001; pp. 219-223.
*SiON High-Refractive-Index Waveguide and Planar Lightwave Circuits*; Bona; IBM Journal of Research and Development; vol. 47, No. 2/3; Mar./May 2003; pp. 239-249.
*Silica-Based Single-Mode Waveguides on Silicon and Their Application to Guided-Wave Optical Interferometers*; Takato; Journal of Lightwave Technology; vol. 6, No. 6; Jun. 1988; pp. 1003-1010.
*Tapered Active Layer Laser Device Performance and Its Impact on Low Cost Optoelectronics*; Lealman; Lasers and Electro-Optics Society Annual Meeting 1995; 8th Annual Meeting Conference Proceedings; vol. 1; IEEE; Oct. 31, 1995; pp. 11-12.
*Theory of the Threshold Current of a Semiconductor Quantum Dot Laser*; Asryan; 1999; pp. 52-59.
*Tuning Fidelity of Acoustooptically Controlled External-Cavity Semiconductor Lasers*; Zorabedian; Journal of Lightwave Technology; vol. 13, No. 1; Jan. 1995; pp. 62-66.
*Theory, Design, and Performance of Extended Tuning Range Semiconductor Lasers With Sampled Gratings*; Jayaraman; IEEE Journal of Quantum Electronics; vol. 29, No. 6; Jun. 1993; pp. 1824-1834.
*A Tunable Femtosecond Modelocked Semiconductor Laser for Applications in OTDM-Systems*; Ludwig; IEICE Trans. Electron.; vol. E81 C, No. 2; Feb. 1998; pp. 140-145.
*Tunable Grating Coupled Surface-Emitting Tapered Laser*; Luo; IEEE Photonics Technology Letters; vol. 11, No. 9; Sep. 1999; pp. 1102-1104.
*Tapered Amplifier, Product Data Sheet of Eagleyard Photonics*; Jun. 17, 2003; 1 page.
*Tunable Fiber Bragg Grating Filters*; Iocco; PhD Thesis No. 2006; Laurea in Ingegneria Meccanica, Universita degli Studi di Brescia, Italie; 1999; 138 pages.
*Tapered Polymer Single-Mode Waveguides for Mode Transformation*; Fan; Journal of Lightwave Technology; vol. 17., No. 3; Mar. 1999; pp. 466-474.
*3D Photonic Integrated Circuits for WDM Applications*; Shakouri; SPIE; San Jose, CA; Jan. 1999; 24 pages.
*2-D Mode Tapering Via Tapered Channel Waveguide Segmentation*; Weissman; Electronic Letters; vol. 28, No. 16; Jul. 30, 1992; pp. 1514-1516.
*Thermal Management Challenges, Small ONU Enclosures*; White Paper of Marconi; May 2000; 9 pages.
*UV-Induced Surface-Relief Gratings on LiNbO3 Channel Waveguides*; Wu; IEEE Journal of Quantum Electronics; vol. 35, No. 10; Oct. 1999; pp. 1369-1373.
*UV Written Bragg Gratings in Tapered Waveguides, a Response Shaping Approach*; Berendt; IEEE; 1997; pp. 359-360.

*Understanding Monomode Optical Fibers*; Snyder; Proceedings of the IEEE; vol. 69, No. 1; Jan. 1981; pp. 6-12.
*Use of Laser Reflectometry for End-Point Detection During the Etching of Magnetic Thin Films*; Khamsehpour; Journal Vac. Sci. Technol.; A vol. 14, No. 4; Jul./Aug. 1997; pp. 2069-2073.
*UV-Curable Adhesives and Sealants for Optical Devices, Product Data Sheets*; Web Publication of NTT Advanced Technology; Jul. 25, 2001; 6 pages.
*Vertical Cavity Lasers for Telecom Applications*; Margalit; Web Publication; IEEE; 1997; 9 pages.
*Volume Diffractive Elements in Photosensitive Inorganic Glass for Beam Combining*; Glebov; SSDLTR 2001; 2001; 4 pages.
*Visualization of Grit Interactions During the Ductile to Brittle Polishing Transition*; Mindek; Society of Manufacturing Engineering; 2001; pp. 1-8.
*Wavelength Stable Uncooled Fibre Grating Semiconductor Laser for Use in an All Optical WDM Access Network*; Campbell; Electronic Letters; vol. 32, No. 2; Jan. 18, 1996; 2 pages.
*Wavelength Accuracy and Output Power of Multiwavelength DFB Laser Arrays With Integrated Star Couplers and Optical Amplifiers*; Zah; IEEE Photonics Technology Letters; vol. 8, No. 7; Jul. 1996; pp. 864-866.
*Waveguide Grating Filters for Dispersion Compensation and Pulse Compression*; Roman; IEEE Journal of Quantum Electronics; vol. 29, No. 3; Mar. 1993; pp. 975-982.
*WaveSelector, Gratings for DWDM Applications*; Web Publication of Bragg Photonics; Sep. 2001; 2 pages.
*A Widely Tunable Fiber Bragg Grating With a Wavelength Tunability Over 40 nm*; Set; MC4-1; Optical Society of America; 2000; 3 pages (MC4-1 through MC4-3.
*Wavelength Tunable Optical Add and Drop Multiplexer Utilising Coupled Semiconductor Waveguides and a Striped Thin-Film Heater*; Horita; Electronics Letters; vol. 34, No. 23; Nov. 12, 1998; pp. 2240-2241.
*Widely Tunable Integrated Filter/Receiver With Apodized Grating-Assisted Codirectional Coupler*; Jan; SPIE Photonics West '98, Paper No. 3290-232, San Jose, CA; Jan. 24-30, 1998; pp. 24-27.
*Wafer Scale Photonic-Die Attachment*; Zhou; 1997 Electronic Components and Technology Conference; IEEE; 1997; pp. 763-767.
*A Wide-Band Local Access System Using Emerging-Technology Components*; Linnell; IEEE Journal on Selected Areas in Communications; vol. SAC-4, No. 4; Jul. 1986, pp. 612-618.
*Waveguide Fabrication in $Nd^{3+}$ and $Yb^{3+}$ Doped Phosphate Glasses*; Patel; OSA TOPS; vol. 19; 1998; pp. 446-449.
*Ytterbium-Doped Glass Waveguide Laser Fabricated by Ion Exchange*; Florea; Journal of Lightwave Technology; vol. 17, No. 9; Sep. 1999; pp. 1593-1601.
*Yb/Er-Codoped and Yb-Doped Waveguide Lasers in Phosphate Glass*; Veasey; Journal of Non-Crystalline Solids 263 & 264; 2000; pp. 369-381.
*ZnO: Growth, Doping, and Processing*; Norton; Materials Today; Jun. 2004; pp. 34-40.
*1.3 µm High Performance FS-BH Laser Diodes With Waveguide Lens for Optical Access Network*, Takemoto; ICICE Trans. Electron.; vol. E80-C; No. 1; Jan. 1997; pp. 24-28.
*10 Gbit/S Directly-Modulated, High Temperature-Stability, External Fibre Grating Laser for Dense WDM Networks*; Timofeev; IEEE; 1998; pp. 360-361.
*85° C. Investigation of Uncooled 10-Gb/s Directly Modulated InGaAsP RWG GC-DFB Lasers*; White; IEEE Photonics Technology Letters; vol. 13, No. 8; Aug. 2001; pp. 773-775.
*100 GHz-Spacing 8-Channel Light Source Integrated With Gratings and LDs on PLC Platform*; Tanaka; OFC 2002; 2002; pp. 76-77.
*10km Transmission Using an Uncooled Be-Doped Fabry-Perot Laser With More than 100-Degree Operation Temperature Range*; Csutak; Optical Society of America; 2000; 3 pages.
*10Gbit/s Directly Modulated, High Temperature-Stability External Fibre Grating Laser for Dense WDM Networks*; Timofeev; Electronics Letters; vol. 35, No. 20; Sep. 30, 1999; pp. 1737-1739.
*1310-nm VCSEL Diode, Infineon*; Product Announcement Web Publication of Photonics Spectra; Aug. 2003; 1 page.

*100% Reflectivity Bragg Reflectors Produced in Optical Fibres by Single Excimer Laser Pulses*; Archambault; Electronic Letters; vol. 29, No. 5; Mar. 4, 1993; pp. 452-455.
*III-V Membrane Structures for Tunable Fabry-Perot Filters and Sensor Applications*; Hartnagel; IEEE; 1999 pp. 49-56.
*10-Gb/s Transmission of 1.55-µm Direct Modulated Signal over 100 km of Negative Dispersion Fiber*; Tomkos; IEEE Photonics Technology Letters; vol. 13, No. 7; Jul. 2001; pp. 735-737.
"*UV-Trimming of Fused Fiber Coupler Spectral Response: A Complete Model*," Xavier Daxhelet and Suzanne Lacroix, *IEEE Photonics Technology Letters*, vol. 10, No. 9, pp. 1289-1291, Sep. 1998.
"*The Effects of Silicon Nitride and Silicon Oxynitride Intermediate Layers on the Properties of Tantalum Pentaoxide Films on Silicon: X-Ray Photoelectron Spectroscopy, X-Ray reflectivity and Capacitance—Voltage Studies*," M. Passacantando, F. Jolly, L. Lozzi, V. Salerni, P. Picozzi, S. Santucci, C. Corsi, and D. Zintu, *Journal of Non-Crystalline Solids*, 332, pp. 225-232, 2003.
"*Tension Increase Correlated to Refractive-Index Change in Fibers Containing UV-Written Bragg Gratings*," P. Fonjallaz, H. Limberger, R. Salathe, R. Cochet, and B. Leuenberger, *Optics Letters*, vol. 20, No. 11, pp. 1346-1348, Jun. 1, 1995.
"*Synthesis of Silicon Oxynitride Layers by Dual Ion-Implantation and Their Annealing Behaviour*," A. Chauhan, G. Bhatt, A. Yadav, S. Dubey, and T. Rao, *Nuclear Instruments and Methods in Physics Research*, 212, pp. 451-457, 2003.
"*Synthesis and Physicochemical Characterization of Silicon Oxynitride Thin Films Prepared by RF Magnetron Sputtering*," L. Pinard and J. Mackawski, *Applied Optics*, vol. 36, No. 22, pp. 5451-5460, Aug. 1, 1997.
"*Characterization of Silicon Oxynitride Thin Films Deposited by Electron Beam Physical Vapor Deposition Technique*," K. Mohite, Y. Khollam, A. Mandale, K. Patil, and M. Takwale, *Materials Letters*, 57, pp. 4170-4175, 2003.
"*Plasma Enhanced Growth, Composition, and Refractive Index of Silicon Oxynitride Films*," M. Bose, D. Bose, and D. Basa, *Materials Letters*, 52, pp. 417-422, 2002.
"*Photo-Induced Refractive Index Change in Hydrogenated Amorphous Silicon Oxynitride*," H. Kato, M. Fujimaki, T. Noma, and Y. Ohki, *Journal of Applied Physics*, vol. 91, No. 10, pp. 6350-6353, May 15, 2002.
"*Mechanisms of Enhanced UV Photosensitivity Via Hydrogen Loading in Germanosilicate Glasses*," R. Atkins, P. Lemaire, T. Erdogan, and V. Mizrahi, *Electronics Letters*, vol. 29, No. 14, pp. 1234-1235 Jul. 8, 1993.
"*Large UV-Induced Negative Index Changes in Germanium-Free Nitrogen-Doped Planar $SiO_2$ Waveguides*," D. Wiesmann, J. Hubner, R. Germann, I. Massarek, H. Salemink, G. Bona, M, Kristensen, and H. Jackel, *Electronics Letters*, Vo. 34. No. 4, pp. 364-365, Feb. 19, 1998.
"*Infrared Ellipsometry Investigation of $SiO_xN_y$ Thin Films on Silicon*," A. Brunet-Bruneau, G. Vuye, J. Frigerio, F. Abeles, J. Rivory, M. Berger, and P. Chaton, *Applied Optics*, vol. 35, No. 25, pp. 4998-5004, Sep. 1996.
"*Influence of Hydrogen on SiON Thick Film for Silica Waveguide Deposited by PECVD and Annealing Effect*," Y. Kim, S. Cho, Y. Seo, H. Yoon, Y. Im, and D. Yoon, *Surface and Coatings Technology*, 173-174, pp. 204-207, 2003.
"*Growth of High-K Silicon Oxynitride Thin Films by Means of a Pulsed Laser Deposition-Atomic Nitrogen Plasma Source Hybrid System for Gate Dielectric Applications*," E. Desbiens and M. El Khakani, *Journal of Applied Physics*, vol. 94, No. 9, pp. 5969-5975, Nov. 1, 2003.
"*Densification Involved in the UV-Based Photosensitivity of Silica Glasses and Optical Fibers*," M. Douay, W. Xie, T. Taunay, P. Bernage, P. Niay, P. Cordier, B. Poumellec, L. Dong, J. Bayon, H. Poignant, and E. Delevaque, *Journal of Lightwave Technology*, vol. 15, No. 8, pp. 1329-1342, Aug. 1997.

"Characterization of Silicon Oxynitride Thin Films Deposited by Electron Beam Physical Vapor Deposition Technique," K. Mohite, Y. Khollam, A. Mandale, K. Patil, and M. Takwale, *Materials Letters*, 57, pp. 4170-4175, 2003.

"Optimization of PECVD Silicon Oxynitride Films for Anti-Reflection Coating," Y. Wang, X Cheng, Z. Lin, C. Zhang, and F. Zhang, *Vacuum*, vol. 72, Issue 3, pp. 345-349, Nov. 24, 2003.

"Silicon Oxynitride Rugate Filters Grown by Reactive Pulse Magnetron Sputtering," H. Bartzsch, S. Lange, P. Frach, and K. Goedicke, *Proceedings of the SPIE, Advances in Optical Thin Films*, vol. 5250, edited by C. Amra, N. Kaiser, and Angus Macleod, pp. 502-510, Feb. 2004.

"*Analysis of IBAD Silicon Oxynitride Film for Anti-Reflection Coating Application*," Y. Wang, X. Cheng, Z. Lin, C. Zhang, H. Xiao, F. Zhang, and S. Zou, *Journal of Non-Crystalline Solids*, vol. 33, pp. 296-300, Mar. 2004.

* cited by examiner

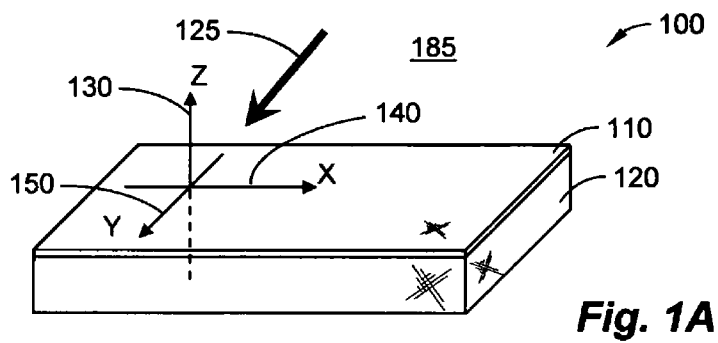
Fig. 1A
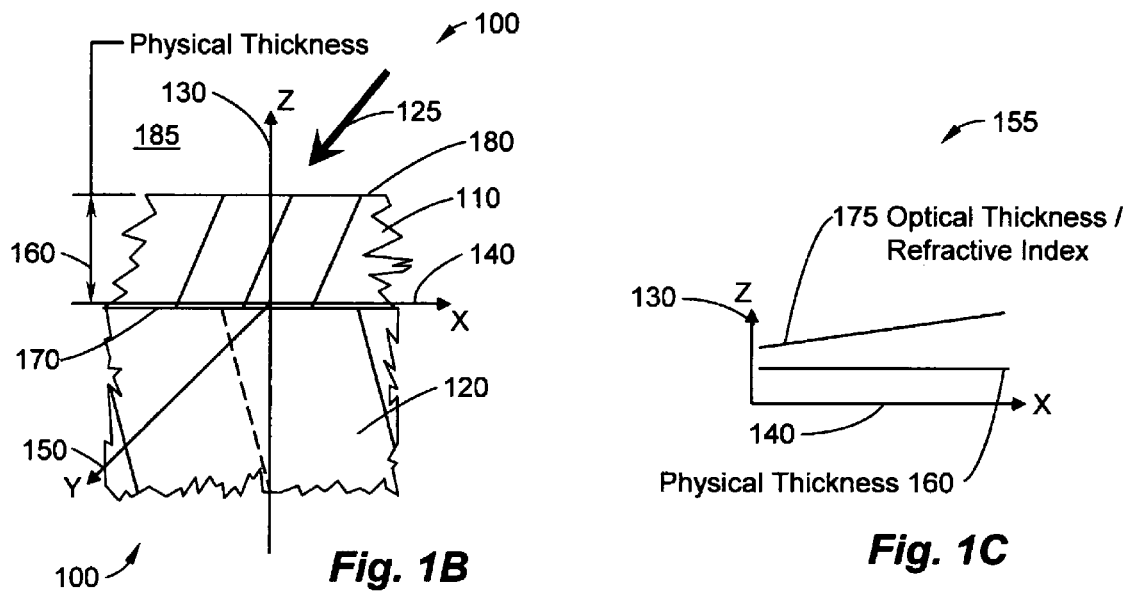
Fig. 1B
Fig. 1C
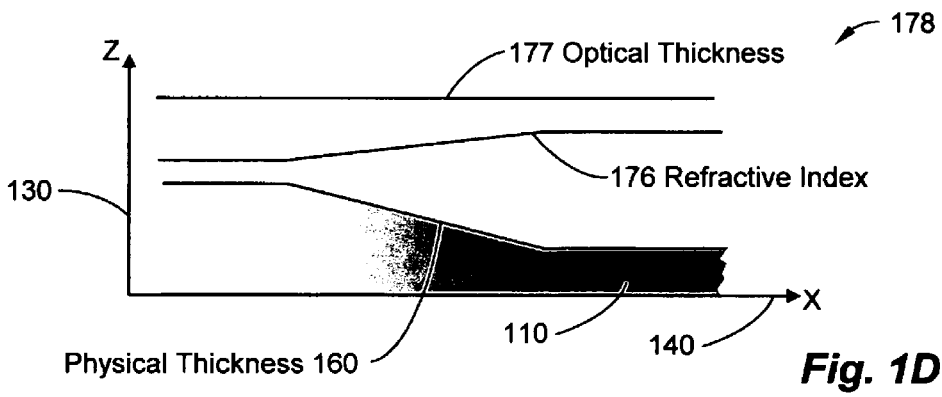
Fig. 1D

ADJUSTING OPTICAL PROPERTIES OF OPTICAL THIN FILMS

CROSS REFERENCE TO RELATED APPLICATIONS

This application claims the benefit of priority to U.S. Provisional Patent Application Ser. No. 60/570,258, entitled "Adjusting Optical Properties of Optical Thin Films," and filed May 12, 2004. The contents of U.S. Provisional Patent Application Ser. No. 60/570,258 are hereby incorporated by reference.

TECHNICAL FIELD

The present invention relates to optical devices and more specifically to adjusting an optical property, such as refractive index, of an optical thin film, thin film optical filter, or thin film optical system by an application of short-wavelength light energy or other energy.

BACKGROUND OF THE INVENTION

Optical thin films are useful for a wide range of optical applications such as antireflective ("AR") coatings, high-reflective ("HR") coatings, dielectric mirrors, and thin film interference filters. Compact size and environmental stability are two properties of optical thin films that have stimulated their deployment in modern applications including optical communications, lighting, vision, instrumentation, medical devices, and display systems. Optical thin films typically manipulate light by interference, which is an additive or subtractive process in which the amplitudes of two or more overlapping light waves systematically attenuate or reinforce one another. This interference can provide polarization, wavelength-selective transmission and reflection, beam splitting, or various other effects on a light beam, according to the design of the thin film and its interaction with adjacent features in an environment of an optical system.

Harnessing the interference phenomenon with an optical thin film relies on precise control of the optical thin film's physical dimensions and material properties. A slight variation in the thickness of an optical thin film can significantly impact the thin film's optical performance. Similarly, anomalies in an optical thin film's material can cause unwanted variation or degradation in optical performance. This susceptibility to performance variation usually imposes tight tolerances on a process, such as a vacuum deposition process, that fabricates optical thin films.

Vacuum deposition processes can be difficult to control to a level that is sufficient to produce consistent optical thin films for applications that require high performance. For example, the yield for fabricating twenty five gigahertz ("GHz") thin film band-pass filters for dense wavelength division multiplexing ("DWDM") can be low. In one technique for controlling a thin film deposition process, an optical instrument monitors the deposition process by observing the buildup of thin film material in a region of a deposition chamber. Relative to the total surface area of optical thin film generated in a deposition batch, the monitored region may be relatively small. While the monitored region of thin film may provide acceptable optical performance, the unmonitored regions may exhibit performance characteristics that are out-of-specification in relation to their spatial separation from the monitored region. In certain circumstances, the acceptability rate of the output of a thin film optical filter batch can be less than twenty-five percent. Since conventional processes for producing optical thin films typically lack a provision for adjusting an optical property of an optical thin film in a controlled fashion after deposition, optical filters that do not meet acceptability standards of optical performance are frequently discarded as scrap.

Optical thin films that meet performance specifications and that are not discarded as scrap are often deployed in optical systems as discrete components, wherein the optical thin film adheres to a substrate or is freestanding, for example supported only on its edges. As a deposition substrate, a plate of glass or other optical material provides an optical thin film with structural support that facilitates handling and placement into the optical system. Integrating an optical thin film into an optical component that passively or actively manipulates light provides an alternative configuration that can deliver two or more optical manipulations in a single, integrated component. This integration can reduce the total size of an optical system, improve reliability, and streamline assembly. Optical components that are compatible with integrated thin film optical filters or other optical thin films include lens, lasers, optical amplifiers, gradient index lenses, optoelectronic components, optical fibers, detectors, displays, and planar light guide circuits ("PLCs"), for example.

While offering certain benefits, depositing thin films onto such optical components often imposes tight tolerances upon the fabrication process of the optical thin film. The optical characteristics of conventional thin films are typically defined upon thin film formation. Those characteristics or properties are typically not readily modified following thin film formation in a controlled fashion by conventional processes. Thus, depositing an out-of-tolerance optical thin film on an optical component can result in discarding or scrapping the integrated unit. Scrapping integrated optical assemblies is problematic and wasteful as optical components are often expensive, and convention deposition processes frequently provide a low yield of optical thin films having acceptable or desirable optical performance. For example, depositing a stack of optical thin films onto an end face of an optical fiber combines a filter function with a waveguide function into a single, integrated optical element for which defective performance is undesirable.

As an alternative to depositing thin film filters onto fiber end faces, Bragg gratings can provide integrated filtering in waveguides such as optical fibers and PLCs. Such a Bragg grating comprises an undulated refractive index disposed in the path of light propagating in the waveguide. That is, the waveguide exhibits a periodic fluctuation in the refractive index of its core and/or surrounding cladding. The modal field of light guided in the waveguide interacts with that core or cladding material Illuminating a PLC or a fiber-optic waveguide with a pattern of ultraviolet ("UV") light corresponding to a desired refractive index undulation "writes" the Bragg grating into the waveguide. The term ultraviolet or UV, as used herein, refers the region of the electromagnetic spectrum or light spectrum having a wavelength shorter than approximately 450 nanometers. Etching a corrugated, surface relief pattern into the waveguide is an alternative approach to forming a Bragg grating in a waveguide. Conventional Bragg gratings have been etched into the surface of glass PLCs that have ion-exchanged waveguides. An overcoat of optical material such as silicon dioxide or silicon oxynitride environmentally seals the exposed grating and the waveguide to prevent contamination that can compromise optical performance of the system. Conventional uses for this PLC system include grating-based stabilization of external cavity lasers and grating-based optical add drop multiplexing ("OADM"). The optical properties of the etched and the UV-written type of Bragg gratings, in PLCs or in optical fibers, can be changed conventionally through exposure of UV light and/or thermal energy.

While the optical properties of conventional Bragg gratings are changeable via conventional methods after forming the primary grating features, Bragg gratings exhibit attributes that can be undesirable in many applications. Relative to thin film optical filters, Bragg gratings are often expensive and susceptible to optical drift resulting from temperature changes and other environmental influences. In comparison to the physical thickness of a thin film filter, light typically propagates through a long physical distance of a Bragg grating to achieve an acceptable level of light manipulation. Also, in a band-pass configuration, thin film filters typically provide more desirable optical performance characteristics than Bragg gratings offer. Furthermore, whereas Bragg gratings are ordinarily embedded in select optical materials that are amenable to the grating-generation process, thin films can be applied to a wide variety of optical materials, substrates, and components, with minimal impact on the substrate.

In addition to passive optical components such as optical fibers, optical thin films have been applied to the facets of optoelectronic components such as semiconductor gain media devices, including semiconductor lasers and semiconductor optical amplifiers ("SOAs"). Applying a HR coat to one facet of a Fabry-Perot laser and an AR coat to the opposite facet and placing a wavelength-selective reflector, such as a fiber Bragg grating, in front of the AR-coated facet can establish an external cavity laser system that emits monochromatic light in the format of a single longitudinal mode. The proper function of this external cavity laser system typically requires the AR coat to provide a high level of performance. That is, the AR coat should minimize the reflection of light from the facet to a level that does not degrade the optical performance of the laser system. Achieving a suitable level of suppression of the facet reflection based on conventional technology can be challenging. Exacerbating the problem, the refractive indices of most semiconductor gain media are significantly higher than air, the typical media surrounding the facet.

A conventional approach to applying an AR coating to a laser, SOA, or other semiconductor gain media, entails depositing AR thin film layers onto a batch of Fabry-Perot laser dies or similar components, for example in a bar form, in a deposition chamber. An electrical supply in the chamber may deliver current during the deposition process to one of the laser dies in the batch. Instrumentation coupled to the laser monitors the laser's active or dynamic response to the application of the AR coat, thus inferring the optical performance of the AR coat. An operator can adjust deposition parameters in the chamber during the deposition process in an attempt to maximize AR performance, by controlling the refractive index of one or more layers and/or controlling the thickness of one or more layers. This conventional process typically suffers from several drawbacks that adversely impact yield and AR performance. Due to deposition variations associated with the spatial position of each laser die in the chamber, the AR coating on the monitored laser die may differ from the AR coatings on the other laser dies in the batch. An undesirably large number of optical thin film layers may be needed to achieve a specified level of AR performance to overcome lack of refractive index control in each layer. Also, coating a laser die with an out-of-spec AR coat can result in scrapping or discarding the laser die, which is wasteful or financially undesirable.

While maintaining deposition consistency in a coating chamber is desirable for applications such as applying AR coats to laser dies, physical thickness variation can also be purposely introduced to a thin film during the deposition process. The thickness variation can cause a corresponding variation in the manner in which light interacts with the coat. Although optical thin films that have uniform optical properties in a dimension parallel to the surface of the optical thin film are suited to many applications, other applications benefit from thin films with optical properties that vary in this dimension.

An optical thin film system that exhibits a spectral performance that varies in a dimension perpendicular to the thickness of the optical thin film offers utility for certain optical system applications. For example, a thin film optical filter can have a pass band that varies in a graded manner along the plane of the filter. Positioning an array of optical-fiber-coupled gradient index lenses adjacent to the filter plane filters the light associated with each lens according to each lens's spatial position on the filter.

A conventional process for forming such a filter with graded spectral properties entails varying the deposition rate across the optical filter's substrate during the deposition process.

Grading the flux of particles across the substrate during the deposition process creates each thin film layer with a physical profile of varying thickness. That is, more deposited material yields greater physical thickness at various locations of each layer. A filter fabricated with this process has thin film layers of graded physical thickness. Since physical thickness of layers can correlate with the spectral position of a filter's pass band position, a graded physical thickness can yield a thin film optical filter that has different spectral properties at different physical locations on the filter.

This conventional approach to graded thin film filters has disadvantages for many applications. Since the spectral properties are defined in the deposition process, there is typically no provision for modifying those properties in a controlled manner after the deposition process is complete. Yield problems can result from inadequate control of the deposition process, for example. Also, the process typically produces thin films and thin film optical filters that have varying thickness, so the outer surface of such a thin film optical filter slopes relative to the substrate surface to which the stack of thin films adheres.

To address these representative deficiencies in the thin film art, what is needed is a capability for adjusting one or more optical properties of an optical thin film, such as an optical thin film in a thin film optical filter. Further a capability is needed to impart an optical thin film with a pattern, such as a refractive index or spectral pattern that varies in a graded fashion in a dimension parallel to the thin film's surface. Such capabilities would enhance the precision with which an optical thin film manipulates light and facilitate the cost-effective utilization of optical thin film technology in numerous applications.

SUMMARY OF THE INVENTION

The present invention supports adjusting an optical property of an optical film, such as an optical thin film. In an aspect of the present invention, an optical thin film can manipulate light that is incident upon at least one of the film's surfaces. That is, the optical thin film can manipulate light rays that are incident on the optical thin film parallel to or otherwise at an angle of less than 90 degrees with respect to the thickness of the optical thin film. The optical thin film can include a layer of material situated between two surfaces or interfaces at the boundaries of the optical thin film. These two surfaces, which can be abrupt surfaces or graduated material interfaces, can each reflect a portion of the light that is incident on the optical thin film. The reflected portions of light from each surface can interact or interfere with one another as wave phenomena, resulting in additive or subtractive interference.

In one aspect of the present invention, applying energy, such as thermal energy or ultraviolet light, to an optical thin film can adjust an optical property of the thin film and can alter at least some aspect of the optical thin film's interference of light. An application of energy can adjust the refractive index of the optical thin film or the speed that light propagates in the optical thin film. An energy application can also cause a change in the optical thickness of the optical thin film.

In another aspect of the present invention, a chemical, additive, moiety, or agent of an optical thin film can increase the sensitivity of the optical thin film to an application of ultraviolet light. The agent can be nitrogen, hydrogen, germanium, or other material. The composition of the optical thin film can include silicon dioxide and/or silicon oxynitride. The optical thin film can be a dielectric thin film.

In yet another aspect of the present invention, a method for fabricating an optical thin film can include producing at least one optical thin film layer in a deposition chamber. The resulting optical thin film layer can be a layer in an antireflective coating on a laser or other optical device or a layer in an optical filter. Exposing the layer to a dose of ultraviolet light can alter the refractive index of the optical thin film layer. Subjecting the layer to hydrogen can enhance, increase, heighten, stimulate, cause, or promote the layer's response to the dose.

In yet another aspect of the present invention, a thin film optical system, which can be a single thin film layer or a stack of optical thin film layers, can have a variation in an optical property along the plane of the layer. That is, a material of an optical thin film can exhibit a variation or a pattern in an optical property along a direction that follows the plane of the optical thin film or that is perpendicular to the thickness of the optical thin film.

In yet another aspect of the present invention, a thin film optical filter can reflect or transmit light based on the color or wavelength of light, which can be visible light or light that is outside the range of human visual perception. The thin film optical filter can have filtration characteristics that vary across the surface of the optical thin film. That is, the optical thin film can preferentially transmit or reflect one color of light in one spatial area of the filter and preferentially transmit or reflect another color of light in another spatial area.

The discussion of optical thin films presented in this summary is for illustrative purposes only. Various aspects of the present invention may be more clearly understood and appreciated from a review of the following detailed description of the disclosed embodiments and by reference to the drawings and claims.

BRIEF DESCRIPTION OF THE DRAWINGS

FIGS. 1A and 1B illustrate an optical thin film adhering to a substrate in accordance with an exemplary embodiment of the present invention.

FIGS. 1C and 1D illustrate plots of physical and optical properties of regions the optical thin film of FIGS. 1A and 1B in accordance with an exemplary embodiment of the present invention.

DETAILED DESCRIPTION OF EXEMPLARY EMBODIMENTS

Figure 2:
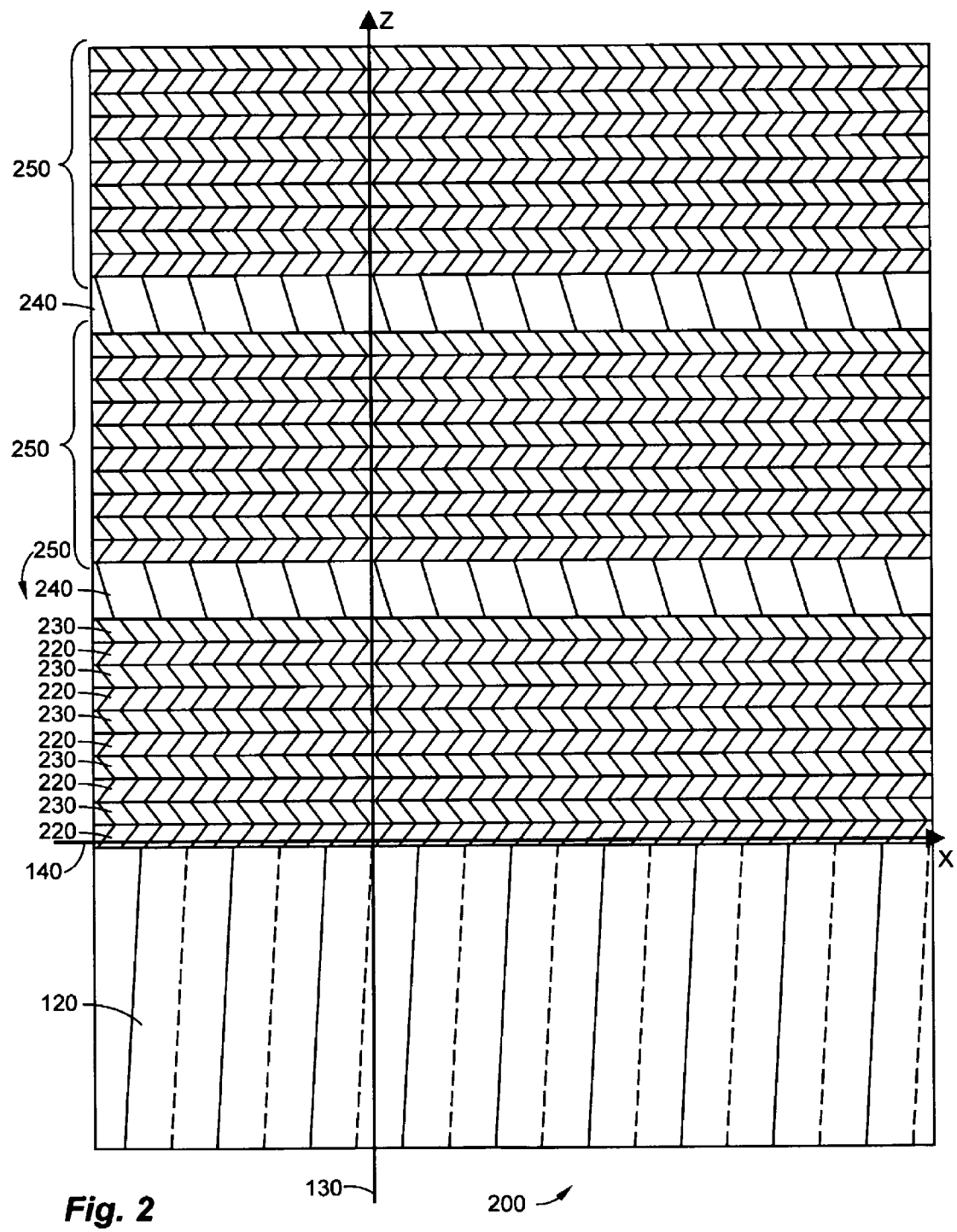
FIG. 2 illustrates a stack of optical thin films on a substrate in accordance with an exemplary embodiment of the present invention.

The present invention is directed to adjusting one or more optical properties of an optical thin film. Adjusting an optical property of an optical thin film can facilitate efficient and cost-effective fabrication of optical systems such as thin film optical filters that manipulate light based on thin film interference. An optical thin film adjustment can also create spatially specific optical properties or patterns in an optical thin film.

Turning now to discuss each of the drawings presented in FIGS. 1-27, in which like numerals indicate like elements through the several figures, an exemplary embodiment of the present invention will be described in detail.

FIGS. 1A and 1B illustrate a thin film optical system 100 having an optical thin film 110 adhering to a substrate 120 in accordance with an exemplary embodiment of the present invention. A Cartesian coordinate system, having an x-axis 140, a y-axis 150, and a z-axis 130, illustrates the relative orientation of the optical thin film 110 and substrate 120 in the optical system 110. The x-axis 140 and the y-axis 150 are parallel to the major surfaces 170, 180 of the optical thin film 110, while the z-axis 130 traverses the thickness 160 of the optical thin film 110. Those major surfaces 170, 180, whether planar or contoured in a non-planar form, can be referred to as faces of the optical thin film 110. That is, the z-axis 130 is perpendicular to the planar interface 170 between the optical thin film 110 and the substrate 120, while the x-axis 140 and the y-axis 150 lie in or along the plane of this interface 170.

The exemplary substrate 120 is a volume of optical material taking the form of a slab with a smooth planar surface 170 that adheres to the optical thin film 110. In this configuration, the substrate 120 provides mechanical support and physical stability for the optical thin film 110. Although FIG. 1 illustrates the optical thin film 110 in a planar configuration, the optical thin film 110 can alternatively have a contour, for example conforming to a convex, cylindrical, or concave surface of a lens or other surface, in accordance with exemplary embodiments of the present invention.

Functionally, a refractive index differential at the surface interface boundary 170 between the material of the optical thin film 110 and the material of the substrate 120 causes reflection of light 125 propagating through the thickness 160 of the optical thin film 110, generally along the z-axis 130. The outer surface 180 of the optical thin film 110, opposite the substrate interface 170, is also reflective to light 125 propagating through the thickness 160 of the optical thin film 110. The outer surface's reflectivity arises from the refractive index differential between the material of the optical thin film 110 and the surrounding media 185. That is, the inner surface 170 and the outer surface 180 of the optical thin film 110 individually reflect light 125 propagating through the thickness 160 of the optical thin film 110. The degree of reflectivity of each of these surfaces 170, 180 is a function of the refractive index differential at or across each surface 170, 180 and the angle of the incident light 125 relative to the z-axis 130 and other potential factors, such as the polarization of the light 125. The light 125 propagating through the optical thin film 110 may travel parallel with the z-axis 130. Alternatively, the light 125 may be incident on the optical thin film 110 at an angle, such as an acute angle, with respect to the z-axis 130.

In one exemplary embodiment of the present invention, the thickness 160 of the optical thin film 110 is less than approximately ten wavelengths of the light 125 that the optical thin film 110 is operative to manipulate. In one exemplary embodiment of the present invention, the thickness 160 of the optical thin film 110 is less than approximately five wavelengths of the light 125 that the optical thin film 110 is operative to manipulate. In one exemplary embodiment of the present invention, the thickness 160 of the optical thin film 110 is less than approximately three wavelengths of the light 125 that the optical thin film 110 is operative to manipulate. In one exemplary embodiment of the present invention, the thickness 160 of the optical thin film 110 is less than approximately one wavelength of the light 125 that the optical thin film 110 is operative to manipulate. In one exemplary embodiment of the present invention, the thickness 160 of the optical thin film 110 is approximately one fourth the wavelength of the light 125 that the optical thin film 110 is operative to manipulate. In one exemplary embodiment of the present invention, the thickness 160 of the optical thin film 110 is greater than approximately one nanometer and less than approximately ten microns.

The surrounding medium 185, which is in contact with the outer surface 180 of the optical thin film 110, can be a range of one or more gaseous, liquid, or solid materials. In one exemplary embodiment of the present invention, the medium 185 is space, essentially void of matter. That is, the thin film 110 can operate in a vacuum environment. In one exemplary embodiment of the present invention, the medium 185 is a gas, such as air, nitrogen, hydrogen, helium, oxygen, or a mixture of gases. In one exemplary embodiment of the present invention, the medium 185 is another optical thin film layer, such as a layer of a thin film interference filter. In one exemplary embodiment of the present invention, the optical thin film 110 adheres to this medium 185 as well as to the substrate 120. In one exemplary embodiment of the present invention, this medium 185 is a liquid such as water, optical matching gel, matching fluid, a biological fluid, or hydrocarbon. Such biological fluids can include blood, saliva, cerebral spinal fluid ("CSF"), secretions, urine, or milk, any of which can be either in a processed or a natural form. The medium 185 can also be glass, a plastic, a rubber, a composite, an inhomogeneous matrix, a resin, or an epoxy, any of which can be in a solid or viscous state. In addition to passive materials, the medium 185 can be an active material such as a semiconductor detector, optically active material, electrically active material, or optical gain medium. The medium 185 can also be a biological composition such as a matrix of cells, tissue, tumorous material, muscular tissue, for example. In general, the medium 185 is not limited to a specific material, or any of the materials or compositions discussed herein.

In one exemplary embodiment of the present invention, the medium 185 is sealed in a hermetic environment. The medium 185 can be the hermetic internal environment of an electronic, optical, or optoelectronic package, for example a receiver, transmitter, or receiver module for optical networking. In one exemplary embodiment of the present invention, the medium 185 resides in a sealed environment that is not hermetic, such as in a water-tight enclosure.

The refractive indices of the medium 185, the optical thin film 110, and the substrate 120 can shift temporarily in response to an environmental change such as stress or operating temperature or alternatively remain stable with minimal influence to such influences. In one exemplary embodiment of the present invention, one or more of these refractive indices can respond to a control, which can be, without limitation, an electrical, magnetic, optical, or electromagnetic field, signal, or wave.

Interference of light results from additive or subtractive interaction between reflection at the outer surface 180 of the optical thin film 110 and reflection at the inner surface 170 of the optical thin film 110. When these two reflections are in phase with one another, the amplitudes constructively add. Alternatively, when the reflections are out of phase with respect to one another, the amplitudes can destructively subtract. Such constructive and destructive interference can provide a wide assortment of optical effects. Exemplary effects include filtering, polarizing, and dispersing light, among others.

In one exemplary embodiment of the present invention, the operability of the optical thin film 110 to manipulate light 125 by thin film interference is a function of or is related to one or more of: the thickness 160 of the optical thin film 110 in relation to the wavelengths of manipulated light 125; the spatial relationship or physical separation between the outer surface 180 and the inner surface 170; the refractive indices of the substrate 120, the optical thin film 110, and the surrounding medium 185; the angle of the light 125 with respect to the z-axis 130; and the polarization of the light 125.

In one exemplary embodiment of the present invention, interference of the optical thin film 110 is operable to transmit light of specific wavelengths and reflect light that is not transmitted. In one exemplary embodiment of the present invention, the optical thin film 110 minimizes the reflectivity of light 125 incident on the substrate 120, effectively countering the tendency of the refractive index differential between the substrate 120 and the surrounding medium 185 to reflect light. This antireflective property can be either intentionally wavelength selective or operable across a purposely broad span of wavelengths. In one exemplary embodiment of the present invention, the optical thin film 110 generates or heightens reflectivity in the interface between these two media 120, 185.

In one exemplary embodiment of the present invention, the optical thin film 110 functions in a bidirectional manner, providing essentially equal manipulation of light 125 traveling in either a positive direction or a negative direction with respect to the z-axis 130. That is, the light 125 can travel through the optical thin film 110 either from the outer surface 185 to the inner surface 170 or from the inner surface 170 to the outer surface 185.

The optical thin film 110 in the exemplary optical system 100 illustrated in FIGS. 1A and 1B adheres to a substrate 120 that is a plate of optical material, such as glass, silica, sapphire, or silicon. In this configuration, supporting and stabilizing the optical thin film 110 is the primary function of the substrate 120, rather than manipulating light such as collimating, beam steering, or focusing light.

In another exemplary embodiment of the present invention, the substrate 120 is a component, such as a gradient index lens or an optical fiber, that provides light manipulation, such as collimating light or guiding light. Exemplary passive components that can be substrates include diffractive elements, holographic lenses, concave lenses, convex lenses, cylindrical lenses, Fresnel lens, PLCs, prisms, circulators, isolators, lens arrays, ball lenses, micro-optic components, nano-optic elements, planar micro-lens arrays, ion-exchanged components, displays, interconnects, crystals, lenslets, lenticulars, diffusers, micro-fluidic components, or other passive components known to those skilled in the art, according to exemplary embodiments of the present invention.

In addition to passive manipulation, the substrate 120 can actively manipulate light. That is, the substrate 120 can be a vertical cavity surface emitting laser ("VCSEL"), distributed feedback ("DFB") laser, SOA, erbium doped fiber amplifier ("EDFA"), erbium doped waveguide amplifier ("EDWA"), charge coupled device ("CCD"), light emitting diode ("LED"), avalanche photodiode ("APD"), indium gallium arsenide ("InGaAs") detector, optical modulator, germanium detector, sensor, or other active component known those skilled in the art, in accordance with exemplary embodiments of the present invention.

In one exemplary embodiment of the present invention, light travels in the optical thin film 110 along the plane of the optical thin film 110, rather than through the thickness 160 of the optical thin film 110 as illustrated in FIG. 1. That is, light can either propagate through the optical thin film 110 at an acute angle with respect to the z-axis 130 or through the optical thin film 110 generally parallel to the plane defined by the x-axis 140 and the y-axis 150. In one exemplary embodiment of the present invention, the optical thin film 140 waveguides light. In one exemplary embodiment of the present invention, the optical thin film 140 is etched, for example in an inductively coupled plasma ("ICP") process, to form a structure that waveguides light. This waveguide structure can provide single mode light propagation.

The thickness 160 of the optical thin film 140 can be of an appropriate dimension to support single mode propagation. Such thickness 160 is related to the wavelength of the single mode light and the refractive index differential between the optical thin film 110 and the surrounding materials 120, 185, which can function as waveguide cladding. The relationships between these parameters are well known to those skilled in the art and available to manipulate each parameter to generate specific optical effects. In one exemplary embodiment, the thickness 160 of the optical thin film 110 is approximately nine microns, and the mode field of the single mode light guided there through is approximately ten microns for a wavelength in the range of approximately 1310 to 1550 nanometers ("nm").

In one exemplary embodiment of the present invention, a silicon photonic device comprises the optical film 110. The film 110, which may be thin, thick, or of arbitrary thickness, and the silicon photonic device can be a monolithic structure or a unitary structure or multiple structures fastened/attached to one another. In such an embodiment, the film 110 can either conduct light though one or both of its faces 170, 180 or between/along those faces 170, 180 in a waveguide manner as discussed above. The silicon photonic device can comprise a lasing device that comprises silicon, a silicon optical amplifier ("SiOA"), a silicon-based modulator, an attenuator comprising silicon, a silicon-based detector, a silicon-based emitter, and/or an optically-pumped silicon amplifying device, to name a few examples. Manipulating or changing the refractive index of an optical film 110 of a silicon photonic device can manipulate or change the optical function, performance, or characteristics of that device, for example adjusting it to comply with a performance specification.

The eight documents listed immediately below disclose exemplary silicon photonic devices that can comprise an optical film, such as the optical film 110, whose optical properties can be adjusted using the technology, methods, processes, teachings, or invention(s) discussed herein. That is, according to exemplary embodiments of the present invention, the optical properties of the optical films or materials of the systems disclosed in the below eight documents can be adjusted to yield a corresponding performance adjustment in those systems. The films disclosed in those eight documents can be adapted to facilitate adjustment, for example by exposing the device's material to hydrogen to enhance UV sensitivity. Further, films or materials that are adjustable can be added to or integrated with the devices disclosed in those documents. The disclosures of the following eight documents are hereby incorporated by reference:

1) "*A Continuous-Wave Raman Silicon Laser*," by Haisheng Rong, Richard Jones, Ansheng Liu, Oded Cohen, Dani Hak, Alexander Fang, and Mario Paniccia, *Nature* 3346, 3/2/2005. Available at www.nature.com/nature and at www.intel.com.
2) "*An All-Silicon Raman Laser*," by Haisheng Rong, Ansheng Liu, Richard Jones, Oded Cohen, Dani Hak, Remus Nicolaescu, Alexander Fang, and Mario Paniccia, *Nature*, Volume 433, Jan. 20, 2005. Available at www.nature.com/nature and at www.intel.com.
3) "*Silicon Shines On*," by Jerome Faist, *Nature* Volume 433, Feb. 17, 2005. Available at www.nature.com/nature and at www.intel.com.
4) "*Continuous Silicon Laser, Intel researchers create the first continuous silicon laser based on the Raman effect using standard CMOS technology*," by Sean Koehl, Victor Krutul, and Mario Paniccia, published by Intel Corporation as a white paper, 2005. Available at www.intel.com.
5) "*Intel's Research in Silicon Photonics Could Bring High-speed Optical Communications to Silicon*," by Mario Paniccia, Victor Krutul, and Sean Koehl, published by Intel Corporation as a white paper, February 2004. Available at www.intel.com.
6) "*Silicon Photonics*," by Mike Salib, Ling Liao, Richard Jones, Mike Morse, Ansheng Liu, Dean Samara-Rubio, Drew Alduino, and Mario Paniccia, *Intel Technology Journal*, Volume 08, Issue 02, May 10, 2004. Available at www.intel.com (http://developer.intel.com/technology/ityindex.html).
7) "*Introducing Intel's Advances in Silicon Photonics*," by Mario Paniccia, Victor Krutul, Sean Koehl, published by Intel Corporation as a white paper, February 2004. Available at www.intel.com.
8) "*Intel Unveils Silicon Photonics Breakthrough: High-Speed Silicon Modulation*," by Mario Paniccia, Victor Krutul, and Sean Koehl, Technology@Intel Magazine, February/March 2004. Available at www.intel.com.

Referring now back to FIG. 1B, the optical thin film 110 can be operative to manipulate light 125 of various wavelengths regions. In one exemplary embodiment of the present invention, the optical thin film 110 manipulates visible light 125 between about 400 nm and about 700 nm. In one exemplary embodiment of the present invention, the optical thin film 110 manipulates light 125 in the near infrared region between about 700 nm and about 3500 nm. In one exemplary embodiment of the present invention, the optical thin film 110 manipulates light between about 700 nm and about 900 nm. In one exemplary embodiment of the present invention, the optical thin film 110 manipulates UV light 125. In one exemplary embodiment of the present invention, the optical thin film 110 manipulates light 125 at typical single-mode optical networking wavelengths, in the region between about 1200 nm and about 1750 nm. In one exemplary embodiment of the present invention, the optical thin film 110 manipulates light 125 in one or more spectral regions that provide low-loss transmission over optical fibers. Such low-loss spectral regions can be windows of low water absorption, such as about 1310 nm and about 1550 nm. The thickness 160 of the optical thin film 110 can be selected to provide specific manipulation effects of light 125 or electromagnetic radiation.

In one exemplary embodiment of the present invention, the optical thin film 110 is an element in a sensor system and is operative to guide light in a direction generally parallel to the x-y plane 140, 150. The outer surface 180 of the optical thin film 110 provides the sensing interface. Light propagating in the optical thin film 110 interacts with the medium 185 that is adjacent this sensing interface.

In one exemplary embodiment of the present invention, the optical thin film 110 is deposited in a deposition process, which can be ion plating, ion assisted deposition ("IAD"), ion sputtering, plasma assisted deposition, or magnetron sputtering. Ion plating can be carried out with evaporation and/or with plasma. The deposition process can be a vacuum process, conducted in a deposition chamber at a pressure of less than one atmosphere. These deposition processes can be reactive, for example reactive ion beam sputtering. Introducing nitrogen gas into the deposition chamber while sputtering silicon dioxide can form a film of silicon oxynitride in a reactive manner. Alternatively, a silicon target can be sputtered while introducing oxygen and nitrogen into the deposition chamber.

In one exemplary embodiment of the present invention, a physical vapor deposition ("PVD") process such as evaporation or sputtering forms the optical thin film 110. In one exemplary embodiment of the present invention, electron-beam ("e-beam") evaporation or dual e-beam evaporation forms the optical thin film 110. In one exemplary embodiment of the present invention, e-beam IAD beam ion assisted deposition forms the thin film. Reactive e-beam IAD can form the optical thin film by introducing nitrogen into the deposition chamber during e-beam IAD using a silicon dioxide target in a reactive process that can be a stoichiometric process.

In one exemplary embodiment of the present invention, direct current ("DC") sputtering or radio frequency ("RF")

sputtering forms the optical thin film 110, which can also be carried out in a reactive manner. The optical thin film 110 can also be formed with pulsed laser deposition. The optical thin film 110 can also be printed or spun on to a substrate 120 or formed with a sol gel process.

In one exemplary embodiment of the present invention, the optical thin film 110 is formed with epitaxial growth, such as liquid phase epitaxy ("LPE"), molecular beam epitaxy ("MBE"), vapor phase epitaxy ("VPE"). In one exemplary embodiment of the present invention, the optical thin film 110 is formed with a chemical vapor deposition ("CVD") process such as atmospheric pressure chemical vapor deposition ("APCVD"), low-pressure chemical vapor deposition ("LPCVD"), very low-pressure chemical vapor deposition ("VLPCVD"), plasma-enhanced chemical vapor deposition ("PECVD"), laser-enhanced chemical vapor deposition ("LECVD"), metal-organic chemical vapor deposition ("MOCVD"), or electron-cyclotron resonance chemical vapor deposition ("EPCVD"). The above list of processes for forming optical thin films 110 in accordance with various embodiments of the present invention is an exemplary, rather than an exhaustive, list.

Turning now to FIG. 1C, this figure illustrates a graph 155 with plots 155, 175 of physical and optical properties of a region of the optical thin film 110 of FIGS. 1A and 1B in accordance with an exemplary embodiment of the present invention. This graph 155 illustrates an exemplary variation of optical thickness 175, which is an exemplary optical property, along the plane of the optical thin film 110.

As illustrated in the plot 155, the physical, or geometric, thickness 160 of the optical thin film 110 is uniform along the x-axis 140. That is, the spatial separation 160 between the outer surface 180 and the inner surface 170 of the optical thin film 110 is essentially constant across the surface 170 of the substrate 120, which follows the plane of the x- and y-axes 140, 150. As described above, this physical thickness 160 can have a range of actual numerical values but is typically less than approximately five times the wavelength of the light 125 that the optical thin film 110 manipulates with thin film interference.

In addition to a physical thickness 160, the optical thin film 110 has an optical thickness 175 that is a function of the refractive index of the material of the optical thin film 110 and the geometric or physical thickness 160. The refractive index, or index of refraction, of a material is the speed of light in a vacuum divided by the speed of light in the material. Since light propagates more slowly in ordinary materials than in a vacuum, the refractive index of an ordinary material is greater than one, often between one and four. The optical thickness parameter 175 is physical thickness 160 multiplied by refractive index. The optical thickness 175 of a section of optical material, such as an optical thin film 110, is the material section's physical thickness 160 multiplied by the material section's refractive index. Since refractive index is greater than one for normal optical materials, a section of ordinary material typically has an optical thickness 175 that is greater than its corresponding physical thickness 160.

The plots 160, 175 of FIG. 1C illustrate a variation in the optical thickness 175 of the optical thin film 110 along the x-axis 140. Although the illustrated variation in optical thickness 175 is a linear variation, the variation can be nonlinear or conform to other patterns. That is, the optical thickness 175 of the optical thin film 110 varies uniformly from one value to another value between two spatial regions displaced along the x-axis 140.

The refractive index of the optical thin film 110 varies in correspondence to the variation of the optical thickness 175. That is, the refractive index of the thin film material varies across the surface of the optical thin film 110, thereby providing a gradient pattern of optical thickness 175.

The refractive index 175 of the material of the optical thin film 110 can also vary along the y-axis 150 (not illustrated in FIG. 1C). Alternatively, the optical thin film 110 can have a refractive index 175 that varies in the x-dimension 140 but is essentially constant in the y-dimension 150.

While the graph 155 illustrates a variation in optical thickness 175, this optical property is exemplary, and the present invention supports variations in other optical properties across the optical thin film 110. In one exemplary embodiment of the present invention, the optical thin film 110 provides a variation in the phase of light transmitted or reflected there through, such as a variable phase shift that is correlated to refractive index, across the surface of the optical thin film 110.

In one exemplary embodiment of the present invention, the refractive index of the optical thin film 110 varies along the z-axis 130 in addition to varying along the x-axis 140. For example the optical thin film 110 can be a layer in a rugate optical filter with a refractive index variation along the plane of the optical thin film 110. A rugate filter can have a blended interface between the thin film layers of the filter.

Turning now to FIG. 1D, this figure illustrates a graph 178 of physical and optical properties 160, 176, 177 of a region the optical thin film 110 of FIG. 1A in accordance with an exemplary embodiment of the present invention. This graph 178 illustrates an exemplary variation of physical thickness 160 along the plane of the optical thin film 110 and an offsetting variation in refractive index 176 corresponding to the physical thickness variation 160. The plot 178 is overlaid with a cross section view of the optical thin film 110, wherein the cross section is effectively the plot of physical thickness 160. The variation in physical thickness 160 can result from a manufacturing defect or an intentional slope, for example. Such slope in the physical thickness of the layers in a thin film optical filer is sometimes called "wedge" and can be problematic for imaging applications, such as Raman or fluorescence microscopy, that entail transmitting an image through the filter. While the slope in thin film physical thickness 160 can distort the image, wedge can be corrected by increasing or adjusting the refractive of the thin film layers in a pattern 176 that offsets the deviation in physical thickness 160.

The optical thickness 177 that results from the physical thickness profile 160 and the refractive index profile 176 is essentially uniform. That is, a region of the optical thin film 110 can have an unintentional slope in physical thickness 160 and an intentional refractive index variation 176 that offsets the optical effect of this geometric slope 160 and thereby provides a uniform optical thickness 177 along the direction of the geometric slope 160. Adjusting the refractive index 176 of a region of an optical thin film 110 that has an unintentional variation in physical thickness 160 facilitates compensating for manufacturing defects.

Turning now to FIG. 2, this figure illustrates a stack of optical thin films 220, 230, 240 on a substrate 120 in accordance with an exemplary embodiment of the present invention. The optical system 200 of the thin film stack and the substrate 120 can be a thin film optical filter, such as a DWDM filter or a laser-rejection filter for laser-Raman spectroscopy. As an optical filter, the optical system 200 can be a high pass filter, a low pass filter, a band pass filter, or a notch filter. Alternatively, the optical system 200 can provide gain compensation, gain flattening, chromatic dispersion compensation, group delay correction, spectrally selective delay in an optical network or other optical manipulation based on interference of light interacting with each of the thin film layers 220, 230, 240, the interfaces between these thin film layers 220, 230, 240, and the substrate 120. In one exemplary embodiment of the present invention, this optical system 200 is an element in a frequency locking system, such as an etalon-based "locker," for a telecommunication application. One or more of the thin film layers 220, 230, 240 in the stack has an adjusted optical property, such as refractive index.

The thin film layers 220, 230, 240 are deposited on a substrate 120. The substrate can be glass, BK-7 glass, silicate, fused silica, silicon, or other optical material that is generally transparent to the wavelengths of the light that the optical system 200 manipulates.

The stack includes thin film layers 220, 230 of alternating refractive index disposed face-to-face or adjacent one another. That is, the layers denoted with the reference number "220" are high refractive index, while the layers denoted with the reference number "230" are relatively low refractive index. In one exemplary embodiment of the present invention, the material compositions of the high refractive index layers 220 and the low refractive index layers 230 include tantalum pentoxide ($Ta_2O_5$) and silicon dioxide respectively. In one exemplary embodiment of the present invention, the composition of at least one of the layers 220, 230 includes silicon oxynitride. In one exemplary embodiment of the present invention, the composition of at least one of the thin film layers includes diamond, such as diamond-like carbon, magnesium fluoride ($MgF_2$), dielectric material, silicon, titanium dioxide ($TiO_2$), aluminum oxide ($Al_2O_3$) or other oxide. In one exemplary embodiment of the present invention, the composition of at least one of the thin film layers 220, 230 includes germanium (Ge). In one exemplary embodiment of the present invention, at least one of the alternating refractive index thin film layers 220, 230 is an essentially pure optical material. The packing density of the alternating refractive index layers 220, 230 is typically greater than 95 percent. The physical properties of these layers 220, 230 approach that of bulk material.

The stack of optical thin film layers 220, 230, 240 includes two spacer layers 240, thus providing a multi-cavity interference device. That is, the thin film stack includes a plurality of cavities that function as an etalon. The spacer layers 240 are each disposed between two banks 250 of layers 220, 230 of alternating, high-low refractive index material. In one exemplary embodiment of the present invention, the composition of one or more of the spacer layers 240 includes silicon dioxide or other dielectric material. In one exemplary embodiment of the present invention, the composition of one or more of the spacer layers 240 includes silicon oxynitride. In one exemplary embodiment of the present invention, the composition of one or more of the spacer layers 240 includes germanium and/or hydrogen. In one exemplary embodiment of the present invention, each of the spacer layers 240 is deposited as an essentially pure optical material. The packing density of the spacer layers 240 is typically greater than 95 percent. The physical properties of these layers 240 approach that of bulk material.

The adjusted optical property can be graduated along the x-axis 140 so that the optical property has one value at a first location along the x-axis 140 and another value at a second location along the x-axis 140. That is, the optical property can follow a profile or pattern along the plane of one or more layers 220, 230, 240. Alternatively, the adjusted optical property can be uniform along the x-axis 140. That is, the adjusted optical property can have essentially the same value along the x-axis 140. In one exemplary embodiment of the present invention, the adjusted optical property is refractive index of the material of one or more layers 220, 230, 240.

In one exemplary embodiment of the present invention, banks 250 of high-index layers 220 and low-index layers 230 are composed of tantalum pentoxide and silicon dioxide respectively and the spacer layers 240 are composed of silicon oxynitride. This configuration facilitates preferentially adjusting the refractive index of the spacer layers 240 with respect to the other layers 220, 230. In one exemplary embodiment of the present invention, the high index layers 220 are tantalum pentoxide; the low-index layers 230 are composed of magnesium fluoride; and the spacer layers 240 are composed of silicon oxynitride. Preferentially adjusting the refractive index of one or more spacer layers 240 in a thin film optical filter with respect to the other layers 220, 230 facilitates adjusting the optical properties of the filter in a controlled manner, for example tuning the center wavelength of a DWDM band-pass filter.

In one exemplary embodiment of the present invention, the layers 220, 230, 240 are formed with e-beam IAD. The high-index layers 220 and low-index layers 230 are composed of tantalum pentoxide and silicon dioxide and are deposited on an optical substrate 120 using tantalum pentoxide and silicon dioxide targets in sequence for each respective layer 220, 230. When the deposition process progresses to the spacer layer 240, the process activates the silicon dioxide target and adds nitrogen to the deposition chamber, thus forming a silicon oxynitride spacer layer that is more receptive to UV adjustments of refractive index than the other layers. After forming the silicon oxynitride spacer layer 240, the deposition process shuts off the nitrogen supply, eliminates the nitrogen from the deposition chamber, and returns to depositing silicon dioxide and tantalum pentoxide, with only minimal or trace concentrations of nitrogen in the high-index layers 220 and low-index layers 230 of the layer bank 250.

In one exemplary embodiment of the present invention, the stack of thin films 200 is a thin film optical filter or other multi-layer interference device and is formed by ion beam sputtering. At least one of the layers is composed of silicon oxynitride and is formed by dual ion beam sputtering. This silicon oxynitride layer can be represented as $SiO_xN_y$ and can have a pre-adjustment refractive index between approximately 1.5 and 2.0, depending on the relative values of "x" and "y."

Figure 3:
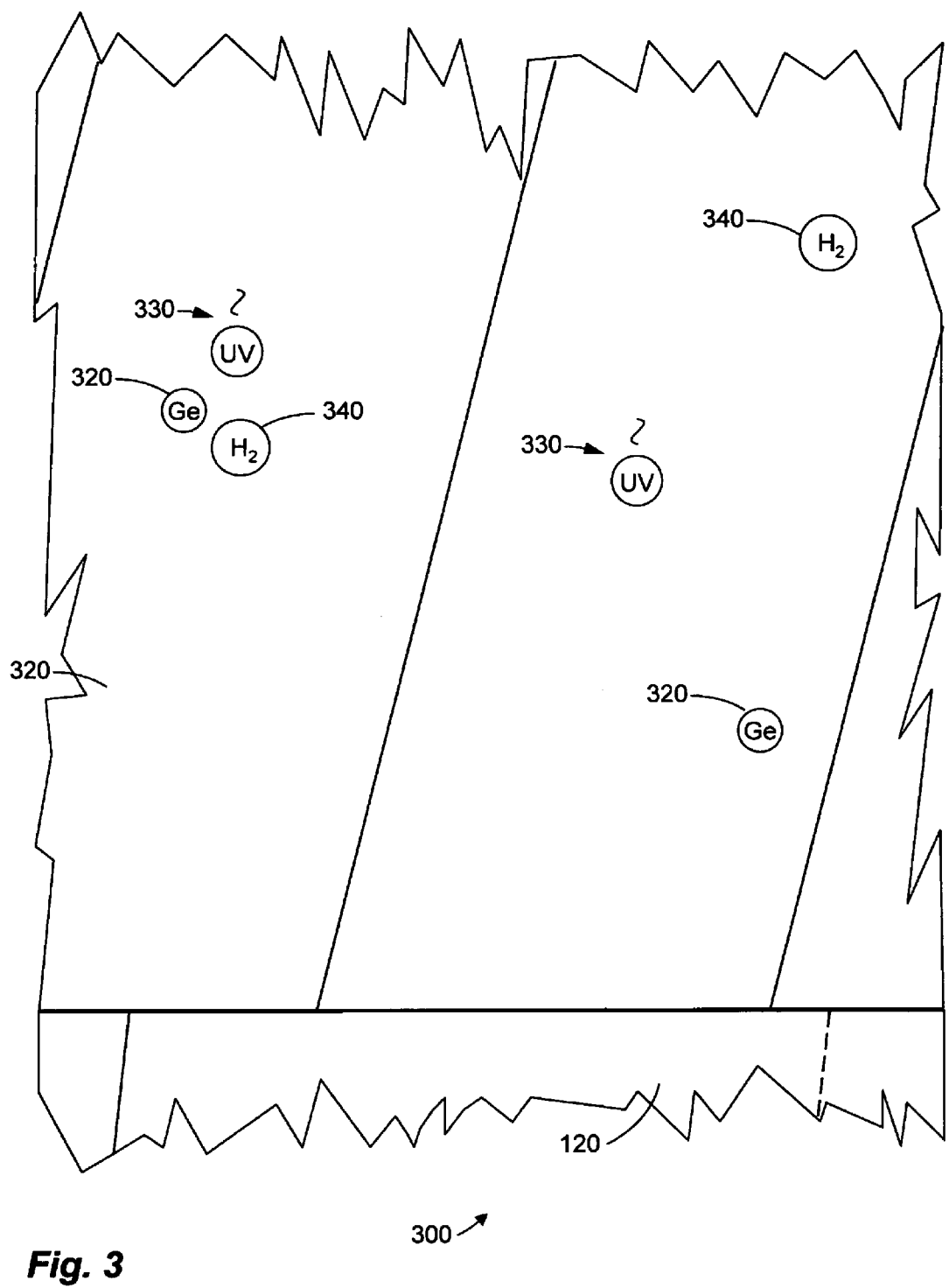
FIG. 3 illustrates an optical thin film undergoing an optical property adjustment in accordance with an exemplary embodiment of the present invention.

Turning now to FIG. 3, this figure illustrates an optical thin film 320 undergoing an optical property adjustment in accordance with an exemplary embodiment of the present invention. The optical thin film 320 of the optical system 300 adheres to a substrate 120, which facilitates handling and provides structural support for the optical thin film 320. The refractive index optical property of the optical thin film 320 responds to UV light 330 directed thereto. That is, exposing the optical thin film 320 to UV light 330 adjusts the refractive index of the optical thin film material.

The composition of the optical thin film 320 includes germanium (Ge) 320, silicon dioxide ($SiO_2$), and, in at least one phase of the refractive index adjustment process, hydrogen ($H_2$) 340 and UV light 330. The Ge can take the form of GeO (germanium monoxide) or $GeO_2$ (germanium dioxide), or a combination thereof. In one exemplary embodiment of the present invention, the composition of the optical thin film 320 is approximately equivalent to the composition of the core of standard, telecommunication-grade single-mode optical fiber, such as the optical fiber marketed by Corning Incorporated of Corning N.Y. under the product designation SMF-28. The composition is approximately three percent (3%) Ge—$O_2$ (one germanium atom—two oxygen atoms).

A four-stage process adjusts the refractive index of the optical thin film 320. The four stages are, at a high level, subjecting the optical thin film 320 to hydrogen 340, exposing the optical thin film 320 to 157-nm UV light 330, thermally annealing the optical thin film 320, and exposing the optical thin film 320 to 248-nm UV light 330.

The optical thin film 310 is exposed to hydrogen 340 in a vessel pressured to approximately 1900 pounds per square inch ("psi") for approximately five days. During this time, the hydrogen 340 diffuses into the optical thin film 310. The hydrogen exposure time for thicker optical thin films is typically longer than the exposure time for thinner optical thin films.

The area of the optical thin film 320 undergoing refractive index adjustment is exposed to a beam of UV light 330 from a 157-nm $F_2$ (fluorine) laser. Lambda Physik of Fort Lauderdale, Fla. supplies suitable lasers, such as the company's Lambda Physik 220 product line. The beam of 157 nm laser light 330 is approximately 20 mm by 2.45 millimeters. The beam can also be shaped to coincide with an intended pattern of refractive index adjustment.

Placing the optical thin film 320 in an argon-flushed vessel during the illumination process eliminates the potential for absorption of the UV illumination light 330 by transmission in air. In one exemplary embodiment of the present invention, the optical thin film 310 is exposed to UV illumination 330 while the optical thin film 310 is in a hydrogen environment, thus avoiding any out-diffusion loss of hydrogen 340 from the optical thin film 320 prior to UV-light exposure. The optical thin film 310 receives pulses of laser light 330 having approximately 15 nanoseconds duration, cycled at 10 to 100 Hertz ("Hz"), or cycles per second. The fluency is approximately 3 $mJ/cm^2$ (three milli-joules per centimeter squared).

Annealing the optical thin film 320 at approximately 150° C. (one hundred fifty degrees Centigrade) for approximately 24 hours drives off residual hydrogen 340 from the optical thin film material.

A second beam of laser light 330 of approximately 248 nm and approximately 400 $mJ/cm^2$ is applied to the optical thin film 320 for approximately five minutes. A KrF (krypton fluorine) laser emits the beam at approximately 20 Hz. GSI Lumonics, Inc. of Billerica Mass. supplies suitable lasers under the PULSEMASTER trade name.

The effect of the 248-nm exposure is related to the dosage of the 157-nm exposure. In one exemplary embodiment of the present invention, the optical thin film 320 is exposed to a total of approximately 12 $J/cm^2$ of the 157-nm light 330 and approximately 5 $kJ/cm^2$ of 248-nm light 330. In one exemplary embodiment of the present invention, the 157-nm exposure is between 200 and 300 $J/cm^2$ and is followed by an approximately 6-minute exposure to the 248-nm light 320. In one exemplary embodiment of the present invention, the optical thin film 320 is exposed to approximately 2100 $J/cm^2$ of 157 nm laser light 330.

In one exemplary embodiment of the present invention, the optical thin film 320 exhibits OH defects, such as Si—OH defects (not illustrated) or Ge—OH defects (not illustrated) following refractive index adjustment. Such defects can be nanometer-scale, for example smaller than 100 nm, 500 nm 1,000 nm, 10 microns, or in a range thereof. In one exemplary embodiment of the present invention, the optical thin film 320 includes oxygen deficient centers, which increase the index of refraction, as a result of a UV treatment. In one exemplary embodiment of the present invention, the optical thin film 320 includes Si—OH as a result of interaction between the infused hydrogen 340 or other agent and the dose of UV light 330. Thus, the film 320 can comprise nano-scale structures, features, centers, or particles uniformly dispersed throughout that are individually or collectively associated with instances or occurrences of the agent, the energy dose, and/or the refractive index change.

In one exemplary embodiment of the present invention, the optical thin film 320, with approximately 3% Ge—$O_2$ as described above, is deposited on the optical substrate 120 in a vacuum deposition process. In another exemplary embodiment of the present invention, the optical thin film 320 is grown on a silicon substrate 120. That is, the substrate 120 is silicon and the optical thin film 320 is composed of an oxide layer on the surface of the silicon.

In another exemplary embodiment of the present invention, the optical thin film 320 is formed by mechanically processing a boule or preform of optical fiber material. That is, the optical thin film 320 can be formed by processing a blank or rod of the fiber optic material that is ordinarily drawn into optical fiber in a process conducted in a drawing tower. The stock of fiber optic material can be temporarily attached, for example in a jig configuration, to a base substrate and ground down through mechanical grinding and polishing. Alternatively, the material can be thinned with chemical, plasma-based, ion-based etching conducted in a vacuum environment or ICP etching.

The compensation of the optical thin film 320 can have a specific concentration within a range of concentrations of Ge—$O_2$, for example between 0.25 percent and 15 percent. In one exemplary embodiment, the optical thin film 320 is essentially pure silicon dioxide, with only trace levels of Ge 320, prior to hydrogen treatment and UV exposure.

In one exemplary embodiment of the present invention, the optical thin film 320 includes boron and Ge 320. The boron is co-doped with approximately 12% Ge 320 in $SiO_2$.

In one exemplary embodiment of the present invention, a silicon dioxide optical thin film 320 composed of approximately 20 mole percent $GeO_2$ and approximately 2700 parts per million ("ppm") $Er^{+3}$ is dosed with 248 nm light 330 from a KrF excimer laser with a pulse duration of approximately 10 ns. Tuilaser AG of Munich Germany supplies a suitable laser under the product name Braggstar 500. The laser delivers approximately 12 mJ of energy at 200 Hz and a pulse fluence of approximately 180 $mJ/cm^2$. Exposing the optical thin film 320 to this light 330 in a dose lasting a time period in the range between approximately thirty seconds and approximately 10 minutes generates a refractive index adjustment. Shaping the beam from this laser with various lens configurations alters the intensity pattern of delivered light 330 and the resulting pattern of refractive index variation. In one exemplary embodiment of the present invention, this optical thin film 320 can be treated with hydrogen 340 prior to the dose of UV light 330.

Excimer lasers typically exhibit a relatively low coherence length and provide a high peak energy level, which in some circumstance can damage or stress an optical thin film 320. Other UV laser sources can be used to adjust the refractive index of an optical thin film 320. For example, a frequency doubled argon ion laser exhibits a higher coherence length and a lower peak power than is typical of excimer lasers. The relatively low peak power of such a laser can minimize the potential for the laser light to damage an optical thin film 320, by overheating, cracking, chipping, etc.

In one exemplary embodiment of the present invention, a silicon dioxide optical thin film 320 has approximately 15 mole percent $GeO_2$, 1.1 mole percent of Sn, and approximately 100 ppm of $Er^{+3}$. This codoped optical thin film 320 is subjected to a dose, measure, treatment, amount, or beam of 248 nm light 330 with a pulse duration of approximately 10 ns, delivering approximately 12 mJ at 200 Hz and a pulse fluence of approximately 180 mJ/cm2. The dose lasts approximately five to ten minutes, depending on the level of refractive index adjustment desired. In one exemplary embodiment of the present invention, this optical thin film 320 can be treated with hydrogen 340 prior to the dose of UV light 330.

In one exemplary embodiment of the present invention, a silicon dioxide optical thin film 320 has approximately 15 mole percent $GeO_2$, 5000 ppm of $Sn^{+3}$, and approximately 500 ppm of $Er^{+3}$. This optical thin film 320 is subjected to a dose of 248 nm light 330 with a pulse duration of approximately 10 ns, delivering approximately 12 mJ at 200 Hz and a pulse fluence of approximately 180 mJ/cm2. The dose lasts approximately five to ten minutes, depending on the level of refractive index adjustment desired. In one exemplary embodiment of the present invention, this optical thin film 320 can be treated with hydrogen 340 prior to the UV light treatment.

In one exemplary embodiment of the present invention, the thin film 320 illustrated in FIG. 3 is deposited on the substrate 120 as essentially pure silicon dioxide, which typically includes small quantities of silicon monoxide and various impurities. Placing the optical thin film 320 in a vessel having a hydrogen environment of approximately 2000 psi for three days loads the optical thin film 320 with hydrogen 340, which can act as a catalyst. The vessel includes a sapphire window that is transparent to UV light 330. A dose of UV light 330, transmitted through this window, interacts with the optical thin film 320 and adjusts the refractive index. The dose of UV light 330 can be delivered in a pulsed format or as a continuous beam. Annealing the optical thin film 320 in a vacuum or air environment following the UV treatment drives out residual hydrogen 340, stabilizes the refractive index, and avoids a significant, gradual index change over time when deployed in an application. Placing the optical thin film 320 in an oven having a temperature between approximately 150° C. and 500° C. can provide adequate annealing conditions.

In one exemplary embodiment of the present invention, the optical thin film 320 is composed of fused silica with a $GeO_2$ mole-fraction concentration between 0.12 and 0.16. In one exemplary embodiment of the present invention, the optical thin film 320 is composed of vacuum deposited silica with a $GeO_2$ mole-fraction concentration between 0.02 and 0.16. In one exemplary embodiment of the present invention, the $GeO_2$ mole-fraction concentration varies across the surface of the optical thin film 320 from a level that approaches zero to a level of approximately 2.0. In one exemplary embodiment of the present invention, the optical thin film 320 is composed of silicon dioxide with a $GeO_2$ mole-fraction concentration greater than 0.04.

In one exemplary embodiment of the present invention, the optical thin film layer 320 is composed of silicon oxynitride ($SiO_xN_y$) grown by a hybrid deposition based on the combination of pulsed laser deposition of silicon in an oxygen background together with a plasma based nitrogen source. Controlling the partial pressure of nitrogen with respect to oxygen in the deposition chamber controls the nitrogen content in the optical thin film 320.

In one exemplary embodiment of the present invention, the optical thin film 320 is produced by reactive magnetron sputtering of a silicon target in a variable mixture of oxygen and nitrogen, which are the reactive gasses. The resulting optical thin film 320 is composed of silicon oxynitride ($SiO_xN_y$). Adjacent optical thin film layers in a stack configuration as illustrated in FIG. 2 can comprise varying concentrations of oxygen and/or nitrogen, which impacts the refractive index. That is, the values of "x" and "y" in the $SiO_xN_y$ can vary in each layer. As such, the sensitivity or responsiveness of each layer to UV light 330 can also vary with this composition. In one exemplary embodiment of the present invention, the concentrations of silicon and nitrogen are graduated or smoothly varying along the thickness of the optical thin film 320. In this configuration, the optical thin film 320 can be a layer in a rugate filter and can be deposited in a single deposition chamber, without interruption of the plasma in the chamber.

In one exemplary embodiment of the present invention, the optical thin film 320 is amorphous silicon oxynitride with at most a trace level of Ge 320 deposited on a glass substrate 120 with electron beam physical vapor deposition ("EB-PVD") at a low temperature.

In one exemplary embodiment of the present invention, the optical thin film 320 is formed by reactive RF sputter deposition. Sputtering a silicon nitride target in an oxygen environment forms the optical thin film 320 with a composition of silicon oxynitride. Varying the flow rate of oxygen in the deposition chamber controls the refractive index of the optical thin film 320 between approximately 1.46 and 2.3. The RF power can be approximately 500 watts and the refractive index of the deposited material can vary in a linear manner with respect to the oxygen flow rate. With a sputtering gas having approximately ten percent (10%) oxygen and ninety percent (90%) argon, adjusting the gas flow rate between approximately nine standard cubic centimeters per minute ("sccm") and twenty one sccm can produce a corresponding and essentially linear control of refractive index between approximately 1.8 and 1.5.

In one exemplary embodiment of the present invention, the optical thin film 320 is a single-layer antireflective coating and has a composition of silicon oxynitride generated in an ion-beam sputter deposition system. Such film can be void of Ge 320. The optical thin film 320 can be a stoichiometric layer, formed in a reactive ion-beam sputtering process and having a high density and essentially no so-called columnar structures visible in scanning electron microscopy analysis. Such columnar structures, which are typically oriented along the thickness of imperfect optical thin films, are generally recognized in the art as being associated with physical defects or imperfections. The substrate 120 can be a semiconductor material including a semiconductor laser facet or an optical amplifier facet. After adjustment with UV light 330, the optical thin film 320 can impart a reflectivity of less than $10^{-4}$ to the facet. Alternatively, the optical thin film 320 can be a high reflective coating on a laser facet, for example on the back facet of a laser die or similar semiconductor amplifying device.

In one exemplary embodiment of the present invention, the optical thin film 320 is formed with a physical vapor deposition process based on RF sputtering, which can include dual frequency RF sputtering. Several options are available to control the refractive index of the optical thin film 320 during the deposition process. Adjusting the deposition temperature controls this refractive index so that an increase in deposition temperature can increase the refractive index of the optical thin film 320. Increasing the RF power applied to the target during the deposition process also can increase the refractive index. Adding a reactive gas to the sputtering chamber modifies the chemical composition of the deposited material of the optical thin film 320 and imparts the film 320 with a corresponding change in refractive index. Furthermore, using a target material in a specific oxidation state can control the refractive index of the optical thin film 320 during the deposition process. Following deposition, the optical thin film 120 can receive UV light 330, for example as a dose or at a measured level.

The RF sputtering method is also applicable to depositing pure materials and mixed materials including rare earth dopants. Adding a reducing gas such as hydrogen to the chamber while the optical thin film 320 is forming can increase the refractive index of this film 320, while refractive index can be decreased by adding an oxidizing gas such as oxygen. Replacing argon as the sputtering gas with approximately two percent (2%) hydrogen ($H_2$) in argon increase the refractive index by approximately two percent (2%) or more. In one exemplary embodiment of the present invention, a portion of this hydrogen remains in the optical thin film 320 after the deposition is complete and provides the hydrogen 340 that promotes refractive index adjustment by UV light 330.

Replacing a portion of the argon gas that is often present in RF sputtering environment with nitrogen can adjust the composition and refractive index of the optical thin film 320. For example replacing approximately thirty three percent (33%) of such argon with nitrogen while sputtering a silicon dioxide ($SiO_2$) target yields approximately seven percent (7%) increase in refractive index. An optical thin film 320 formed in this manner is believed to contain $SiO_xN_y$.

In one exemplary embodiment of the present invention, such nitrogen is introduced in the deposition chamber during the formation of a wave division ("WDM") filter, DWDM filter, or course wave division multiplexing ("CWDM") filter having layers of tantalum pentoxide and silicon dioxide. Injecting nitrogen into the chamber during the deposition of one or more silicon dioxide layers, such as a spacer layer in a multi-cavity filter causes those layers to contain $SiO_xN_y$. Evacuating the nitrogen from the chamber following formation of such layer minimizes the level of $SiO_xN_y$ in subsequent silicon dioxide layers.

In one exemplary embodiment of the present invention, a silicon monoxide (SiO) target is sputtered in an argon environment to produce an optical thin film 320 with a refractive index of slightly above 2. Altering the composition of the sputtering environment can lower the refractive index to approximately 1.75.

The Examples 1, 2, 3, and 4 below, which are not offered as limitations, further describe forming the optical thin film 320 based on a RF sputtering process in accordance with exemplary embodiments of the present invention. Additional details regarding these examples and forming the optical thin film using RF sputtering can be found in U.S. Pat. No. 6,506,289 to Demaray et al, issued on Jan. 14, 2003, the full disclosure of which is hereby incorporated by reference.

RF Sputtering Deposition Example 1, Deposition of $SiO_2$

An AKT 1600 series PVD production reactor (Applied Komatsu Technology, Santa Clara, Calif.) with modifications for RF application with ceramic tile targets can be used for RF sputter deposition of $SiO_2$. A wide-area target of dimension 550 mm by 650 mm is fabricated from four quartz tiles, each 4 mm thick, Corning code 9780 glass (Corning Inc. Elmira, N.Y.). The tiles are finished to a smooth surface, chemically cleaned, rinsed with hot deionized water, dried, and sputter coated with several microns of chrome. The chrome-coated sides are bonded to a thin plate of titanium. The titanium backing plate is prepared for bonding by bead blasting, chemical cleaning, and plasma coating with silicon. The tiles and the backing plate are heated to approximately 180° C., and regions are coated with a layer of liquid indium. The tiles are placed on the backing plate with separation less than about 0.02 inches between each tile and from the edges of the region exposed to plasma.

A 150 mm p-type silicon wafer substrate is placed in the center of a glass carrier sheet having dimensions of approximately 400 mm by 500 mm. A power level of approximately 800 watts is applied to the target at 13.56 MHz. A race-track shaped magnet of approximate dimension 150 mm by 600 mm is swept over the face of the target at a rate of 4 seconds per one-way scan, or equivalently 8 seconds per complete cycle. That is, the sweeping rate is approximately eight Hz. The substrate temperature is uniformly held at approximately 40° C. The sputter gas is essentially pure argon, for example 99.99999% argon, at a flow rate of 60 sccm. The target-to-substrate distance is approximately 6.5 cm. Deposition efficiency is approximately 0.8 angstroms-kW-seconds. Film thickness and index of refraction are measured at five equally spaced points over the full face of the wafer using a FilmTek 4000 interferometer, which is available from Scientific Computing International of Carlsbad, Calif. The refractive index of the resulting optical thin film 320 at 1550 nm can be 1.437998, plus or minus approximately 0.001297 (0.09%). Physical thickness 160 of this optical film 320 can be approximately 9227.66 nm with a non-uniformity of approximately 6.8%. Table 1 presents exemplary results of this exemplary process in the "A" row.

RF Sputtering Deposition Example 2, Deposition of $SiO_2$ with Index Modification $SiO_2$ films can be deposited by processes analogous to that described in RF Sputtering Deposition Example 1 above, varying deposition temperature, applied power, and process gas. Exemplary results are tabulated in Table 1 below.

TABLE 1

$SiO_2$ Thickness and Refractive Index as a Function of Deposition Conditions

| Exemplary Entry | Power (watts) | Temp. ° C. | Sputter Gas/ Flow (sccm) | Refractive Index (1550 nm) * | Physical thickness (nm) (% nonuniformity) |
|---|---|---|---|---|---|
| A | 800 | 40 | Ar/60 | 1.437998 (0.001297) | 9227.66 (6.8%) |
| B | 800 | 150 | Ar/60 | 1.440923 (0.001979) | 3133.25 |
| C | 800 | 400 | Ar/60 | 1.450126 (0.000726) | 9295.86 (4.8%) |
| D | 1200 | 150 | Ar/60 | 1.448610 (0.000976) | 9200 |
| E | 800 | 150 | 2% $H_2$ in Ar/60 | 1.462198 (0.001809) | 1287.15 |
| F | 800 | 150 | $N_2$/20, Ar/40 | 1.580249 (0.008346) | 608.87 |
| G | 1400 | 150 | $N_2$/20, Ar/40 | 1.548439 (0.006499) | 2354.80 |
| H | 800 | 400 | Ar/60 | 1.450036 (0.000702) | 9295.84 (4.8%) |

* Tables 1, 2 and 3 list exemplary standard deviations for the refractive indices.

In exemplary embodiments of the present invention corresponding to the exemplary entries in these tables, the refractive indices those entries can be adjusted after the deposition steps are complete to improve the refractive index standard deviation. This refractive index adjustment can proceed with the application of a dose of UV light 330 or other energy in accordance with one or more of the post-deposition adjustment processes described herein. That is, the variation in the refractive index of a sample, produced with the RF processes discussed in Examples 1, 2, 3, and 4 can be reduced after the thin film 320 is formed in the deposition chamber, for example after the film 320 is removed from the chamber.

In exemplary embodiments of the present invention corresponding to the exemplary entries in Table 1, the optical thickness of one or more of the optical thin films described in the entries is adjusted to compensate for the listed variation in physical thickness 320. That is, post-deposition adjustment of the refractive index of the optical thin film 320 in one or more areas having a deviation in physical thickness 160 provides an optical thickness that is more uniform, smooth, flat, or uninterrupted than the physical thickness 160.

RF Sputtering Deposition Example 3, Deposition of SiO and Erbium Doped SiO

Target tiles of SiO can be prepared from a powder of SiO by low temperature isostatic pressure. The tiles are cut and bonded to a backing plate. Mixed oxide tiles used to deposit erbium doped SiO are prepared by mixing powdered $Er_2O_3$ and SiO in a ratio of 2 molar cation percent erbia. SiO and Er doped SiO films are deposited in a similar manner as described in Examples 1 and 2 above. Exemplary refractive index and physical thickness 160 are tabulated for SiO in Table 2 and for Er doped SiO (SiO:Er) with an Er concentration of approximately $2 \times 10^{20}$ Er atoms/cm$^3$, (erbium atoms per cubic centimeter) in Table 3.

TABLE 2

SiO Thickness and Refractive Index as a Function of Deposition Conditions

| Exemplary Entry | Power (watts) | Temp. °C. | Sputter Gas/ Flow (sccm) | Refractive Index (1550 nm) * | Physical thickness (nm) (% non-uniformity) |
|---|---|---|---|---|---|
| J | 1000 | 150 | Ar/60 | 2.084500 | 691.78 |
| K | 1000 | 150 | N$_2$/10, Ar/50 | 1.736693 | 1000.96 (0.010250) |
| L | 1000 | 150 | N$_2$/25, Ar/50 | 1.740680 | 770.08 |

TABLE 3

SiO:Er Thickness and Refractive Index as a Function of Deposition Conditions

| Exemplary Entry | Power (watts) | Temp. °C. | Sputter Gas/ Flow (sccm) | Refractive Index (1550 nm) * | Physical thickness (nm) (% non-uniformity) |
|---|---|---|---|---|---|
| M | 1000 | 150 | Ar/60 | 2.132870 | 791.35 |
| N | 1000 | 150 | N$_2$/10, Ar/50 | 1.740480 | 1501.04 (0.017838) |
| O | 1000 | 150 | N$_2$/25, Ar/50 | 1.750910 | 1400.11 |
| P | 1000 | 150 | N$_2$/50, Ar/25 | 1.792790 | 786.78 |
| Q | 800 | 400 | O$_2$/3, Ar/57 | 1.454825 | 1159.50 (0.005425) |

RF Sputtering Deposition Example 4, Single and Dual Frequency RF Sputter Deposition of Silica An AKT 1600 series PVD production reactor and wide area target as described in Example 1 can be used to create optical thin films 320 following Example 4. Exemplary high frequency (13.56 MHz) and low frequency (about 350 kHz) process powers are listed along with surface roughness and refractive index (RI) of the deposited optical thin films 320 tabulated Table 4 below. Depositions are conducted at Ar flow rates of 40 sccm and at or near room temperature, except as noted below. Refractive index at a wavelength of 1.5 microns can measured using a Film Tek 4000 instrument. Average surface roughness, $R_a$, can be characterized via Atomic Force Microscopy ("AFM") measurements using a NanoScope III 5000 instrument (Digital Instruments, Veeco Metrology Group, Santa Barbara, Calif.).

TABLE 4

Average Surface Roughness and Refractive Index of RF Sputtered Silica

| Exemplary Entry | HF Power (kW) | LW Power (kW) | Ra (nm) | RI | Total Power | LF/HF Power Ratio |
|---|---|---|---|---|---|---|
| A | 2.3 | — | 2.988 | 1.4492 | 2.300 | 0 |
| B | 2.3 | — | 2.804 | 1.4494 | 2.300 | 0 |
| C | 2.3 | — | 3.412 | 1.4473 | 2.300 | 0 |
| D | 2.0 | 0.350 | 1.818 | 1.4538 | 2.350 | 0.175 |
| E | 2.0 | 0.350 | 1.939 | 1.4533 | 2.350 | 0.175 |
| F | 2.0 | 0.350 | 2.007 | 1.4547 | 2.350 | 0.175 |
| G | 2.0 | 0.350 | 2.571 | 1.4520 | 2.350 | 0.175 |
| H | 1.7 | 0.600 | 1.729 | 1.4560 | 2.300 | 0.353 |
| I | 1.7 | 1.000 | 1.445 | 1.4617 | 2.700 | 0.588 |
| J | 3.0 | 0.525 | 2.359 | 1.4542 | 3.525 | 0.175 |
| K** | 2.0 | 0.350 | 3.419 | 1.4523 | 2.350 | 0.175 |
| L# | 3.0 | 0.525 | 4.489 | 1.4449 | 3.525 | 0.175 |

**Deposition temperature approximately 225° C.
Ar flow rate 120 sccm.

Films deposited with a single frequency RF process (Table 4 entries A-C) typically have average surface roughness values in the range of 2.8 to 3.4 nm while the dual frequency process can produce films with systematically lower average surface roughness of between 1.4 and 2.6 nm. Keeping other process conditions the same, increasing the ratio of low frequency to high frequency power can decrease surface roughness. Refractive index typically can have the opposite proportional dependence on power ratio, such that increasing the low frequency power contribution results in optical thin films 320 with higher refractive index. The higher refractive index material has the lower average surface roughness. Thus, in similar processes, one thin film layer 320 can be produced by using dual frequency deposition without use of an dopant to modify the index, while using only the high frequency component produces a material of lower refractive index in another thin film layer 320. These two layers 320 can be in a stack of optical thin film layers in a thin film optical filter or other multi-layer interference system.

PECVD Deposition Process Example 5

In one exemplary embodiment of the present invention, a PECVD process using SiH$_4$, N$_2$O, and NH$_3$ as precursor gases produce an optical thin film 320. That is, an optical thin film 320 can be grown using silane, ammonia, and nitrous oxide as reactant gases in a PECVD process. Such film 320 can be deposited at 350° C., 13.56 MHz RF and 1 Torr pressure by varying the flow rates of N$_2$O and NH$_3$ gases. The resulting refractive indices of the optical thin film layers 320 can be in the range between 1.47 and 2.0.

The refractive indices of the resulting optical thin films 320 can respond to an application of UV light 330 in a manner that varies according to process conditions. For example, the sensitivity of an optical thin film 320 can increase with increased nitrogen in the thin film material.

The net chemical reaction pathway for this process, carried out at approximately 350° C. and under RF, is believed to be:

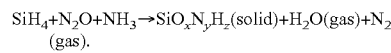

Holding the flow rate of silane fixed at 180 sccm and varying the flow rates of $N_2O$ and $NH_3$, as illustrated in Table 5 below, can control the refractive index of the optical thin film 320 as formed.

TABLE 5

Exemplary Process Parameters for
Forming Silicon Oxynitride Film with PECVD

| | |
|---|---|
| Silane (2% $SiH_4/N_2$) Flow Rate | 180 sccm |
| $NH_3$ Flow Rate | Vary (0, 15, 30 sccm) |
| $N_2O$ Flow Rate | Vary (20-450 sccm) |
| Process Pressure | 1000 mTorr |
| RF Power | 10 W |
| Temperature | 350° C. |
| Deposition Time | 15 minutes |

Index of refraction and thickness of the samples can be measured with an ellipsometer using a wavelength of approximately 632.8 nm. Characterization can be carried out by varying the $N_2O$ flow and holding $NH_3$ flow fixed at three different values. The resulting refractive index of the optical thin films 320 resulting from this process can be between approximately 1.67 and 1.47. The refractive index can be also extended to approximately 2.0. The film's refractive index can decrease in correlation with increasing oxygen, probably because oxygen has higher chemical reactivity than nitrogen. Additionally, increasing the flow rate of ammonia can increase the refractive index of the optical thin film 320.

With silane flow rate at 180 sccm and the ammonia flow rate at approximately zero sccm, varying the nitrogen flow rate from approximately 25 sccm to approximately 75 sccm yields thin film materials with refractive indices that vary respectively between approximately 1.55 and approximately 1.473. Further varying the flow rate of nitrogen from approximately 75 sccm to approximately 300 sccm produces minimal further shift in the refractive index of the resulting material.

With silane flow rate at 180 sccm and the ammonia flow rate at 15 sccm, varying the nitrogen flow rate from approximately 25 sccm to approximately 75 sccm yields materials with refractive indices that vary respectively between approximately 1.67 and approximately 1.565. Varying the flow rate of nitrogen from approximately 75 sccm to approximately 300 sccm can reduce the refractive index to approximately 1.485. Further varying the flow rate of nitrogen from approximately 300 sccm to approximately 450 sccm reduces the refractive index to approximately 1.48.

With silane flow rate at 180 sccm and the ammonia flow rate at 30 sccm, varying the nitrogen flow rate from approximately 50 sccm to approximately 300 sccm yields materials with refractive indices that vary respectively between approximately 1.625 and approximately 1.495.

The film thickness values 160 from these exemplary processes can vary roughly between 4300 angstroms and 3000 angstroms. Increasing nitrous oxide flow rate can increase the film's growth rate. The deposition rate typically decreases with an increase in ammonia flow rate. These properties can be attributed to the oxygen's greater affinity for reacting with silane. As the reactive oxygen concentration increases, the reactive oxygen can begin to dominate over nitrogen in the chemical reactions of the PECVD process. With increased nitrogen concentration in the optical thin film 320, the film's growth rate typically decreases as the probability of nitrogen-related bondings increases. By varying the relative flow rates of oxygen and nitrogen, a thin film layer 320 can have a gradient of material characteristics along the film's thickness 160. For example, the material near one side 170 of an optical thin film 320 can be oxygen rich, while the material near the opposite side 180 of the optical thin film 320 can be nitrogen rich. Varying the oxygen and nitrogen richness in this manner can induce spatially selective refractive index adjustment upon exposure to a dose of UV light 330.

Additional details regarding PECVD processes for forming silicon oxynitride films in general, and the processes of Example 5 specifically, can be found in a Master Degree Thesis by Feridun Ay, submitted in September 2000 to Bilkent University entitled "*Silicon Oxynitride Layers for Applications in Optical Waveguides.*"

Turning now from Example 5 to a discussion that is not specific to that example, a silicon oxynitride optical thin film 320 formed in a PECVD process, such as one of the exemplary processes described herein, can have residual hydrogen 340 in the optical thin film 320 that can be driven off by annealing. In one exemplary embodiment of the present invention, the residual hydrogen serves to enhance the index of refraction adjustment achieved with a UV treatment 330. That is, the optical thin film 320 can undergo a refractive index adjustment by UV exposure 330 prior to an annealing step, so that the residual hydrogen 340 promotes this adjustment. Alternatively, the optical thin film 320 can be annealed prior to receiving a dose of UV light 330. In this case, the optical thin film 320 can be either subjected to an exposure of hydrogen gas 340 or treated with UV light 330 without such exposure.

In one exemplary embodiment of the present invention the optical thin film 320 has a composition represented by the formula $Si_{1-x}Ge_xO_{2(1-y)}N_{1.33y}$, wherein "x" is approximately between 0.05 to 0.6, and "y" is approximately between 0.14 and 0.74. The refractive index of the optical thin film 320 resulting from this composition can be approximately from 1.6 to 1.8, variable with composition, process conditions of film formation, heat treatment, and exposure to UV light 330. The substrate 120 can be glass, silicon, or another optical or optoelectronic material.

Such optical thin films 320 can be formed with a PECVD process using a parallel plate reactor with a heated stationary platen, a low frequency (375 kHz) RF generator and matching network, and a gas manifold supplying silane, germane (germanium hydride, $GeH_4$), nitrous oxide, ammonia, and nitrogen into the process chamber through a showerhead nozzle that uniformly distributes the reactive gasses.

Additional process conditions and other details regarding forming the optical thin film 320 with a composition of silicon, germanium, oxygen, and nitrogen can be found in U.S. Pat. No. 6,449,420 to Akwani et al, issued on Sep. 10, 2000, the full disclosure of which is hereby incorporated by reference.

In one exemplary embodiment of the present invention, a frequency doubled copper vapor laser supplies light 330 of approximately 255 nm for dosing optical films 320 for refractive index adjustment. The average power can be between 500 and 1000 mW, with a repetition rate of approximately 6 kHz, pulse energy of less than approximately 0.2 mJ and a coherence length of approximately 40 millimeters ("mm"). The dose time can be set to correspond to a desired level of refractive index adjustment, but is typically between 2 seconds and 30 seconds. The laser beam can be expanded, thereby reducing the flux density of delivered light 330, as required to avoid damaging the optical thin film 320 by excessive intensity. In one exemplary embodiment of the present invention, the dose parameters are: a laser beam power density of approximately 55 $W/cm^2$; an energy density per pulse of approximately 0.009 $J/cm^2$; and an application time of approximately 90 seconds. Oxford Lasers Inc. of Littleton Mass. provides suitable lasers in the company's FBG600 product line. A copper vapor laser can also emit approximately 600 mW of 255 nm light 330, 600 mW of 271 nm light 330, or 250 mw of 289 nm light 330.

In one exemplary embodiment of the present invention, a UV lamp of the style sometimes used for curing epoxies supplies UV energy 330 for adjusting the refractive index of an optical thin film 320. The UV lamp can output up to 40 watts per square centimeter of light 330 having a wavelength from 280 nm to 450 nm. Alternatively a UV lamp can output approximately 7 watts per square centimeter of light 330 at approximately 365 nanometers. Dymax Corporation of Torrington, Conn. supplies such lamps.

In one exemplary embodiment of the present invention, a xenon lamp supplies light 330 for adjusting an optical property of an optical thin film 320. The xenon source can supply approximately 1000 watts per square centimeter of peak power or 100 watts per square centimeter of average power per pulse. In one exemplary embodiment of the present invention, the light intensity is increased by concentrating the light energy beam via lenses and/or waveguides until sufficient refractive index adjustment is achieved. That is, an appropriate level of light intensity to achieve a desired refractive index adjustment can be achieved by varying the light intensity until acceptable results are achieved. Xenon Corporation of Woburn Mass. supplies xenon lamps.

In one exemplary embodiment of the present invention, a deuterium light source supplies a beam of light 330 to the optical thin film 320 to adjust an optical property. The source can output light 330 between approximately 175 nm and 400 nm, providing approximately 400 watts of light 330. The beam can be condensed or expanded according to the desired adjustment. Oriel Instruments of Stratford Conn. supplies suitable deuterium lamp products, such as the company's product sold as Model 66135 High Power Deuterium Source.

In one exemplary embodiment of the present invention, a tunable UV laser outputting light 330 between approximately 200 nanometers and 400 nanometers supplies light 330 for adjusting the refractive index of the optical thin film 320. The wavelength of the UV light 330 is selected according to the desired refractive index adjustment. Tuning the laser to a specific wavelength facilitates dosing specific thin film layers 320 in a thin film optical filter with UV light 330, thus preferentially treating such layers 320 with respect to other layers 320 in the filter. At a specific tuned wavelength, the UV light may resonant within the filter, thereby intensifying. Spectra-Physics of Mountain View, Calif. supplies tunable UV lasers.

Those skilled in the art will appreciate that in certain instances the optical thin film 320 in conjunction with surrounding materials, such as other adjacent optical thin films, generates an interference pattern of the UV dose. The interference pattern and the corresponding field intensities of UV light 330 internal to the optical thin film 320 can be modeled with software such as the software product named TFCalc, which is commercially available from Software Spectra Inc. of Portland, Oreg. The effect of an optical cavity in a stack of thin films 320 to heighten the intensity of delivered UV light 330 can also be addressed empirically. In one exemplary embodiment of the present invention, the wavelength of the UV light 330, as well as the accompanying parameters, of the UV dose are determined by adjusting each of these parameters and adopting the parameters that yield particularly beneficial or optimal results. For example, in some circumstances blue light generates a desirable level of refractive index adjustment.

The Thin Film Center Inc. of Tucson Ariz. provides products and services that can be useful in modeling the interference-related interactions between UV light 330 and a system of thin films 320, such as a DWDM thin film optical filter. The company's design and analysis package, marketed under the product name "The Complete Macleod" can be a useful tool.

The software products of Software Spectra Inc, the Thin Film Center, and other suppliers of analytical tools for optical coatings, can support modeling the result of adjusting the refractive index of specific thin film layers 320 in an optical system having a stack of thin film layers 320. Such software can assist a designer in identifying the adjustment parameters of the spacer layers in a thin film interference filter that will yield a desired effect on the total performance of the filter. For example, trimming the refractive index of a spacer layer to a specific refractive index, in accord with design calculation from a software tool, can adjust the group delay parameters of the filter. Yet another useful coating design and analysis tool is the software product known under the trade name FILM-STAR and available from FTG Software Associates of Princeton, N.J.

The present invention can include multiple optical thin film layers 320, such as a stack of film layers 320, individually interacting with the light (not shown) of an end-use application such as light having digital information coded thereon, wherein the light interactions from each individual layer 320 are, collectively, additive or subtractive upon one another. One or more such layers can embody certain functions described herein and illustrated in the examples, compositions, tables, functional block diagrams, and appended flow charts. However, it should be apparent that there could be many different ways of implementing aspects of the present invention in optical films, and the invention should not be construed as limited to any one optical thin film configuration. Further, a skilled optical engineer would be able to create such thin films without difficulty based on the exemplary functional block diagrams, flow charts, and associated description in the application text, for example.

Therefore, disclosure of a particular design of a stack of optical thin film layers is not considered necessary for an adequate understanding of how to make and use the present invention. The inventive functionality of any multilayer aspects of the present invention will be explained in more detail in the following description in conjunction with the remaining figures illustrating the functions, compositions, applications, and processes.

In one exemplary embodiment of the present invention, the optical thin film 320 is a layer in a thin film interference filter that is intended to manipulate light during normal operation in a wavelength region outside of the UV region of the electromagnetic spectrum. For example, this optical thin film 320 can be a layer in a band-pass filter intended to filter light in the 1550 wavelength region, which is in the near infrared, for DWDM optical networking. The spectral characteristics of the band-pass filter in the UV region of the spectrum are typically insignificant to the optical network, which usually operates towards the opposite end of the optical spectrum, such as in the near infrared.

The UV spectral characteristics of the optical filter can be adapted to facilitate the effect of UV light 330 to interact with the optical materials of the filter and thereby promote an adjustment in refractive index of these materials. In one exemplary embodiment, the thin film optical filter exhibits low reflectivity to UV light 330 and thereby transmits the UV light 330 that adjusts the refractive index of the filter's optical materials. In one exemplary embodiment of the present invention, the thin film optical filter exhibits high reflectivity to the UV light 330 that adjusts the refractive index of these optical materials. In one exemplary embodiment of the present invention, the thin film optical filter resonates UV light 330 to increase the intensity of the UV light field to which the optical materials of the filter are exposed during a refractive index adjustment. That is, the band-pass filter meets the performance specifications of the DWDM application while providing a resonant cavity or etalon that generates a standing wave of UV light 330 upon directing UV light 330 to the filter for adjusting an optical property of the optical thin film 320. This standing wave increases the effective flux of UV light 330 in one or more layers in the optical thin film 320 to a higher level than the flux of UV light 330 external to the filter and emanating from the UV source. In one exemplary embodiment of the present invention, the design of the thin film optical filter heightens the UV light flux in one or more specific layers 330, thereby increasing the refractive index adjustment in specific layers 330 relative to the other layers in the filter. For example, one or more spacer layers 330 can be targeted for a refractive index adjustment. Selecting a specific layer for a refractive index adjustment can facilitate precise adjustment of a specific optical property of a thin film optical filter or other optical device having two or more optical thin film layers 320.

Figure 4A:
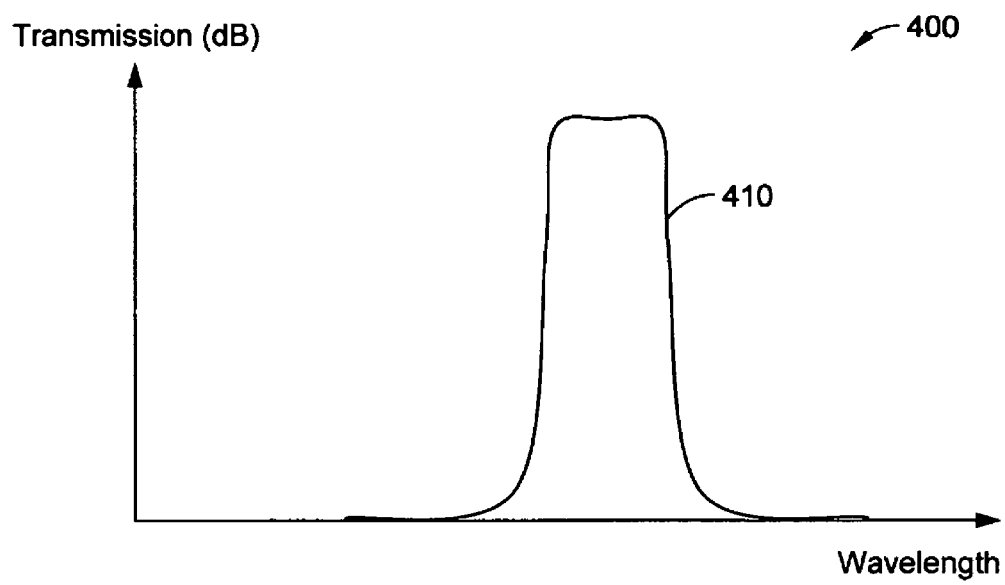
FIG. 4A illustrates a spectral plot of a thin film optical filter in accordance with an exemplary embodiment of the present invention.

Turning now to FIG. 4A, this figure illustrates a graph 400 with a spectral plot 410 of a thin film optical filter in accordance with an exemplary embodiment of the present invention. The thin film optical filter can have a structure corresponding to the stack of optical thin films 200 illustrated in FIG. 2 and described above. The spectral plot 410 of the thin film optical filter characterizes transmission as a function of wavelength. The illustrated thin film optical filter response is representative of a band-pass filter that transmits light having a specific spectral range and reflects light outside of that spectral range. This filter can have other spectral regions (not shown) that also transmit light, such as the UV light 330 that adjusts an optical characteristic of this filter. The thin film optical filter may be used for optical networking as a WDM, CWDM, or DWDM filter, for example.

Adjusting the refractive index of one or more layers in the thin film optical filter induces, causes, or results in corresponding adjustment in an optical property of the thin film optical filter. The adjustment can alter the filter's spectral sensitivity to the angle of incident light, the center wavelength of the filter, or another optical property.

Figure 4B:
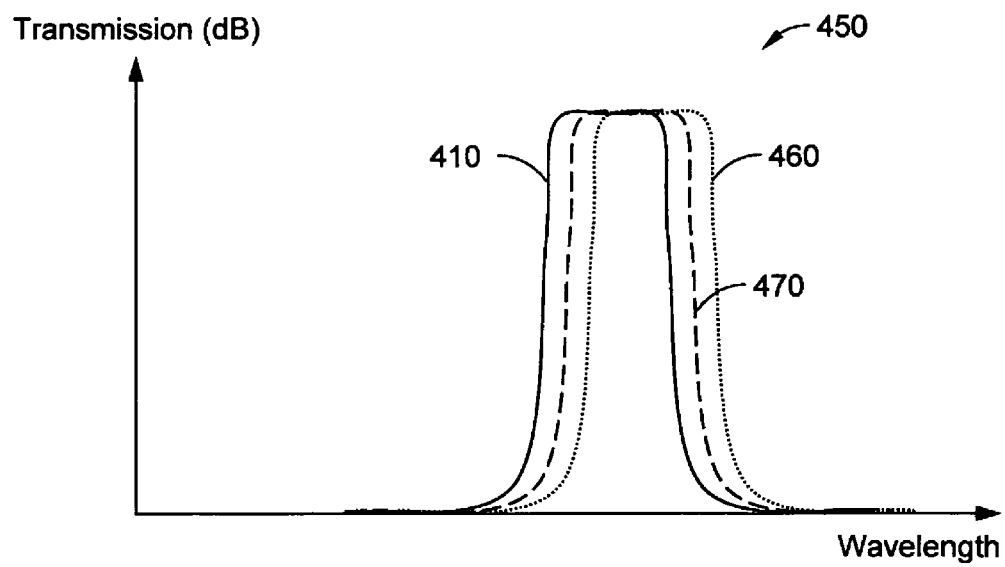
FIG. 4B illustrates spectral plots of a thin film optical filter resulting from an optical property adjustment in accordance with an exemplary embodiment of the present invention.

Turning now to FIG. 4B, this figure illustrates a graph 450 of spectral plots 410, 460, 470 of a thin film optical filter resulting from an optical property adjustment in accordance with an exemplary embodiment of the present invention. The filter responds to a dose of UV light 330 with a shift in the center wavelength of the filter. The adjustment can trim an optical filter so that it has a center wavelength that meets a specification. After starting at plot 410 following forming the filter, the application of a first level of UV light 330 can shift the filter spectral characteristics so that it exhibits plot 470. An additional dose of UV light 330 can further shift the spectral characteristics to plot 460.

In one exemplary embodiment of the present invention, a dose of UV light 330 shifts the center wavelength of the filter towards the blue, rather than the red. That is, UV light 330 can either shift the spectral characteristics of a filter to a higher or lower wavelength, depending on the design of the filter, the materials of the layers, the deposition conditions, and the parameters and conditions associated with the application of energy to the filter.

By varying the composition of the layers of a thin film optical filter, the spacer layers, the high index layers, or all of the layers in the filter can be selected for a refractive index adjustment. The spectral shift can be described the following equation:

$$\Delta\lambda/\lambda = \alpha(\Delta OT/OT).$$

In this equation, the lambda symbol "λ" refers to wavelength, "OT" refers to optical thickness, and alpha "α" has a value of one when all of the layers in the filter undergo an equivalent adjustment in optical thickness and a value less than or equal to one when the spacer layer or all of the high-index layers in the thin film optical filter undergo an equivalent optical thickness adjustment.

For a triple-cavity thin film optical filter nominally operative at 1550 nm telecommunication wavelength with 41 layers, with alternating layers composed of silicon and silicon dioxide, adjusting the optical thickness of the spacer layers by approximately 0.1% can be expected to yield a spectral shift towards the red (higher wavelength) of approximately 1.45 nm with minimal change in the shape of the spectral response. Adjusting the optical thickness of the high-index layers, including the spacer layers, in this optical filter by approximately 0.1% can be expected to yield a spectral shift towards the red of approximately 1.47 nm without significant shift in the shape of the filter's spectral characteristics.

Figure 5:
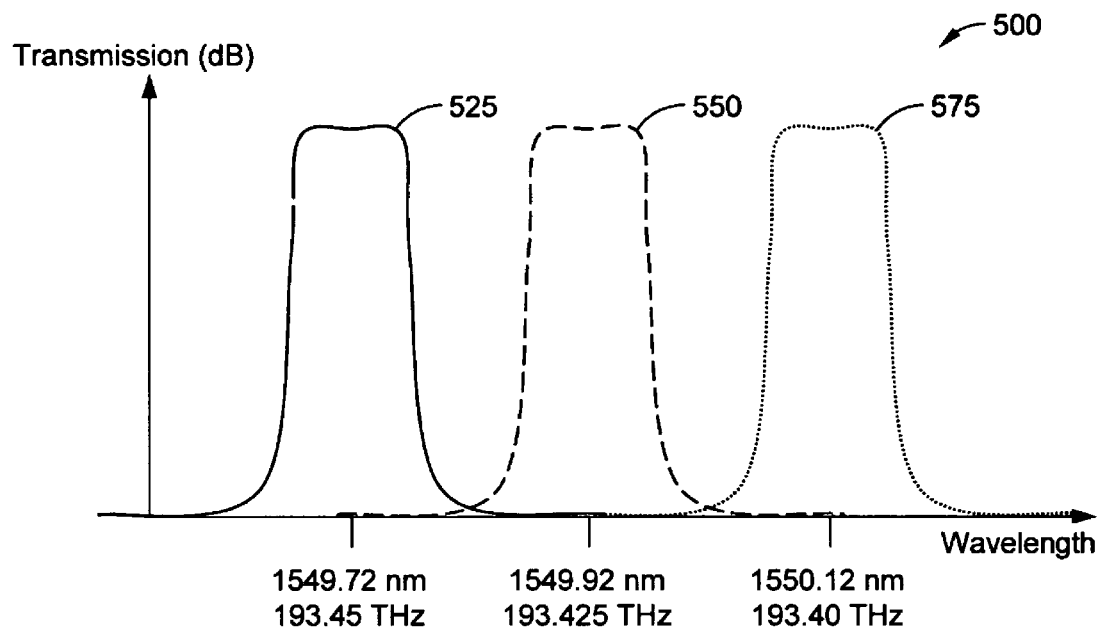
FIG. 5 illustrates spectral transmission plots of a thin film optical filter adjusted to match a wavelength grid in accordance with an exemplary embodiment of the present invention.

Turning now to FIG. 5, this figure illustrates a graph 500 of spectral transmission plots 525, 550, 575 of a thin film optical filter adjusted to match a wavelength grid in accordance with an exemplary embodiment of the present invention. After forming the layers of the filter in a deposition chamber, the resulting filter stock is treated with UV light 330 so that the center wavelengths of sections of the filter are aligned with the DWDM grid, which can be a 12.5 MHz grid, a 25 MHz grid, a 50 MHz grid, 100 MHz grid, or other grid spacing. That is, each spectral plot 525, 550, 575 exemplifies a section of filter stock that is optically trimmed to match the wavelength specifications of a DWDM channel. In this manner, a single deposition batch can yield filters for multiple DWDM channels.

Figure 6:
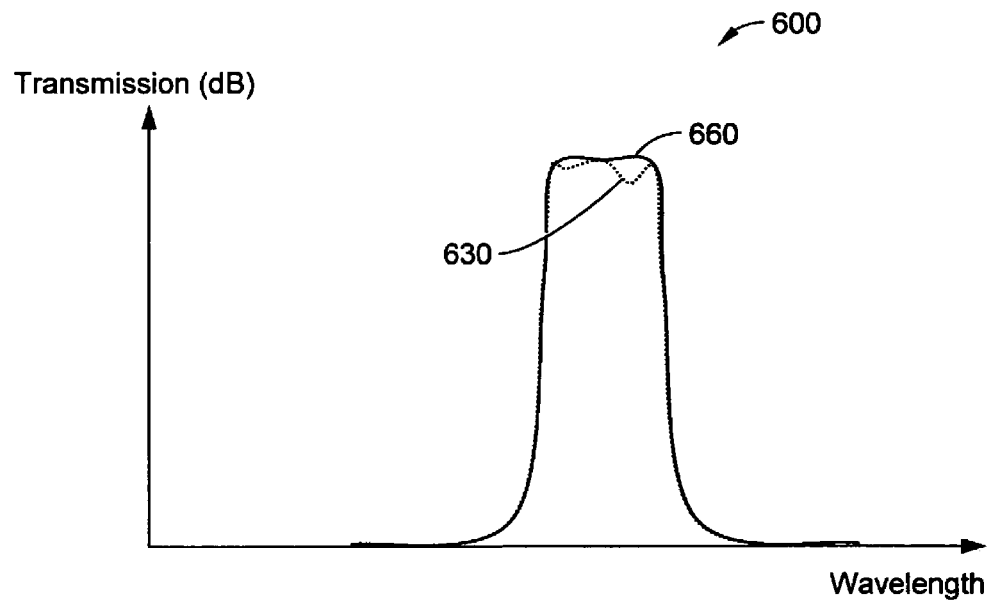
FIG. 6 illustrates spectral transmission plots of an adjustment to a thin film optical filter to alter the ripple in the pass band in accordance with an exemplary embodiment of the present invention.

Turning now to FIG. 6, this figure illustrates a graph 600 of spectral transmission plots of an adjustment to a thin film optical filter to alter ripple in the pass band in accordance with an exemplary embodiment of the present invention. Prior to UV treatment, the thin film optical filter can exhibit a ripple or non-uniformity in the pass band section of the filter's plot 630. After treatment with UV light 330, the filter can have a spectral transmission plot 660 that is smoother, more uniform, or exhibits a flatter pass band. That is, a treatment of UV light 330 can improve the transmission characteristics of a thin film optical filter by minimizing ripple or improving pass band transmission.

In one exemplary embodiment of the present invention, the ripple characteristics of a thin film optical filter can be improved by selecting a UV wavelength that will preferentially treat one or more thin film layers. For example, tuning a tunable UV laser to a wavelength that preferentially exposes a defective layer to resonant UV light 330 can improve the defect. Ripple defects or non-uniformities sometimes occur due to a disruption or interruption in a filter deposition process that impacts a single layer. If the ripple is due to a layer having a reduced physical thickness, the layer can be treated with UV light 330 to increase the optical thickness of that layer. In one exemplary embodiment of the present invention, a UV dose or treatment is delivered along the plane of the filter, using positional placement to select one or more specific layers for corrective treatment.

Figure 7:
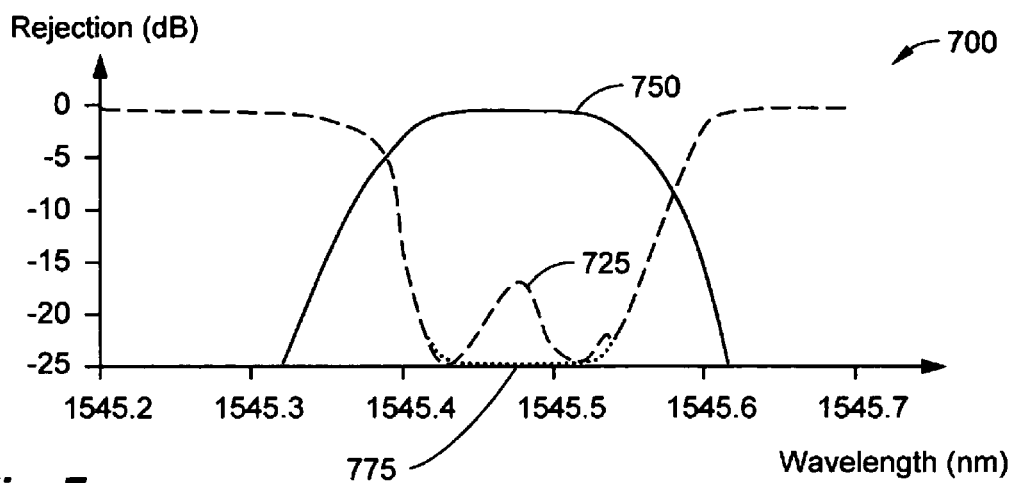
FIG. 7 illustrates spectral plots of a thin film optical filter's response to an optical property adjustment in accordance with an exemplary embodiment of the present invention.

Turning now to FIG. 7, this figure illustrates a graph 700 of spectral plots 725, 750, 775 of a thin film optical filter's response to an optical property adjustment in accordance with an exemplary embodiment of the present invention. As the solid curve 750 indicates, the thin film optical filter has a pass band, which is a contiguous spectral region between approximately 1545.43 nm and 1545.55 nm in which light transmits through the thin film optical filter. Out of the spectral region of the pass band, the thin film optical filter rejects the transmission of light by reflecting light.

For most filtering applications, the pass band of the thin film optical filter should be flat, with a high level of transmission and minimal or controlled ripple. The thin film optical filter should also provide a minimal level of light rejected within the pass band for many applications. Rejected light, particularly if the thin film optical filter reflects the rejected light, can cause problems for an application. For example, reflected light within a pass band can mix with the reflected light outside the pass band and become interference or stray light that can degrade the signal-to-noise ratio of an optical communication system, optical instrumentation system, or other optical system. Consequently, a high degree of stray light rejection (or a high level of transmission) within the pass band of a thin film optical filter is typically desirable.

The graph 700 includes a curve 725 illustrating an exemplary rejection of a thin film optical filter as formed within a thin film deposition system. This curve 725 shows a hump in the rejection spectrum 725 in the region of the thin film optical filter's pass band. Treating the thin film optical filter with a dose of UV light 330 can improve the level of rejection as illustrated by exemplary curve 775. That is, the performance of a filter having the curve 725 can be improved by UV exposure that transforms the curve 725 to the curve 775. In one exemplary embodiment of the present invention, thin film optical filters that exhibit out-of-tolerance rejection characteristics undergo a UV treatment and/or a thermal treatment to improve the rejection characteristics.

Figure 8:
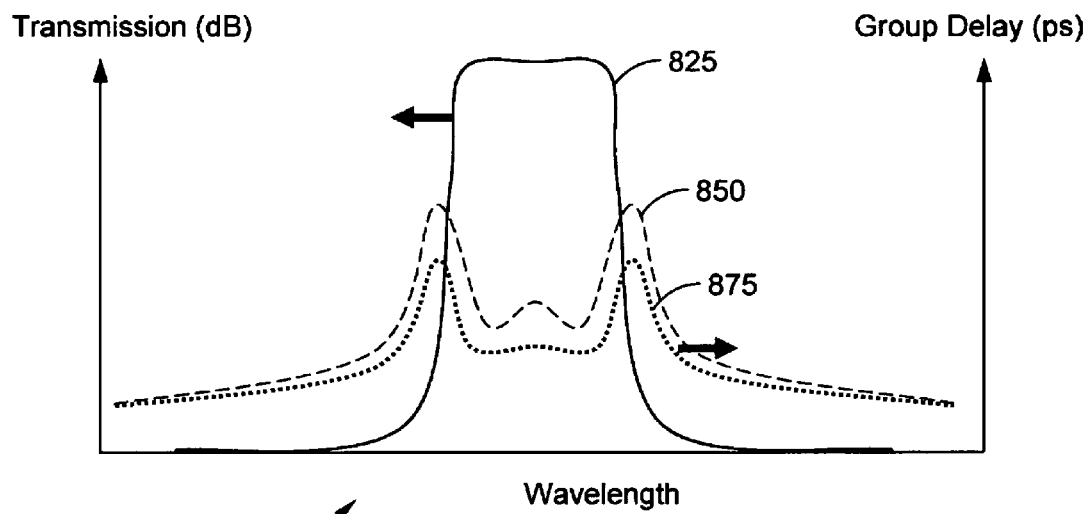
FIG. 8 illustrates spectral plots of the group delay of a thin film optical filter in response to an adjustment of an optical property in accordance with an exemplary embodiment of the present invention.

Turning now to FIG. 8, this figure illustrates a graph 800 of spectral plots 875, 850 of the group delay of a thin film optical filter in response to an adjustment of an optical property in accordance with an exemplary embodiment of the present invention. The graph 800 includes a transmission plot 825 of a band-pass thin film optical filter overlaid upon the group delay plots 875, 850.

The upper group delay curve 850 illustrates an exemplary group delay of a thin film optical filter following producing the filter in a deposition chamber. The lower group delay curve 875 illustrates an exemplary improvement in the group delay that can result from dosing the thin film optical filter with UV light 330. That is, treating a thin film optical filter with UV light 330 can improve or modify the filter's group delay, for example reducing or controlling the overall group delay and/or flattening the group delay profile in a spectral region adjacent or within the filter's pass band as exemplified by the improvement between the upper group delay curve 850 and the lower group delay curve 875 in the graph 800.

A treatment of UV light 330 and/or thermal energy can also improve a thin film optical filter's dispersion, which is related to group delay. Whereas group delay is typically measured in the units of picoseconds ("ps"), dispersion is typically measured in picoseconds per nanometer ("ps/nm"). That is dispersion can be the derivative, with respect to nanometers, of group delay.

Improving the dispersion or group delay of a thin film optical filter can enhance the filter's performance in a high-speed optical networking application, for example an environment of transmitting data at 10 Gigabit per second, 40 Gigabits per second, or at a higher rate. For example, a thin film optical filter that provides a high level of dispersion or group delay performance can offer a desirable bit error rate performance to an optical communications network. Similarly, improved group delay can relax the laser specifications for an optical network application.

Thus, a treatment of energy can control the residence times of photons having different colors in an optical device. That is, an energy treatment can provide a device that operates over a span of wavelengths with defined or controlled levels of delay for light of those wavelengths.

In one exemplary embodiment of the present invention, the chromatic dispersion characteristics of a multilayer thin film optical system can correct or compensate for chromatic dispersion. For example, controlling the dispersion or group delay of a multilayer thin film optical system to achieve a desired spectral profile can be more beneficial than minimizing those optical properties. A treatment of UV light 330 can adjust or trim the dispersion or group delay spectral profile of a thin film system to meet a target specification. The resulting thin film optical system can compensate for chromatic dispersion of optical signals occurring on a span of fiber, in an optical amplifier, or laser cavity, for example. In other words, a dose of UV light 330 can control the chromatic dispersion of an optical thin film device so that the device can be placed in series with other devices that chromatically disperse light and so that the aggregate chromatic dispersion is flat.

Figure 9:
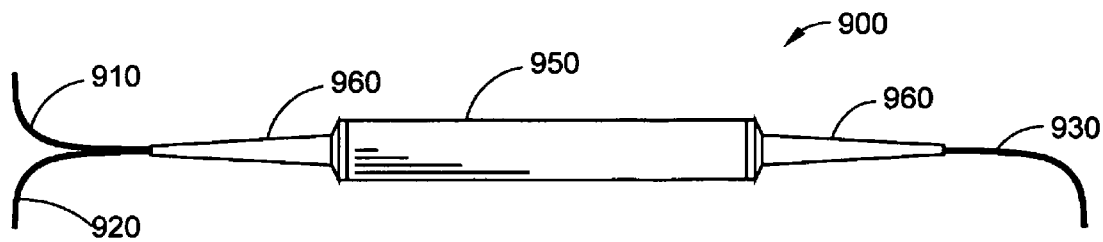
FIG. 9 illustrates a fiber optic device that includes a thin film optical filter having an adjusted optical property in accordance with an exemplary embodiment of the present invention.

Turning now to FIG. 9, this figure illustrates a fiber optic device 900 that includes a thin film optical filter having an adjusted optical property in accordance with an exemplary embodiment of the present invention. More specifically, the device 950 can be used as an add-drop optical filter assembly 900 for optical communication.

One single mode optical fiber 910 delivers multi-color light to an internal lens (not shown) such as a gradient index lens. The lens, which is inside the device's housing 950 collimates this multicolor light and delivers it to an internal thin film optical band-pass filter (not shown). The pass band of the filter transmits light, delivering the transmitted light to another lens, opposite the first lens, that focuses the transmitted light into a drop optical fiber 930, which is protected by a strain relief boot 960. The drop optical fiber 930 transmits the drop light, which transmits through the filter's pass band, to another device, such as a communication device in an optical communication network. The optical filter within the assembly 900 reflects the out-of-band light from the ingress optical fiber 910 to the egress optical fiber 920.

The UV treatment improves performance of the assembly by centering the pass band of the filter, reducing the group delay, flattening the pass band, increasing the rejection, or adjusting one or more other optical properties of the thin film optical filter within the device.

While the UV treatment can be applied prior to integrating the filter with the device, in one exemplary embodiment of the present invention, UV treatment proceeds following the device's assembly. If the assembled device 900 does not meet a performance specification, then UV light 330 can be delivered to the optical thin film through one or more of the optical fibers 910, 920, 930 of the assembled device 900.

An optical network, such as a SONET, access, storage, local area network ("LAN"), Internet protocol ("IP"), or other network can comprise the filter 900. That network can carry a wide range of voice, data, video, or other communications.

Figure 10:
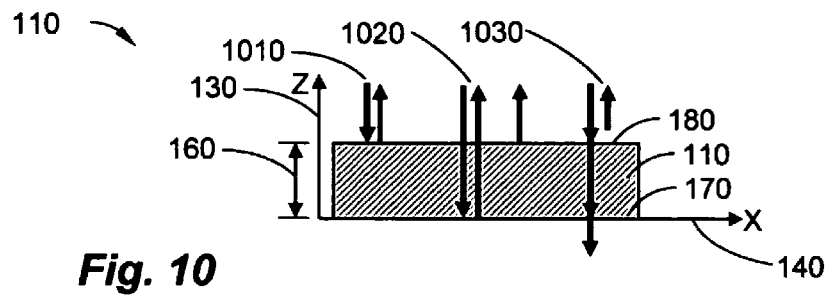
FIG. 10 illustrates light incident on an optical thin film in accordance with an exemplary embodiment of the present invention.
Figure 11:
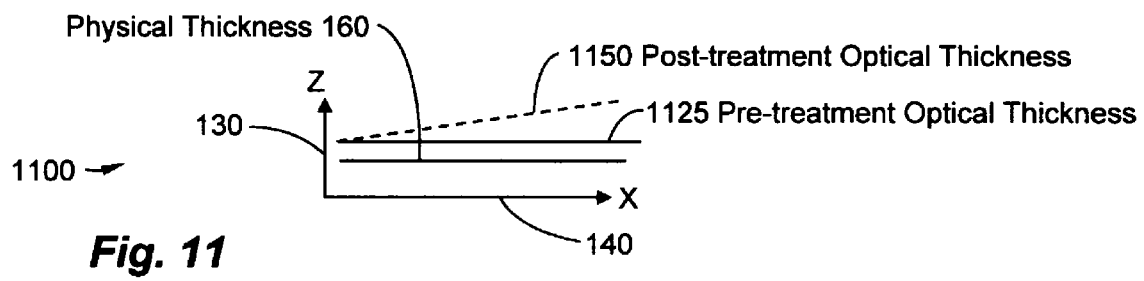
FIG. 11 illustrates plots of the optical thickness of an optical thin film before and after undergoing an adjustment of its optical properties in accordance with an exemplary embodiment of the present invention.
Figure 12:
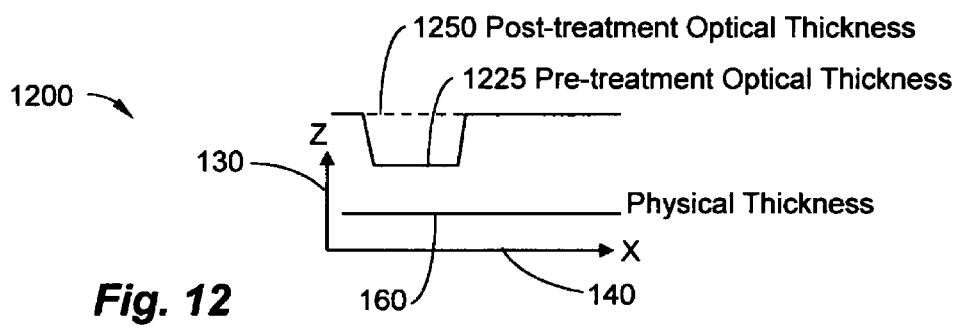
FIG. 12 illustrates plots of the optical thickness of an optical thin film before and after undergoing an adjustment of its optical properties in accordance with an exemplary embodiment of the present invention.
Figure 13:
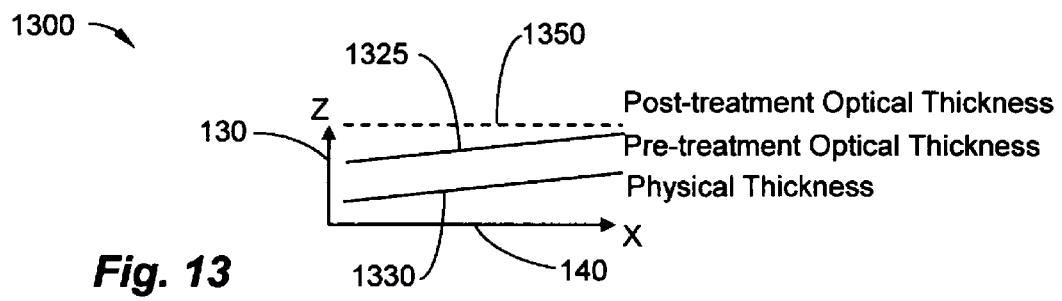
FIG. 13 illustrates plots of the optical thickness of an optical thin film before and after undergoing an adjustment of its optical properties in accordance with an exemplary embodiment of the present invention.

Turning now to FIG. 10, this figure illustrates light 1010, 1020, 1030 incident on an optical thin film 110 in accordance with an exemplary embodiment of the present invention. FIG. 10, along with FIGS. 11, 12, and 13 are described in reference to the optical thin film system 100 illustrated in FIG. 1 and discussed above. Nevertheless, those skilled in the art appreciate that the FIGS. 10-13 can be related to other optical thin films, such as a multilayer system of optical thin films, for example as illustrated in FIG. 2.

The first surface 180 of the optical thin film 110 reflects a portion of the light 1010 normally incident on that surface 180. The second surface 170 also reflects a portion of the light 1020 normally incident on that surface 170. The light waves reflected off of these surfaces 170, 180 interfere with one another resulting in net transmission and reflection of light 1030. The interference can be either constructive or destructive depending on the phase relationship between the two reflected waves. The thickness of the optical thin film 160, the refractive index of the optical thin film, and the wavelength impact the relative phase of these reflected light waves. An energy treatment can adjust the manner in which the film 110 of FIG. 10 interacts with and creates the various light rays depicted in that Figure.

Turning now to FIG. 11, this figure illustrates a graph 1100 of plots 1125, 1150 of optical thickness of an optical thin film 110 before and after undergoing an adjustment of its optical properties in accordance with an exemplary embodiment of the present invention. The optical thin film 110 has a physical thickness 160 that is essentially uniform across at least one dimension, as illustrated by the x-axis 140. The physical thickness 160 undergoes negligible change as a result of a UV treatment. That is, the plot 160 of physical thickness can exemplify the physical thickness prior to a UV treatment, after a UV treatment, or both before and after a UV treatment.

Prior to the UV treatment, the optical thin film 110 has an optical thickness 1125 that is essentially uniform along the x-axis 140. Those skilled in the art appreciate that an essentially uniform thin film 110 can have various minute levels of surface roughness, such as surface roughness that has negligible impact on the optical characteristics of the optical thin film 110.

Treating the optical thin film 110 with a gradient of UV light 330 causes a corresponding gradient in the post-treatment optical thickness 1150 of the optical thin film 110. A UV light beam can be swept across the optical thin film 110 at an accelerating speed so that one area of the optical thin film 110 receives a higher dose of UV light 330 than another area. That is, a UV light beam can be moved across the surface of the optical thin film 110 at a variable rate. When the speed of the beam is slow, the optical thin film 110 receives a higher dose of UV light 330 than when the speed of the beam is fast. After the UV treatment, the optical thin film 110 exhibits a pattern of optical thickness 1150 that slopes along the x-axis 140.

In one exemplary embodiment of the present invention, a treatment of energy other than UV light 330 causes the gradient in the optical thickness 1150. Treating the optical thin film 110 with a gradient or other pattern of thermal energy can also cause a corresponding gradient in optical thickness 1150. Other forms of energy can also be applied to the optical thin film 110 following deposition to impact an optical property of the optical thin film 110. Exemplary forms of such energy include ultrasonic energy, electrical energy, magnetic energy, stress, and stress relief.

Turning now to FIG. 12, this figure illustrates a graph 1200 of plots of the optical thickness 1225, 1250 of an optical thin film 110 before and after undergoing an adjustment of its optical properties in accordance with an exemplary embodiment of the present invention. The physical thickness 160 of the optical thin film 110 is essentially constant along the x-axis 140. Prior to UV treatment, the optical thin film 110 has a spatially specific reduction in optical thickness 1225 as indicated by the dip in the graph 1225. That is, a region of the optical thin film 110 has a decreased refractive index that can be due to an anomaly in, problem with, or interruption of the deposition process. Directing a UV light beam or field to that area of the film can increase the refractive index and corresponding optical thickness 1250 of this region and correct the defect. Following the UV treatment, the optical thickness 1250 of the optical thin film can be essentially uniform across the x-axis 140 of the optical thin film 110.

In one exemplary embodiment of the present invention, a lens composed of one or more of the UV sensitive materials discussed herein is treated with UV light 330 in order to correct surface defects in the lens. For example a plano-convex lens can be formed from optical stock composed of silicon dioxide and germanium, silicon oxynitride, and/or hydrogen using grinding and polishing process steps known to those skilled in the art. The surface profile of the planar side or the convex side can have a spatially specific surface imperfection such as a slight depression. Treating the spatially specific surface imperfection with UV light 330 can slightly raise the refractive index of the material in the area of the surface imperfection and correct or partially correct the defect.

Turning now to FIG. 13, this figure illustrates a graph 1300 of plots 1325, 1350 of the optical thickness of an optical thin film 110 before and after undergoing an adjustment of its optical properties in accordance with an exemplary embodiment of the present invention. The optical thin film 110 has a sloped physical thickness 1300. Prior to UV treatment, the optical thickness 1325 of the optical thin film is graded. Following UV treatment, the optical thickness 1350 is essentially constant. That is, the UV treatment can compensate for a variation in optical thickness.

Figure 14:
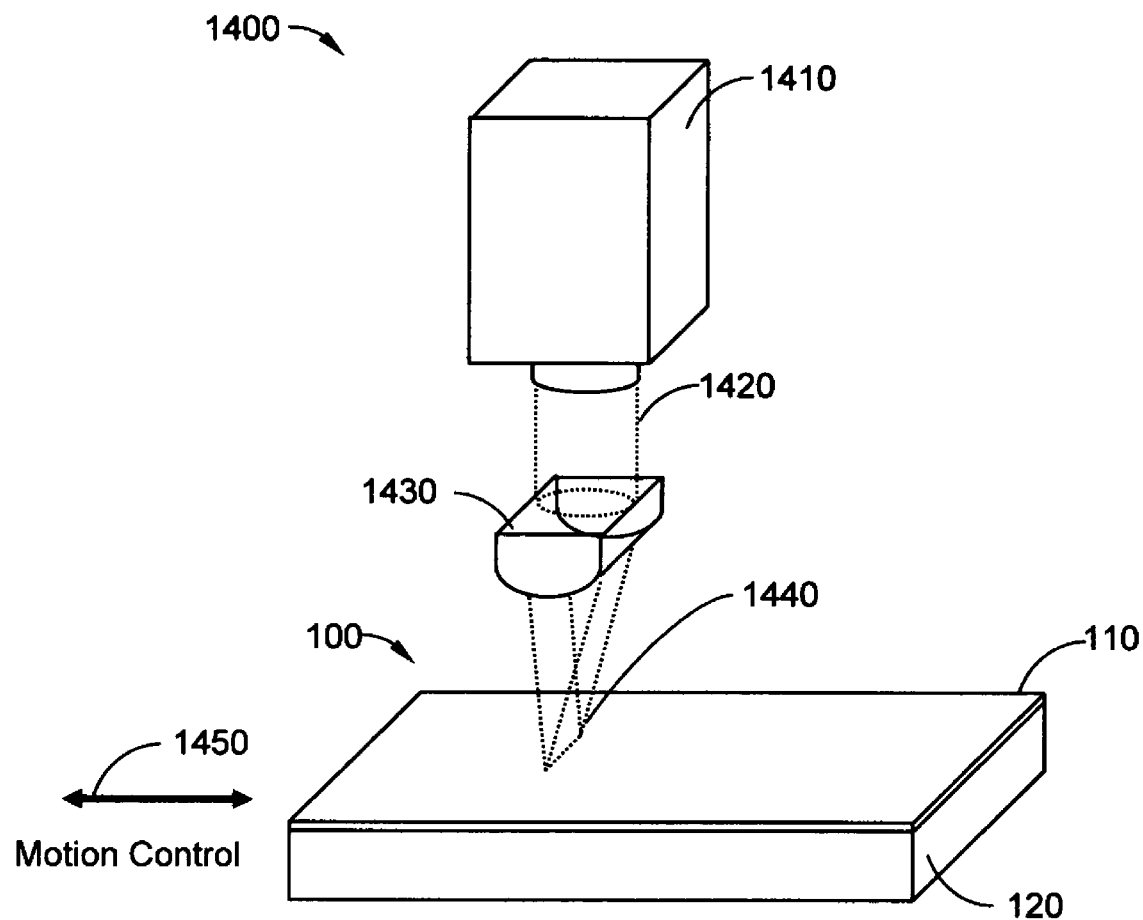
FIG. 14 illustrates a system that adjusts an optical property of an optical thin film by an application of short wavelength light in accordance with an exemplary embodiment of the present invention.

Turning now to FIG. 14, this figure illustrates a system 1400 that adjusts an optical property of an optical thin film 110 by an application of short wavelength light 1420, 1440 in accordance with an exemplary embodiment of the present invention. A lamp (not shown) in a lamp housing 1410 outputs UV, violet, and blue light in a circular beam 1420. A cylindrical lens 1430 forms the circular beam 1420 into a line-type beam 1440 and projects the resulting linear pattern of light 1440 onto a thin film optical system 100, such as an optical thin film 110 attached to a substrate 120. The optical thin film 110 can be a single layer of optical thin film material or a stack of optical thin film layers such as one or more layers in multi-cavity thin film optical filter.

The light source 1410 and light delivery optics 1430 are stationary, while a motion control 1450 moves the thin film optical system 100 with respect to the focal point 1440 of the light dose. A stepper motor, piezoelectric system, manual station, or other motion control apparatus known in the art can implement the motion control 1450.

The motion control 1450 can move the thin film optical system 100 to control the regions of the optical thin film 110 that receive the light treatment. A shutter (not shown) can be closed until the motion control 1450 appropriately positions the thin film optical system 100 so that a select area of the optical thin film 110 receives an appropriate dosage.

The motion control 1450 can also move the thin film optical system 100 while the beam 1440 remains focused on the optical thin film 110. The rate of motion can determine the level of dosage that each region of the optical thin film 110 receives as it passes below the focused beam 1440. Such motion can impart a gradient profile or other pattern onto an optical thin film 110.

Figure 15:
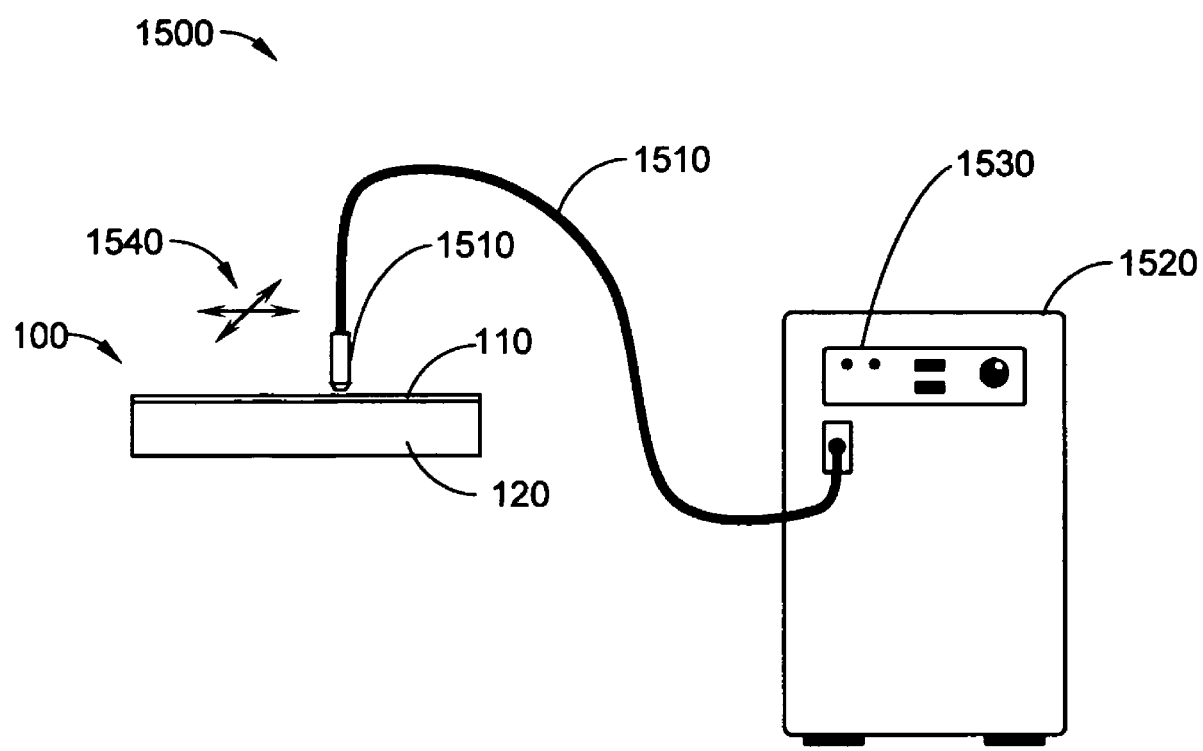
FIG. 15 illustrates a laser-based system that adjusts an optical property of an optical thin film by an application of short wavelength light in accordance with an exemplary embodiment of the present invention.

Turning now to FIG. 15, this figure illustrates a system 1500 that adjusts an optical property of an optical thin film 110 by an application of short wavelength light in accordance with an exemplary embodiment of the present invention. A UV laser 1520 couples UV light into an optical fiber 1510, which carries this light to a distal lens assembly 1510.

The lens assembly 1510 shapes the light output by the optical fiber 1510 and delivers the shaped light to the optical thin film 110 in an appropriate format. The lens assembly 1510 can control the size of the light beam delivered to the optical thin film 110 to provide an adequate intensity of light to each illuminated area of the optical thin film 110. The optical thin film 110 is attached to a substrate 120, thus forming a thin film optical system 100 that, although illustrated as a single layer of optical thin film, can be a stack of optical thin films of with varying refractive index.

Controls 1530 on the laser 1520 facilitate adjusting various parameters of the laser such as power level, pulse duration, pulse profile, duty cycle, wavelength, and the monochromaticity of the laser light.

A motion control function 1540 provided by an assembly (not shown) moves the optical fiber 1510 and the light delivery head 1510 in at least two dimensions across the surface of the optical thin film 110 and the underlying substrate 120. The motion 1540 defines the regions of the optical thin film 110 that receive a dose of UV laser light. The motion can also control the dosage level that one or more areas of the optical thin film 110 receive.

Figure 16:
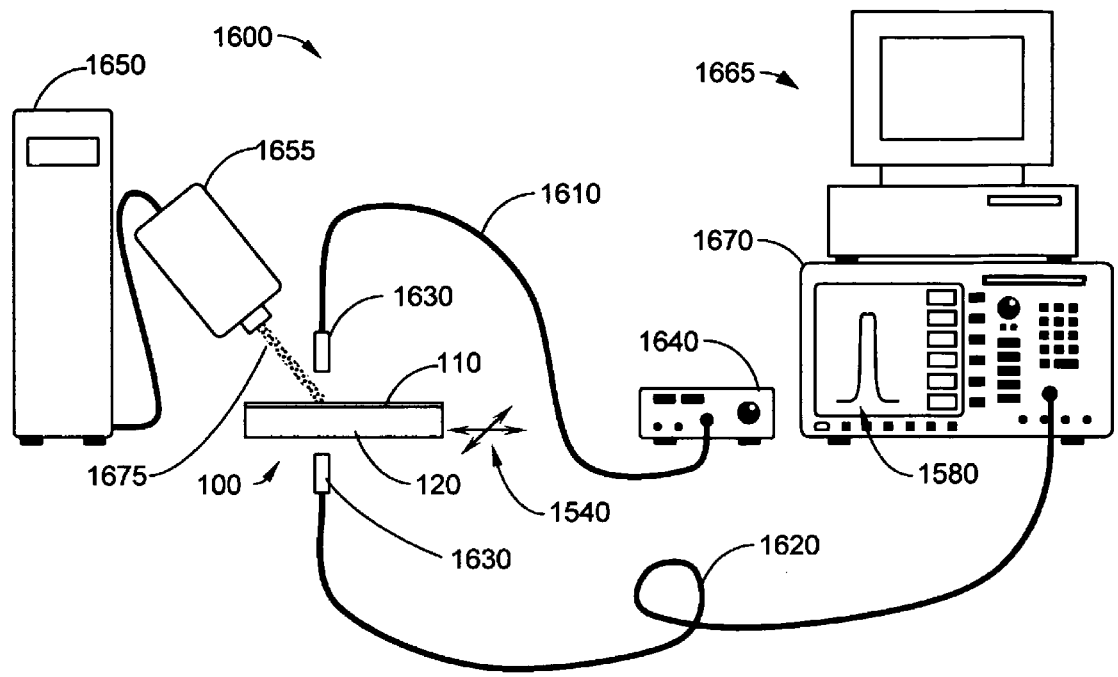
FIG. 16 illustrates a system that adjusts an optical property of an optical thin film by an application of short wavelength light to the thin film in conjunction with monitoring an optical response of the optical thin film in accordance with an exemplary embodiment of the present invention.

Turning now to FIG. 16, this figure illustrates a system 1600 that adjusts an optical property of an optical thin film 110 by an application of short wavelength light 1575 to the thin film 110 in conjunction with monitoring an optical response of the optical thin film 110 in accordance with an exemplary embodiment of the present invention.

The system 1600 includes a laser power supply 1650 that drives a laser 1655, which delivers a beam of UV light 1675 to a thin film optical system 100. The thin film optical system 100 includes an optical thin film 110 attached to a substrate 120. The thin film optical system 100 can have a single thin film layer 110 or a plurality of thin films, such as a thin film optical filter.

An optical spectrum analyzer 1670 monitors the response of the thin film optical system 100 to the UV light 1675. Agilent Technologies, Inc. of Palo Alto, Calif. supplies suitable instruments for characterizing the spectral transmission characteristics of optical thin films 110 that are intended for optical networking applications. Other types of spectrum analyzers, spectrographs, and spectrometer systems can be substituted for the illustrated optical spectrum analyzer 1670. In an alternative exemplary embodiment of the present invention, the optical property adjustment system 1600 includes an instrument that measures the refractive index of the optical thin film 110 in place of the optical spectrum analyzer 1670.

A test light source 1640, which can be a tunable laser or a broadband light source, supplies test light (not shown) through an optical fiber 1610 and a collimating lens assembly 1630 to the thin film optical system 100. The test light transmits through the thin film optical system 1000 to a complementary lens assembly 1630 that captures and focuses the test light into a return optical fiber 1620. The return optical fiber 1620 transmits the test light to the optical spectrum analyzer 1670, which analyzes the test light 1670 and displays a plot 1580 of the transmission characteristics of the thin film optical system 120.

The optical spectrum analyzer 1670 can display optical properties 1580 of the thin film optical system 120 before, during, or following an adjustment of an optical property. The UV laser light 1675 can increase the temperature of the thin film optical system 100 and cause a temporary shift in the spectral measurements of the thin film optical system 100. A delay between dosing the thin film optical system 120 with UV light 1675 and acquiring spectral data from the thin film optical system 120 gives the temperature of the optical thin film 110 time to stabilize and cool down from any heating that may have occurred as a result of the laser beam 1675.

The optical spectrum analyzer 1670 can display a transmission spectrum 1580 of a thin film optical band-pass filter to indicate the center wavelength of the pass band of the filter. Measuring the center wavelength with the optical spectrum analyzer 1670 prior to treating the filter with UV light 1675 can determine a treatment dose. After a portion of the UV dose is delivered, the optical spectrum analyzer 1670 can acquire additional spectra to determine the result of the UV treatment. Depending on the impact of the initial treatment, the laser 1655 can deliver the balance of the dose, reduce the dose, increase the dose, or deliver a new dose to match the center wavelength of the filter with a center wavelength specification. If the filter is to undergo accelerated aging or annealing, the target spectrum can be offset from the final target specification to account for spectral shifting during annealing or accelerated aging. That is, the target adjusted spectrum in a UV treatment station 1600 can be offset from the final target spectrum to account for any known changes in the spectrum that occur following the UV treatment.

A motion control 1540 moves the thin film optical system 100 with respect to the UV treatment beam 1675 and the test light to control the areas of the optical thin film 110 that interact with the UV beam 1675. A computer system 1665 controls the motion control 1540 as well as the other components of the system 1600. The computer system 1665 includes data storage from a hard drive that logs the spectral data from the optical spectrum analyzer 1670 for quality control, statistical analysis, and historical trending. The computer system 1665 adjusts the laser 1655 via the laser power supply 1650 based on the optical spectrum analyzer's acquired spectrum to control the dose of the UV treatment. That is, the optical spectrum analyzer 1670 monitors the UV treatment process for closed loop feedback control through process control software (not shown) in the computer system 1665. The process control software can include a control algorithm, such as a proportional integral derivative ("PID") controller or a proportional integral ("PI") controller. The controller can increase the UV dosage if the rate of change in the optical property is too low or decrease the dosage if the rate of change is too high, for example.

Figure 17:
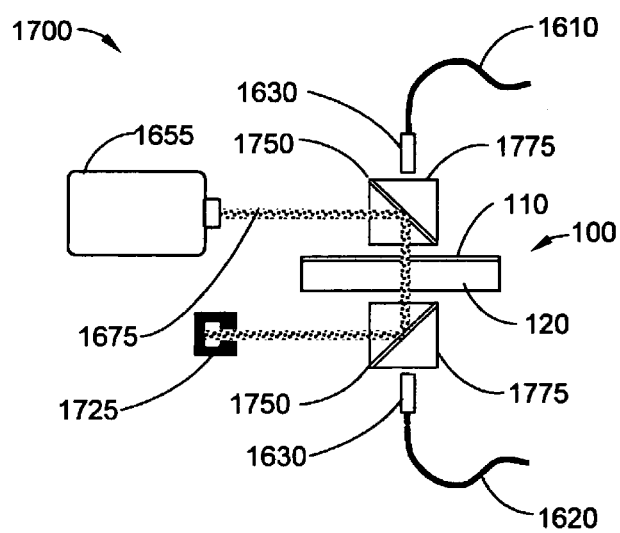
FIG. 17 illustrates an optical interface for applying light to an optical thin film to adjust optical properties of the thin film in conjunction with monitoring an optical response of the optical thin film in accordance with an exemplary embodiment of the present invention.

Turning now to FIG. 17, this figure illustrates an optical interface 1700 for applying light to an optical thin film 110 to adjust optical properties of the thin film 110 in conjunction with monitoring an optical response of the optical thin film 110 in accordance with an exemplary embodiment of the present invention. The interface 1700 can be included in a computer-based system that adjusts an optical thin film 110, such as the system 1600 illustrated in FIG. 16 and discussed above.

The optical interface 1700 delivers UV treatment light 1675 and test light (not shown) along an essentially common axis. A pair of dichroic filters 1750, each sandwiched within a block of optical material 1775 at an approximate 45° angle, reflect the UV treatment light 1675 and transmit the test light. The test light passes from the delivery optic 1630 of the upper optical fiber 1610 and through the dichroic filters 1750 and the optical thin film 110 and its substrate 120. A collection optic 1630 captures the test light and focuses it into a collection optical fiber 1620 for transmission to a monitoring system such as an optical spectrum analyzer 1670.

The upper dichroic filter 1750 directs the UV treatment beam 1675 along essentially the same optical path in the thin film optical system 100 as the test light. The lower dichroic filter 1750 diverts the UV beam 1675 to a light trap 1725, which receives and attenuates the beam. The collinear configuration of directing UV treatment light 1675 and test light along a common path in the thin film optical system 100 facilitates adjusting an optical property of the thin film optical system 100 in a precisely controlled manner.

Figure 18:
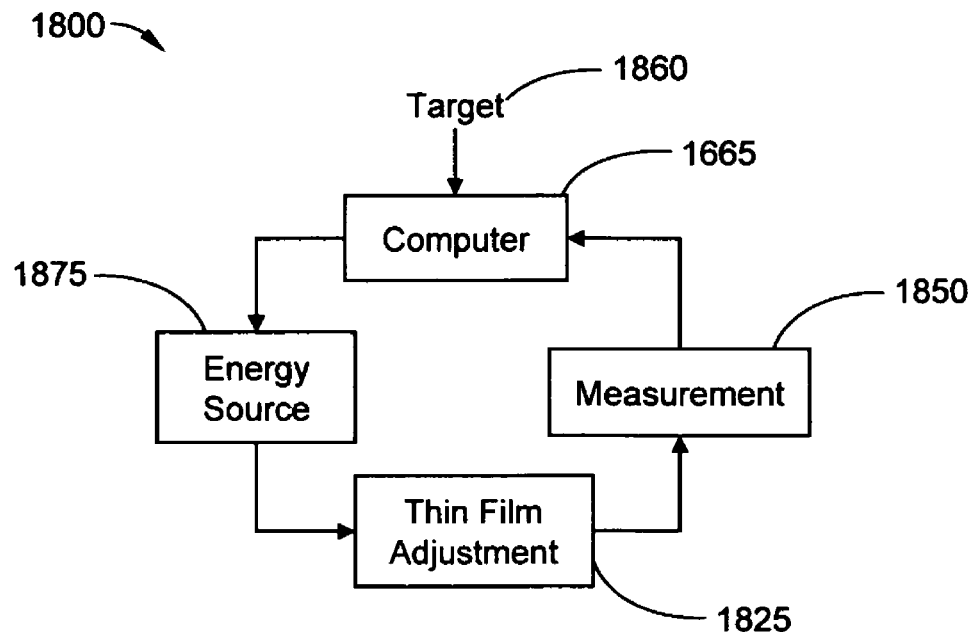
FIG. 18 is a functional block diagram illustrating adjusting an optical property of an optical thin film under computer control in accordance with an exemplary embodiment of the present invention.

Turning now to FIG. 18, this figure is a functional block diagram 1800 illustrating adjusting an optical property of an optical thin film 110 under computer control in accordance with an exemplary embodiment of the present invention. The computer 1665 receives a target 1860 from an operator, supervisory control system, production planning schedule, or other source. The target 1860 specifies the desired endpoint of a UV adjustment process, such as a refractive index, a center wavelength of a band-pass filter, the cut-on wavelength of a high-pass filter, the dispersion of a dispersion compensator, the group delay of a dielectric filter, or the attenuation profile of a gain flattening filter, for example.

The computer 1665 controls the energy source 1875 that provides energy to the optical thin film 110. The energy source can be a laser source, heat source, or other source of energy that causes an adjustment 1825 to an optical property of an optical thin film 110. A measurement 1850 of the optical property adjustment 1825 or a parameter linked to the adjustment 1825 is fed to the computer 1665. Based on this measurement 1850, the computer 1665 controls the energy source 1875 to cause equalization between the thin film measurement 1850 and the target 1860. That is, the adjustment 1825 can be equal to the deviation, thereby causing the post-adjusted optical property to equal the target. If the measurement 1850 is under the target 1860, the computer can control the energy source to increase the energy dosage, for example.

Figure 19:
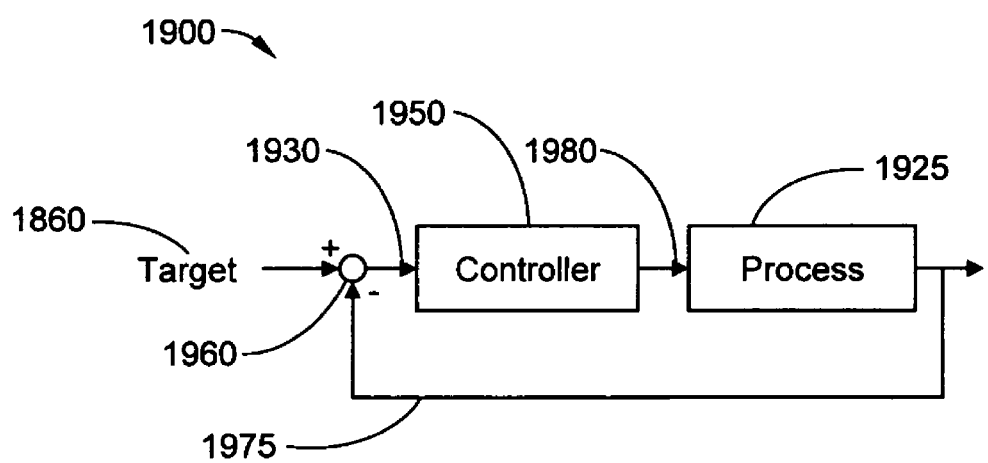
FIG. 19 is a functional block diagram illustrating closed loop feedback control of a process for adjusting an optical property of an optical thin film in accordance with an exemplary embodiment of the present invention.

Turning now to FIG. 19, this figure is a functional block diagram 1900 illustrating closed loop feedback control of a process for adjusting an optical property of an optical thin film 110 in accordance with an exemplary embodiment of the present invention.

The process block 1925 is an adjustment process whereby energy directed to an optical thin film 110 adjusts an optical property of the film 110. The target 1860, which can be a set point, is the desired optical property of the optical thin film resulting from the optical property adjustment. A feedback loop 1975 carries one or more monitored parameters from the process to a summation junction 1960. The summation junction 1960 subtracts the target 1860 from the monitored parameter 1975, thereby determining the deviation or "error" between the desired optical parameter 1860 and an actual, monitored optical parameter 1975.

A controller 1950 accepts this error signal 1930 as an input to a control algorithm (not shown) within the controller. The control algorithm computes an input 1980 to the process 1925 that is intended to bring the output of the process 1925 to the target 1860. In other words, the controller 1950 controls the process 1925 to minimize the error signal 1930 and thereby cause equalization between the monitored optical property 1975 and the target optical property 1860.

In an example of a UV laser 1655 adjusting the center wavelength of a thin film optical filter, the target 1860 may be an International Telecommunication Union ("ITU") grid wavelength for a 25 GHz DWDM band-pass optical filter. The monitored signal 1975 can be a measurement of the filter's center wavelength of the filter's pass band from an optical spectrum analyzer 1670. The error signal 1930 can be the difference between the desired center wavelength and the measured wavelength. The controller 1950 can determine or estimate a UV dosage to bring the center wavelength of the filter into equalization with the desired center wavelength.

The controller 1950, via a serial or parallel output from a computer that is fed into a laser power supply or beam shutter can control the dose of UV light that the optical thin film 110 receives. The optical spectrum analyzer 1670 provides feedback 1975 to the controller 1950 via the summation junction 1960 in the form of a measurement of the center wavelength 1960 of the filter. Based on the measured center wavelength, the controller can continue or terminate the treatment or can increase or decrease the dosage as needed to adjust the center wavelength so that it coincides with the target.

The controller 1950 can be implemented in software using a variety of algorithms. Exemplary control algorithms include neural network, deadbeat, predictive, PID, PI, Smith predictor, bang-bang, and Kalman filter control algorithms.

The present invention can include multiple computer programs embodying certain functions described herein and illustrated in the examples, functional block diagrams, and appended flow charts. However, it should be apparent that there could be many different ways of implementing aspects of the present invention in computer programming, and the invention should not be construed as limited to any one set of computer program instructions. Further, a skilled programmer would be able to write such computer programs without difficulty based on the exemplary functional block diagrams, flow charts, and associated description in the application text, for example.

Therefore, disclosure of a particular set of program code instructions is not considered necessary for an adequate understanding of how to make and use the present invention. The inventive functionality of any programming aspects of the present invention will be explained in more detail in the following description in conjunction with the remaining figures illustrating the functions and program flow and processes.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 20:
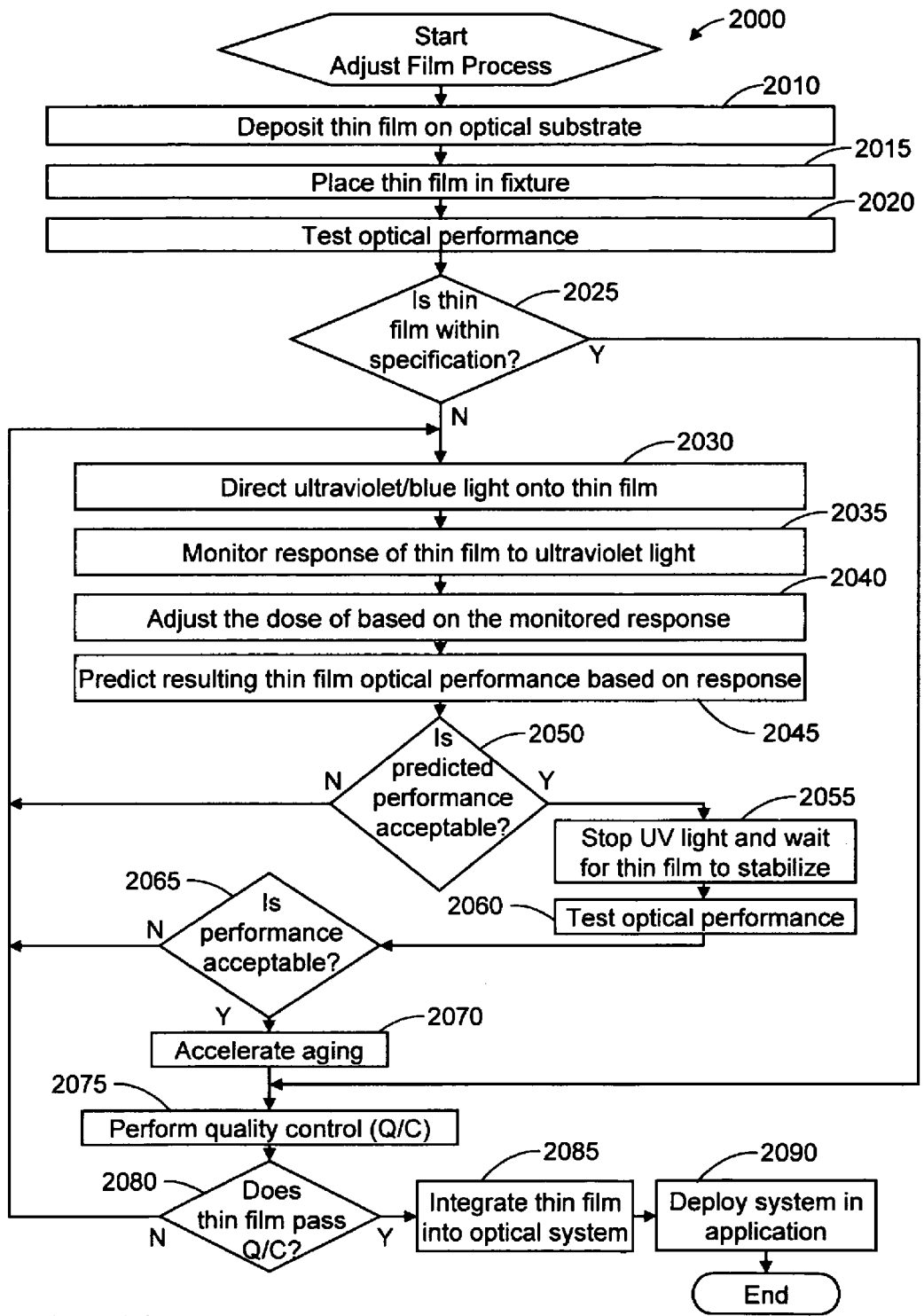
FIG. 20 is a flow chart illustrating steps in a process for adjusting an optical property of an optical thin film in accordance with an exemplary embodiment of the present invention.

Turning now to FIG. 20, this figure is a flow chart illustrating steps in a process 2000, entitled Adjust Film, for adjusting an optical property of an optical thin film 110 in accordance with an exemplary embodiment of the present invention. At Step 2010 a thin film deposition process such as a PECVD, sputtering process, or other thin film formation process described herein or known in the art deposits, grows, creates, or forms an optical thin film 110 on an optical substrate 120. In one exemplary embodiment of the present invention, the optical thin film 110 has a thickness 160 between approximately 10 nm and 10 microns.

At Step 2015 an operator or a material handling system, robot, or other machine removes the optical thin film 110 from the deposition chamber and places the optical thin film 110 along with the substrate 120 in a fixture. At Step 2020 a spectrometer, optical spectrum analyzer, or refractive index monitor system tests the optical performance of the optical thin film 110 by acquiring an optical spectrum, measuring the refractive index, or otherwise analyzing the thin film 110. Otsuka electronics Ltd. of Osaka, Japan supplies refractive index instruments that are acceptable for one exemplary embodiment of the present invention. Step 2020, like the other steps in Process 2000 can proceed under automatic computer control in one exemplary embodiment of the present invention.

At inquiry Step 2025, a computer program or operator determines if the optical thin film 110 is within a specification, such as a telecommunications standard or a manufacturing tolerance. If the optical thin film 110 is acceptable, then Adjust Film 2000 bypasses applying UV light 330 to the optical thin film 110 and, at Step 2075 performs a quality control analysis. This quality control can include additional optical performance analysis and physical characteristics such as physical size of the substrate 120.

At inquiry Step 2080, a computer algorithm or operator determines if the optical thin film 110 passes the quality control of Step 2075. If the optical thin film 110 passes quality control, then at Step 2085, a manual or automatic assembly process integrates the optical thin film 110 into an optical system. Exemplary optical system include add-drop filter assemblies, multiplexer cards, DWDM system, synchronous optical network ("SONET") hardware, spectroscopic probes, Raman instrumentation, fluorescent microscopes, endoscopes, catheters, and flat panel displays.

At Step 2090, a company installation team or other organization deploys the integrated optical system of Step 2090 into an application. Exemplary applications include SONET networks, telecommunications networks, local area networks, metropolitan area networks, service area networks, biomedical systems, living organisms (for example a catheter or other medical instrument), process analyzers, chemical process control systems, or other applications involving light. Following Step 2090, Adjust Film 2000 ends.

Returning to inquiry Step 2025, a determination at Step 2025 that the optical thin film 110 is out-of-specification results in the execution of Step 2030, rather than Step 2075. At Step 2030, a light source directs radiation, such as UV and/or violet/blue light, to the optical thin film 110. At Step 2035 an instrument, such as a spectrum analyzer 1670, monitors the response of the optical thin film 110 to the directed light. At Step 2040, a controller or human adjusts the dose of light based on the monitored response of the delivered light 330.

At Step 2045, a predictive algorithm predicts the end point optical performance of the optical thin film 110. The predictive algorithm can compensate for accelerated aging, normal aging that occurs following deploying the optical thin film 110 in an application, annealing, relaxing stress in the optical thin film 110, effects of assembling the optical thin film 110 in an optical device, cooling the optical thin film 110 to a normal operating temperature, or other effect. Step 2045 can include a linear projection, multivariate projection, statistical analysis, or other computation.

At inquiry Step 2050, a computer program or manual calculation determines if the predicted performance of Step 2045 is acceptable. If the predicted performance is not acceptable, Adjust Film 2000 iterates Steps 2030, 2035, 2040, and 2045 until the predicted performance is acceptable.

When inquiry Step 2050 determines that the predicted performance is acceptable, an operator or automatic computer control program stops the application of UV light 330 and waits a period of time for the temperature of the optical thin film 110 to stabilize. At Step 2060, an optical spectrum analyzer 1670 or other instrument tests the optical performance of the optical thin film 110.

At inquiry Step 2065 a computer program or operator determines if the results of the test at Step 2060 indicate acceptable optical performance. If the optical performance is not acceptable, Adjust Film 2000 returns to Step 2030 and continues processing the optical thin film 110 from that step 2030.

If inquiry Step 2065 determines that the performance is acceptable, then an application of heat accelerates the aging of the optical thin film 110 at Step 2070 to minimize drift in the optical properties of the optical thin film 110 in an end-use application. Placing the optical thin film 110 in an oven at a temperature between 150° C. and 350 C.° can implement the accelerated aging for inorganic thin films. Films with organic content, such as plastic or polymer films, may also aging under appropriate conditions that may include reduced temperatures. Following Step 2070, Adjust Film 2000 executes Steps 2080, 2085, and 2090 as described above and then ends.

Figure 21:
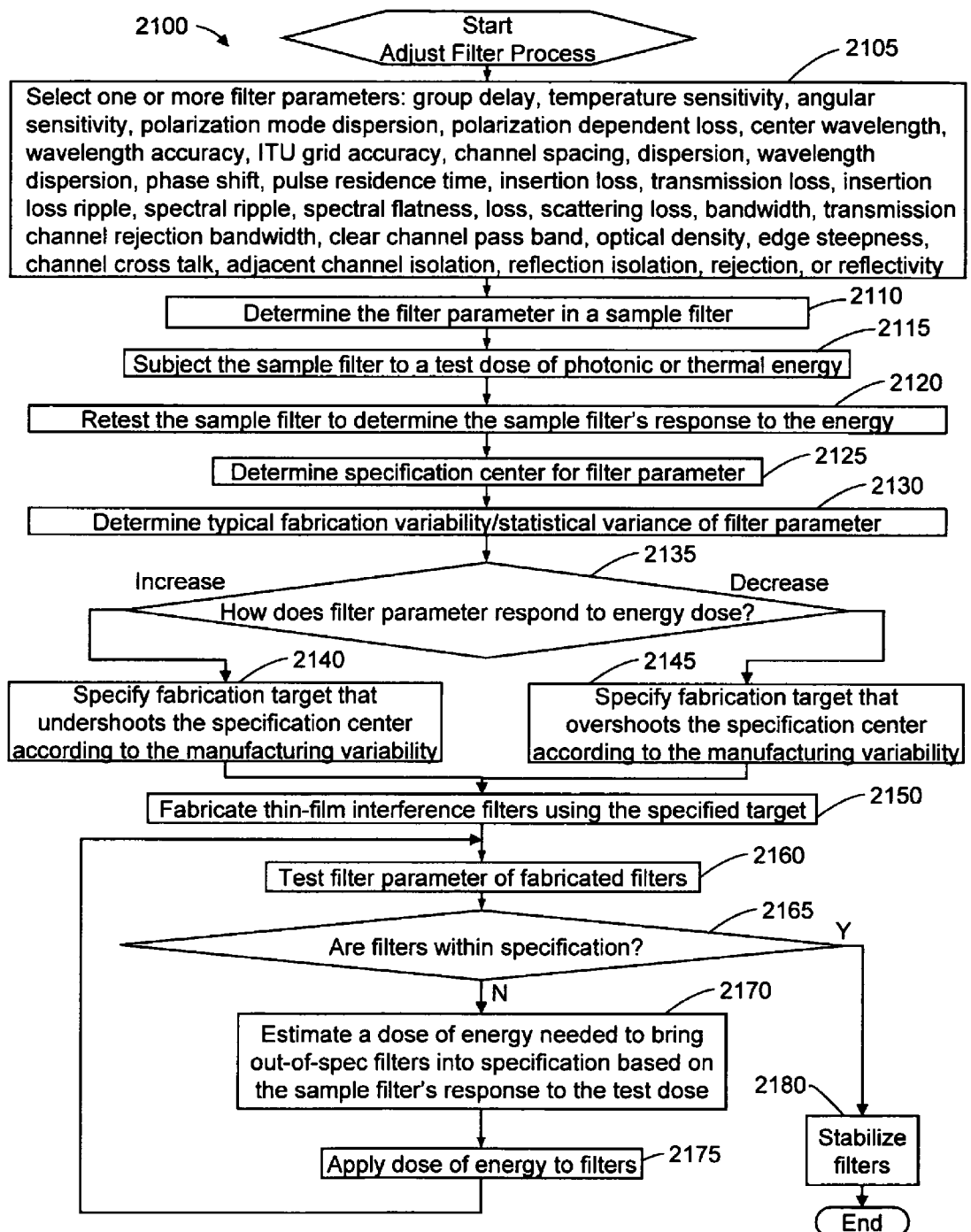
FIG. 21 is a flow chart illustrating steps in a process for adjusting an optical property of an optical filter in accordance with an exemplary embodiment of the present invention.

Turning now to FIG. 21 this figure is a flow chart illustrating steps in a process 2100, entitled Adjust Filter, for adjusting an optical property of an optical filter in accordance with an exemplary embodiment of the present invention.

At Step 2105, an operator, production planner, engineer, manager, or computer program selects one or more filter parameters for adjustment. Exemplary optical parameters of a filter that can be selected for adjustment include, without limitation, group delay, temperature sensitivity, angular sensitivity, polarization mode dispersion, polarization dependent loss, center wavelength, wavelength accuracy, ITU grid accuracy, channel spacing, dispersion, wavelength dispersion, phase shift, pulse residence time, insertion loss, transmission loss, insertion loss ripple, spectral ripple, spectral flatness, loss, scattering loss, bandwidth, transmission channel rejection bandwidth, clear channel pass band, optical density, edge steepness, channel cross talk, adjacent channel isolation, reflection isolation, rejection, and reflectivity.

At Step 2110, an instrument having a capability of measuring the parameter selected at Step 2105 acquires a measurement of the selected parameter from a sample thin film optical filter. Alternatively, an instrument can measure a parameter that is related to the selected parameter. For example, the selected optical parameter might be the bit error rate ("BER") of a communication signal passed through a thin film optical filter, and the instrument might measure group delay.

At Step 2115, the sample optical filter receives a test dose of photonic or thermal energy from a laser, arc lamp, light bulb, or other illumination source or a dose of thermal energy from an oven, radiant heat source, thermal conduction system, or other heat source.

At Step 2120, the instrument retests the sample optical filter to determine the change in the parameter resulting from the test dose of energy. At Step 2125, a computer program or a person determines a specification center point for the selected filter parameter.

Analysis at Step 2130 determines typical variability or statistical variance of the filter parameter. For example, a deposition process may yield thin film optical band-pass filters having an in-batch variation in the center of the pass band of approximately less than 0.25 nanometers for 90% of the filters of the batches produced over the last six months. That is, 90% of the filters from a typical deposition batch may have a center wavelength that is within 0.25 nanometers of a fabrication target.

Inquiry Step 2135 directs Process 2100 to Step 2140 if the filter parameter increases in response to the energy dose or to Step 2135 if the filter parameter decreases in response to the energy dose.

At Step 2140 a person or computer program determines a fabrication target for a thin film optical filter that undershoots or is below the specification center according to the manufacturing variability. For example, a 1550 nm wavelength might be desired as the center wavelength of the exemplary band-pass filter discussed above in reference to Step 2130. In this example, a fabrication target could be 1550 minus 0.25 nanometers, which is 1549.75 nanometers.

At Step 2145, the person or computer program determines a fabrication target for a thin film optical filter that overshoots, rather than undershoots, the specification center in accordance with the manufacturing variability.

At Step 2150, a deposition process fabricates thin film optical filters using the target specification resulting from Step 2140 or 2145, as applicable. Continuing with the example discussed above in reference to Steps 2130 and 2140, the filter deposition process targets 1549.75 nanometers as the target. Historical process variation predicts that the batch will yield approximately 90% of its filter output having a center wavelength between 1549.50 nm and 1550 nm.

At Step 2160, an optical spectrum analyzer, spectrometer, or other instrument tests the filter parameter of the fabricated filters. Inquiry step 2165 determines if the filters are within specification. Returning to the example, the specification might stipulate that the filters have a center wavelength between 1549.75 and 1550.25. Many of the filters from the deposition process can be expected to meet this specification based on the target selection and the historical process variability.

For the filters that are within specification, an application of heat such as an annealing stabilizes the filters in Step 2180. Depending on the deposition process, Step 2180 can be skipped, particularly for the filters meeting a performance specification without need a post-deposition adjustment.

For the filters that are out-of-specification, a person or computer program computes an estimate of a corrective dose of energy at Step 2170 based on the response of the sample filter to the test dose of energy, in accord with Steps 2115 and 2120, which are described above. An application of a dose of energy at Step 2175, based on the corrective estimate, adjusts the filters. Following Step 2175, Process 2100 repeats Step 2160 and subsequent steps to determine if the energy dose brought the filter into specification. When the filters are within specification, annealing at Step 2180 stabilizes the filter and Process 2100 ends.

Figure 22:
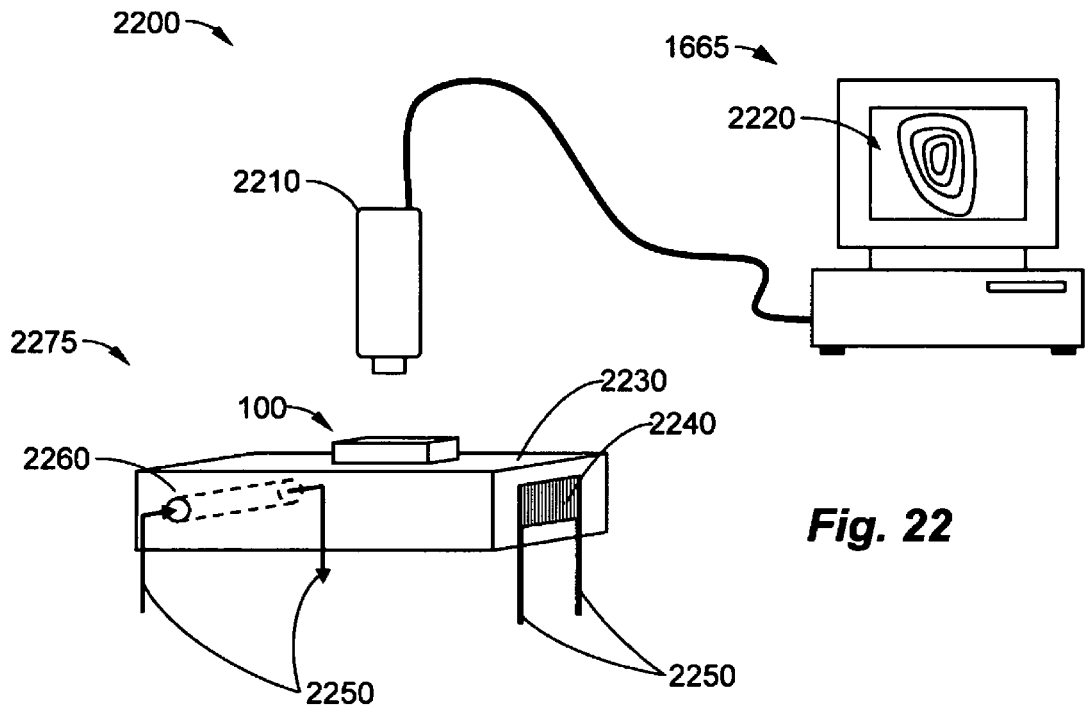
FIG. 22 illustrates a system for imparting a pattern into an optical thin film by an application of thermal energy in conjunction with monitoring the distribution of thermal energy in accordance with an exemplary embodiment of the present invention.

Turning now to FIG. 22, this figure illustrates a system 2200 for imparting a pattern into an optical thin film 110 by an application of thermal energy in conjunction with monitoring the distribution of thermal energy in accordance with an exemplary embodiment of the present invention.

A mounting fixture 2275 holds the thin film optical system 100 in position. The fixture includes a base plate 2230 fabricated of thermally conductive material such as copper or fused silica. A resistive heating element 2240, powered by an electrical source (not shown), at one end of the base plate 2230 supplies heat to the assembly 2275. Cooling water 2250 flowing though a hole 2260 in the opposite end of the base plate 2230 carries thermal energy away from the base plate 2230. The heating element 2250 and the cooling water 2250 produce a thermal gradient across the base plate 2230. That is, the temperature of the base plate 2230 varies in a controlled manner from a high temperature to a relatively low temperature across the base plate 2230.

In one exemplary embodiment of the present invention, the temperature varies from approximately 500° C. to approximately 400° C. across the base plate 2230. In one exemplary embodiment of the present invention, the temperature varies from approximately 600° C. to approximately 300° C. across the base plate 2230. In one exemplary embodiment of the present invention, the temperature varies from approximately 350° C. to approximately 200° C. across the base plate 2230. In one exemplary embodiment of the present invention, the temperature varies from approximately 450° C. to approximately 250° C. across the base plate 2230.

The base plate 2230 transfers heat to the thin film optical system 100 to deliver a gradient pattern of thermal energy to the optical thin film 110. A thermal imaging camera 2210 coupled to a computer 1665 provides a contour-style image that shows the temperature gradient that is applied to the thin film optical system. That is, the computer 1665 displays a thermal image 2220 of the thin film optical system 100 that can be used for manual or automatic control of the energy supplied by the resistive element 2240 and removed by the water 2250.

The pattern of thermal energy delivered to the thin film optical system 100 imposes a corresponding optical property pattern to the thin film optical system 100. In one exemplary embodiment of the present invention, the system 2200 imparts an optical thin film 110 with a monotonic variation in refractive index across the surface of the optical thin film 110. In one exemplary embodiment of the present invention, the system 2200 imposes a positional shift in a thin film optical filter. For example, the system 2200 adjusts a thin film optical band-pass filter so the filter's center wavelength varies across the filter in an essentially linear pattern.

Figure 23:
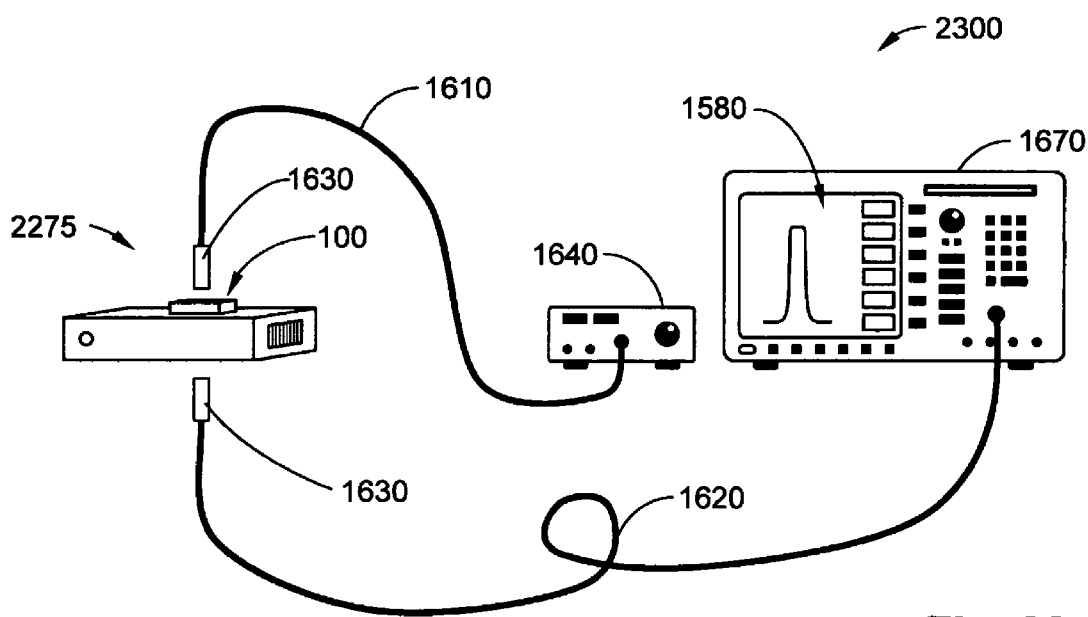
FIG. 23 illustrates a system for imparting a pattern into an optical thin film by an application of thermal energy in conjunction with monitoring an optical response of the optical thin film in accordance with an exemplary embodiment of the present invention.

Turning now to FIG. 23, this figure illustrates a system 2300 for imparting a pattern into an optical thin film 110 by an application of thermal energy in conjunction with monitoring an optical response of the optical thin film 110 in accordance with an exemplary embodiment of the present invention. The system 2275, includes the fixture 2275 described above in reference to FIG. 22, with a base plate of thermally conductive material that is optically transparent, such as sapphire or fused silica.

A light source 1640 supplies light through the thin film optical system 100 and the fixture 2275 via a fiber optic cable 1610 and a light delivery optic 1630. A light collection optic 1630 and another fiber optic cable 1620 carry transmitted light to an optical spectrum analyzer 1670 which displays a spectrum 1580 of thin film optical system 100.

A feedback control algorithm or manual control can adjust the heat dosage, either the heat intensity or the gradient heat pattern, to impart a desirable pattern of an optical property to the thin film optical system 100.

Figure 24:
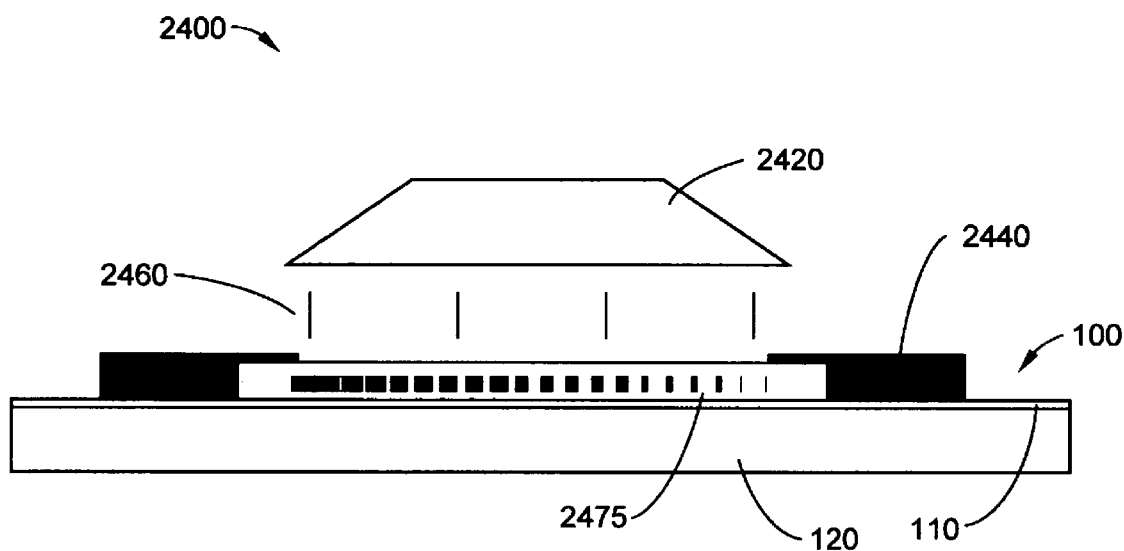
FIG. 24 illustrates a system for imparting a pattern into an optical thin film by an application of radiant thermal energy in accordance with an exemplary embodiment of the present invention.

Turning now to FIG. 24, this figure illustrates a system 2400 for imparting a pattern into an optical thin film 110 by an application of radiant thermal energy 2400 in accordance with an exemplary embodiment of the present invention.

A radiant heat source 2420 outputs radiant heat 2460 towards the thin film optical system 100, including the optical thin film 110 and the substrate 120 to which it is attached. A neutral density filter 2475 or neutral density wedge blocks the radiant heat 2460 in a pattern corresponding to the optical property adjustment. The neutral density filter, which can be an infrared blocking filter, blocks, rejects, or reflects incident radiant heat in a graduated or graded pattern so that the optical thin film 110 receives a dose of thermal energy that varies in an essentially linear manner across the surface of the optical thin film 110. A shield 2440 blocks the radiant energy 2460 from interacting with unwanted regions of the optical thin film 110. That is, the shield 2440, which can be formed of reflective metal, localizes the application of radiant heat 2460 to specific regions of the optical thin film 110.

Figure 25:
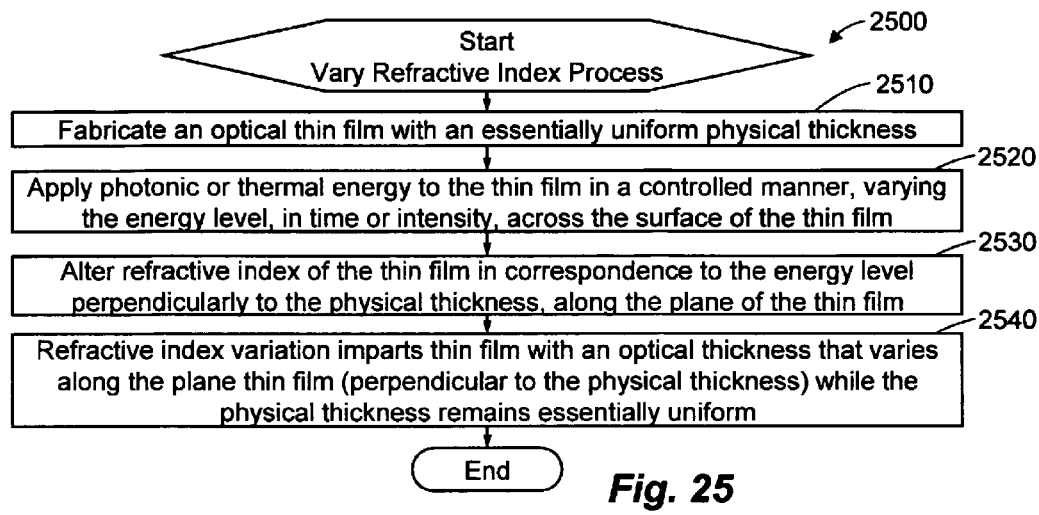
FIG. 25 is a flow chart illustrating steps in a process for varying the refractive index of an optical thin film in a graded pattern in accordance with an exemplary embodiment of the present invention.

Turning now to FIG. 25, this figure is a flow chart illustrating steps in a process 2500, entitled Vary Refractive Index, for varying the refractive index of an optical thin film 110 in a graded pattern in accordance with an exemplary embodiment of the present invention.

At Step 2510, a deposition process forms an optical thin film 110 with an essentially uniform physical thickness. At Step 2520, an energy deliver device, such as a laser, radiant heat source, convention heat source, or conductive heat source, applies photonic or thermal energy to the optical thin film 110 in a controlled manner. The energy delivery device varies the level of energy across the surface of the optical thin film 110. The level of energy delivery can be varied by intensity, total energy delivery, or time of energy delivery across the surface of the optical thin film 110.

At Step 2530, the delivered energy alters the refractive index of the optical thin film 110 in correspondence to the spatial pattern of the delivered energy. That is, the delivered energy alters the film's refractive index perpendicular to the film's thickness 160, along the plane of the optical thin film 110.

At Step 2540, the refractive index variation imparts the optical thin film 110 with an optical thickness that varies along the plane of the thin film 110, perpendicular to the thickness 160, while the physical thickness 160 of the optical thin film 110 remains essentially uniform. Following Step 2540, which can occur contemporaneously with Step 2530, Process 2500 ends.

Figure 26:
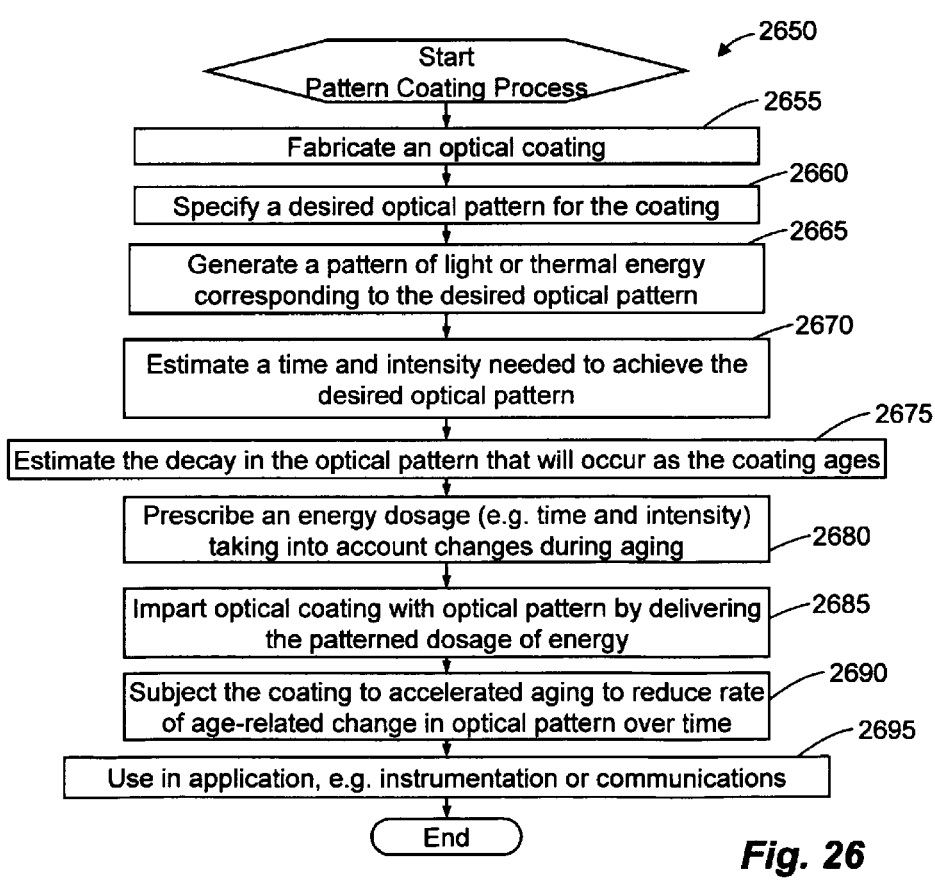
FIG. 26 is a flow chart illustrating steps in a process for imparting an optical thin film with a pattern in accordance with an exemplary embodiment of the present invention.

Turning now to FIG. 26, this figure is a flow chart illustrating steps in a process 2650, entitled Pattern Coating Process, for imparting an optical thin film 110 with a pattern in accordance with an exemplary embodiment of the present invention.

At Step 2655, a deposition process such as one of the exemplary deposition processes described herein, fabricates an optical coating 110 having a composition such as one of the exemplary compositions described herein.

At Step 2660, an engineer, operator, or other individual or a program specifies a desired optical property pattern for a coating. At Step 2665, an energy source, for example a UV light source or thermal energy source, generates a pattern of energy corresponding to the desired optical property pattern.

At Step 2670 an algorithm, program, or person estimates a time and intensity needed to achieve a desired optical pattern. In one exemplary embodiment of the present invention, the estimate is derived by subjecting an optical thin film 110 to an initial dose known not to permanently adjust the optical property and then increasing the dose until a permanent adjustment results. In one exemplary embodiment of the present invention, determining the dose estimate includes varying various parameters, such as optical wavelength, of the dose. In one exemplary embodiment of the present invention, determining the dose includes empirical steps.

At Step 2675, a person, computer, or program estimates the decay in the optical pattern that will occur as the coating ages during usage in an application. Aging can induce an exponential change, which can in totality be either negligible or significant, in an optical property of an optical thin film 110 over time. That is, the rate of change in the optical property of the optical thin film 110 increasingly lessens over time.

At Step 2680 a person or computer program prescribes or estimates an energy dosage that is expected to yield a desired pattern of an optical property taking into account aging-induced changes that are predicted to occur over time. For example, if aging causes a 0.1% reduction in the optical property, then the dosage can be prescribed to cause the optical property to overshoot a desired endpoint by 0.05% in order to pre-compensate for the anticipated 0.1% reduction.

At Step 2685, delivering a patterned dose of energy to the optical thin film 110 imparts the optical thin film 110 with a patterned or spatially specific optical property. At Step 2690, the optical thin film 110 undergoes a heat treatment to provide accelerated aging in order to decrease the rate of change in the optical property of the optical thin film 110 over the time that the optical thin film 110 operates in its intended or end-use application.

At Step 2695, the optical thin film 110 performs its intended function in an end application. For example, the optical thin film 110 can filter, reflect, delay, or interfere with light in a communication or instrumentation system. Pattern Coating 2650 ends following Step 2695.

Figure 27:
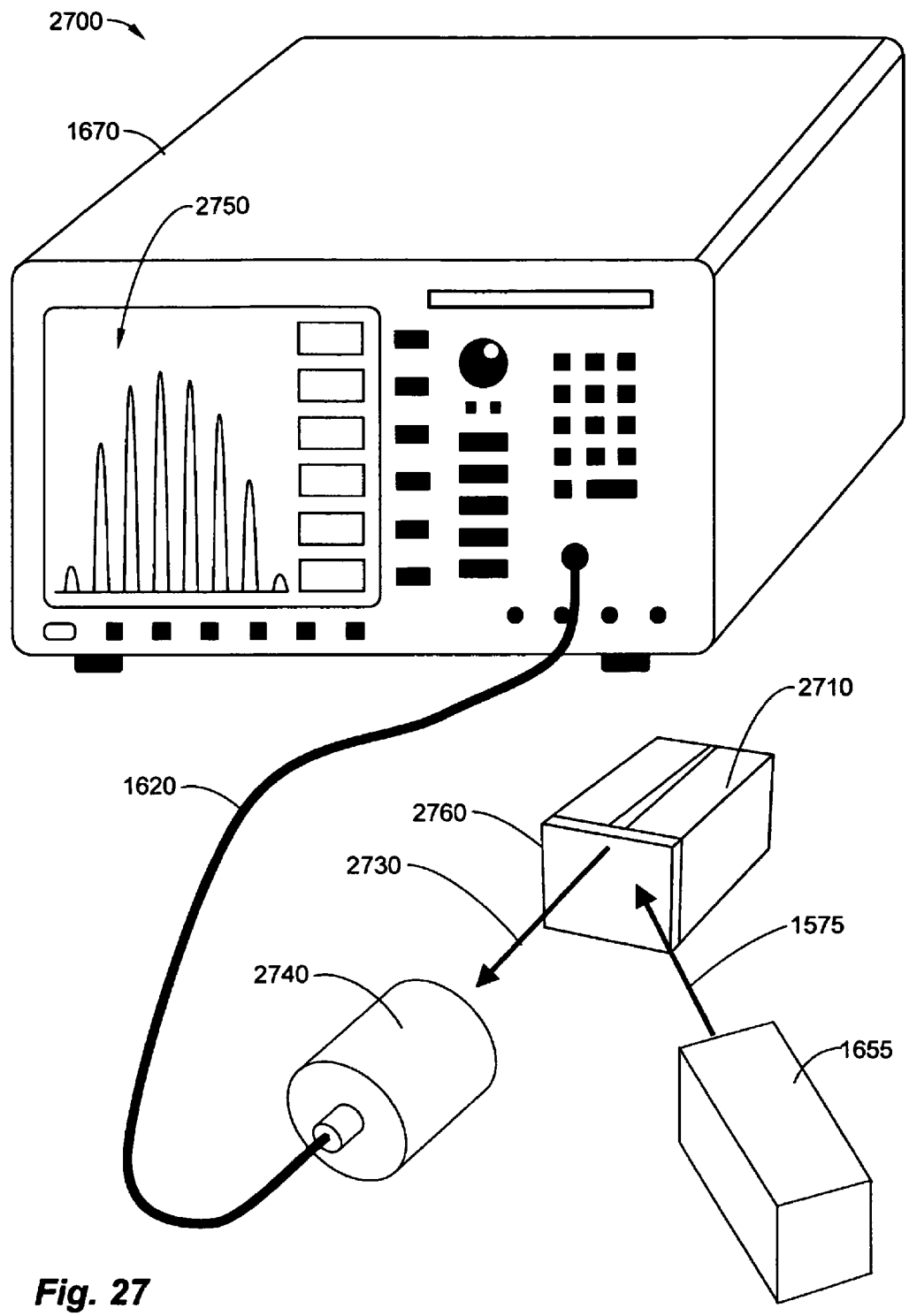
FIG. 27 illustrates a system for adjusting the reflectivity of an AR coating on a laser in accordance with an exemplary embodiment of the present invention.

Turning now to FIG. 27, this figure illustrates a system 2700 for adjusting the reflectivity of an AR coating 2760 on a laser 2710 in accordance with an exemplary embodiment of the present invention. The system 2700 includes an optical spectrum analyzer 1670 and a UV laser 1655. An AR coat 1760 on a semiconductor laser 2710, such as a Fabry-Perot laser die, or a silicon-based lasing cavity serves to defeat reflection from the end facet of this laser 2710 to which the AR coat 2760 adheres.

An electrical power supply (not shown) drives the semiconductor laser 2710 with current. The semiconductor laser 2710 responds to the current by outputting light in a pattern of longitudinal modes 2750. A lens assembly 2740 collects light 2730 output from the semiconductor laser 2710 and focuses that light 2730 into an optical fiber 1620 that carries the light 2730 to the optical spectrum analyzer 1670. The optical spectrum analyzer 1670 analyzes the light 2730 and displays a spectrum 2750 of the light 2730. The longitudinal modes 2750 of the semiconductor laser 2710 appear as a comb-shaped pattern 2750 in the spectrum 2750 on the optical spectrum analyzer 1670.

Adjusting the refractive index of the AR coating 2760 to an optimal or beneficial value or to a desirable range increases the coating's effectiveness in suppressing reflection from the laser's end facet. That is, setting the AR coating's refractive index to a value that matches the design of the coating increases the AR coating's performance. The AR coating's performance is typically sensitive to the coating's refractive index, especially if the thin film coating 2760 is a single-layer coating.

For a given current injected into the semiconductor laser 2710 via a laser power supply, the height of the comb in the displayed spectrum 2750 can indicate the effectiveness of the optical thin film coating 2760 in suppressing facet reflection. That is, achieving a target refractive index can reduce the facet reflection which in turn reduces the height of the comb pattern 2750 in the displayed spectrum 2750 on the optical spectrum analyzer 2750.

Those skilled in the art appreciate that various methods of determining the effectiveness of an AR coating 2760 on a semiconductor laser 2710 are known in the art. In one exemplary embodiment of the present invention, the current to the semiconductor laser 2710 is increased until the laser 2710 crosses the lasing threshold and thus begins lasing. Current needed to induce lasing, that is threshold current, can be an indicator of the AR coating's performance. The higher the current that a semiconductor laser die can accept without lasing, the better the performance of the AR coat 2760 in suppressing facet reflection.

A UV laser 1655 delivers UV light 1575 to the AR coat 2760 of the semiconductor laser 2710 to adjust the refractive index of the AR coat 2760 to a value that reduces facet reflection to an acceptable or minimal level. The UV laser 1655 doses the AR coat 2760 with UV light 1575 until the semiconductor laser 2710 exhibits acceptable performance. Acceptable performance can be determined by evaluating the spectral pattern 2750 on the optical spectrum analyzer 1670, by monitoring the threshold current of the semiconductor laser 2710, or by other method known in the art. In one exemplary embodiment of the present invention, the UV laser 1655 applies UV trimming light 1575 to the facet coating 2760 with a grating or other spectrally selective reflector disposed adjacent to the facet so that the semiconductor laser 2710 operates as an external cavity laser.

Figure 28:
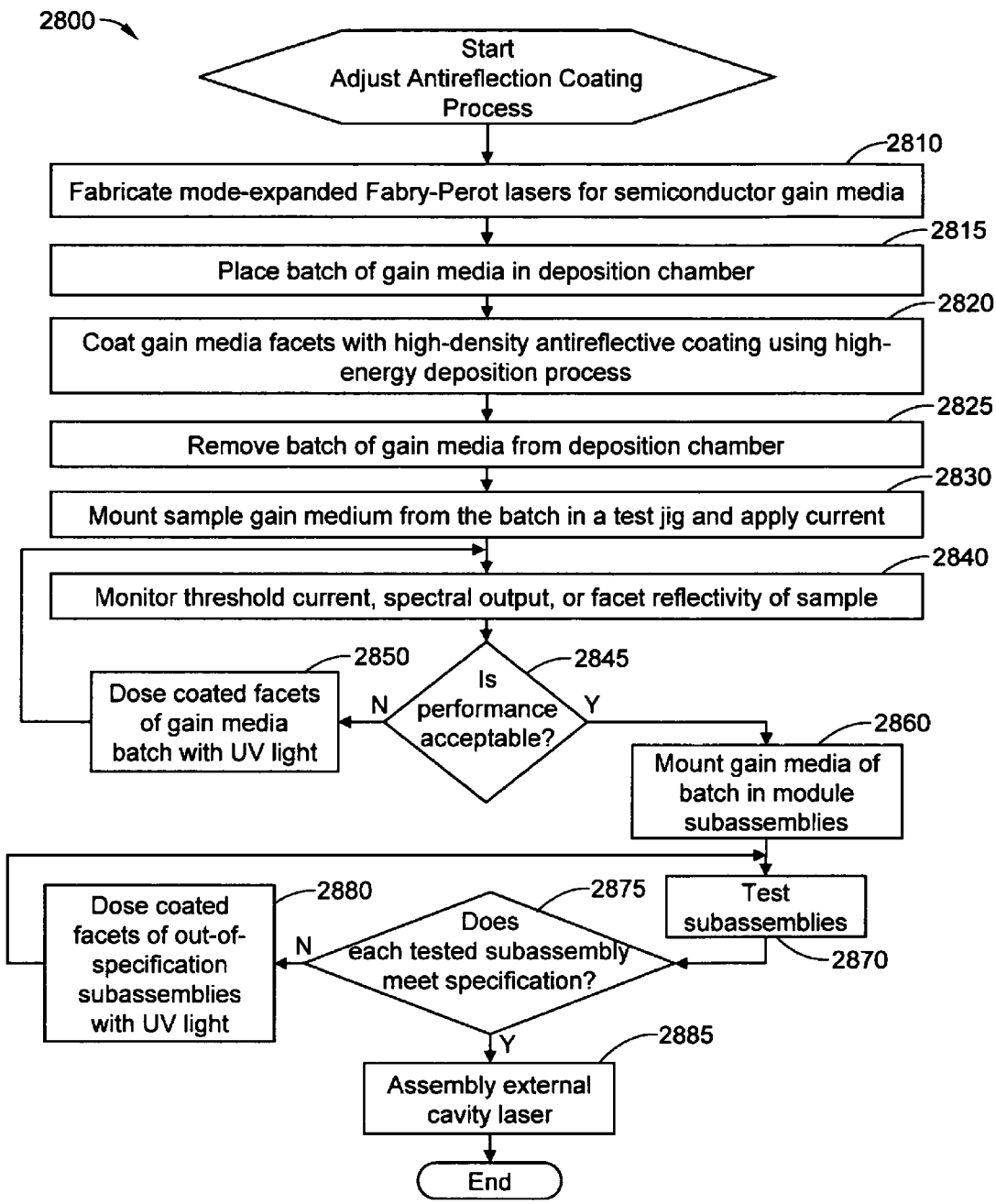
FIG. 28 is a flow chart illustrating steps in a process for adjusting an optical property of an AR coating on a laser in accordance with an exemplary embodiment of the present invention.

Turning now to FIG. 28, this figure is a flow chart illustrating steps in a process 2800, entitled Adjust Antireflective Coating, for adjusting an optical property of an AR coating 2760 on a laser 2710 in accordance with an exemplary embodiment of the present invention. At Step 2810, a laser fabrication process fabricates mode expanded Fabry-Perot lasers for semiconductor gain media. Such laser fabrication processes are well known in the art. Suppliers of laser dies include: Sacher Lasertechnik Group of Marburg, Germany; Covega Corporation of Jessup Md.; and Princeton Lightwave of Cranbury, N.J.

Those skilled in the art will appreciate that one or more steps of Process 2800 can be applied to silicon-based optical devices that amplify or manipulate light, such as a silicon photonic device, following the teaching and disclosure presented herein.

At Step 2815, an operator or a machine places a batch of semiconductor gain media 2760 in a deposition chamber in an orientation that provides a deposition coat on the facets of the gain media. At Step 2820, the deposition process coats the gain media facets with a high-density AR coating 2760 using a high-energy process. In one exemplary embodiment of the present invention, an e-beam IAD process deposits a coating 2760 of silicon oxynitride on the facets and the resulting coat has a packing density that exceeds 95%.

At Step 2825, an operator or machine removes the coated gain media 2710 from the deposition chamber. At Step 2830 an operator or machine mounts a sample gain medium 2710, for example a Fabry-Perot laser die 2710, in a test jig and energizes the sample with current.

At Step 2840 an instrument 1670 monitors the threshold current, spectral output, facet reflectivity, or other parameter from of the energized sample gain medium 2710. At inquiry Step 2845 an operator or computer program determines if the performance of the AR coat 2760 is acceptable based on the test of Step 2840. If the performance is not acceptable, then at Step 2850 a UV light source 1655 doses the coated facets of the batch of gain media 2710 with UV light 1570 to adjust the refractive index of the coating 2760. Following Step 2850, Process 2800 iterates Step 2840 and 2845 until the performance is acceptable.

When inquiry Step 2845 determines that the performance is acceptable, at Step 2860 assembly personnel and/or assembly machinery mount the coated gain media 2710 from the batch in subassemblies suitable for mounting in a product such as a laser module. Typical subassemblies can include an AR coated laser mounted on a substrate or carrier with electrical leads.

At Step 2870, operators, technicians, or automated testing equipment tests each subassembly. At Step 2875 a computer program or test personnel determines if the tested subassemblies comply with a specification. If the tested subassemblies are not within specification, then at Step 2880 a UV light source 1655 doses the out-of-tolerance AR coatings 2760 with UV light 1575 while the subassemblies remain assembled. Treated subassemblies undergo testing again at Step 2870 and further UV treatments as required until each assembly meets specification. Assemblies or individual gain medium 2710 that are not responsive to UV treatment are removed from the process 2800.

When Step 2875 indicates that each subassembly meets specification, at Step 2885 assembly personnel and/or assembly machinery integrate a Bragg grating with each subassembly, positioning the grating adjacent the coated facet in an external cavity configuration. Following Step 2885, Process 2800 ends.

In summary, the present invention can provide optical property adjustments to optical films, including optical thin films, thin film optical filters, and antireflective coatings.

From the foregoing, it will be appreciated that the present invention overcomes the limitations of the prior art. From the description of the exemplary embodiments, equivalents of the elements shown herein will suggest themselves to those skilled in the art, and ways of constructing other embodiments of the present invention will suggest themselves to practitioners of the art. Therefore, the scope of the present invention is to be limited only by the claims below.

What is claimed is:

1. A method for processing a thin film optical filter that has been formed on a substrate or support, comprising adjusting a property of the thin film optical filter in response to illuminating the thin film optical filter,
   wherein the thin film optical filter comprises a stack of thin films of alternating refractive index for filtering light via constructive and destructive interference of reflections occurring at layer interfaces, and
   wherein illuminating the thin film optical filter comprises dosing the thin film optical filter with ultraviolet or blue light.

2. A method for processing a thin film optical filter that has been formed on a substrate or support, comprising adjusting a property of the thin film optical filter in response to illuminating the thin film optical filter,
   wherein the thin film optical filter comprises a stack of thin films of alternating refractive index for filtering light via constructive and destructive interference of reflections occurring at layer interfaces, and
   wherein the thin film optical filter comprises a layer having a refractive index and wherein adjusting the property comprises permanently changing the refractive index.

3. The method of claim 2, wherein adjusting the property of the thin film optical filter comprises shifting a spectral property of the thin film optical filter to meet a specification.

4. A method for processing a thin film optical filter that has been formed on a substrate or support, comprising adjusting a property of the thin film optical filter in response to illuminating the thin film optical filter,
   wherein the thin film optical filter comprises a stack of thin films of alternating refractive index for filtering light via constructive and destructive interference of reflections occurring at layer interfaces, and
   further comprising providing a hydrogen-oxygen defect in response to illuminating the thin film optical filter.

5. A method for processing a thin film optical filter that has been formed on a substrate or support, comprising adjusting a property of the thin film optical filter in response to illuminating the thin film optical filter,
   wherein the thin film optical filter comprises a stack of thin films of alternating refractive index for filtering light via constructive and destructive interference of reflections occurring at layer interfaces, and
   further comprising the step of exposing the thin film optical filter to hydrogen, wherein illuminating the thin film optical filter comprises illuminating the hydrogen.

6. A method for processing a thin film optical filter that has been formed on a substrate or support, comprising adjusting a property of the thin film optical filter in response to illuminating the thin film optical filter, wherein the thin film optical filter comprises a stack of thin films of alternating refractive index for filtering light via constructive and destructive interference of reflections occurring at layer interfaces, and wherein illuminating the thin film optical filter comprises the step of illuminating the thin film optical filter with a level of light, and wherein the method further comprises the steps of:
monitoring a response of the thin film optical filter to the illuminating step; and
changing the level of light in response to the monitoring step.

7. A method for processing a thin film optical filter that has been formed on a substrate or support, comprising adjusting a property of the thin film optical filter in response to illuminating the thin film optical filter, wherein the thin film optical filter comprises a stack of thin films of alternating refractive index for filtering light via constructive and destructive interference of reflections occurring at layer interfaces, and wherein adjusting the property of the thin film optical filter comprises correcting a fabrication defect.

8. A method for processing a thin film optical filter that has been formed on a substrate or support, comprising adjusting a property of the thin film optical filter in response to illuminating the thin film optical filter, wherein the thin film optical filter comprises a stack of thin films of alternating refractive index for filtering light via constructive and destructive interference of reflections occurring at layer interfaces, wherein the thin film optical filter comprises nitrogen, and wherein illuminating the thin film optical filter comprises applying ultraviolet or blue light to the nitrogen.

9. The method of claim 3, wherein adjusting the property comprises permanently changing at least one of bandwidth, group delay, pass band transmission, out-of-band rejection, and in-band reflection of the thin film optical filter.

10. A thin film optical system, formed on a substrate or support and having an optical property, comprising a film that comprises an agent operable to promote a shift of the optical property in response to an application of energy to the film, wherein the film is disposed between two banks of layers of alternating, high-low refractive index materials.

11. The thin film optical system of claim 10, wherein the agent comprises hydrogen, germanium, or nitrogen.

12. The thin film optical system of claim 10, further comprising an oxygen-hydrogen defect associated with the shift.

13. The thin film optical system of claim 10, wherein the film comprises a plurality of features dispersed throughout, collectively operative to shift the optical property, wherein each of the features is associated with an instance of the agent and has a dimension less than approximately 100 nanometers.

14. The thin film optical system of claim 10, wherein:
the film is operable to manipulate a first light passing through a face of the film via interference;
the energy comprises a second light; and
the shift of the optical property comprises a sustained change in the optical property.

15. A method for fabricating a thin film system, comprising the steps of:
forming a first plurality of thin film layers of alternating refractive index on a substrate;
forming an optical cavity in response to disposing a spacer layer between the first plurality of thin film layers of alternating refractive index and a second plurality of thin film layers of alternating refractive index, the spacer layer having a material composition that is different than the first or the second plurality of thin film layers;
determining whether a spectral characteristic of the formed optical cavity deviates from a specification; and
if the spectral characteristic deviates from the specification, permanently shifting the spectral characteristic for compliance with the specification in response to selectively altering refractive index of the spacer layer via treating the spacer layer with light.

16. The method of claim 15, wherein treating the spacer layer with light comprises transmitting light through the first plurality of thin film layers and the second plurality of thin film layers,
wherein the material composition comprises an agent that is substantially absent from the first plurality of thin film layers or the second plurality of thin film layers, and
wherein selectively altering refractive index of the spacer layer comprises interacting light with the agent.

* * * * *